(12) United States Patent
Park et al.

(10) Patent No.: US 12,515,013 B2
(45) Date of Patent: Jan. 6, 2026

(54) ELECTRONIC DEVICE, METHOD, AND STORAGE MEDIUM FOR PROVIDING AUDITORY FEEDBACK FOR SLEEP INDUCTION

(71) Applicant: BELL THERAPEUTICS INC., Seoul (KR)

(72) Inventors: Jonghwa Park, Seoul (KR); Wonwoo Lee, Goyang-si (KR); Jaeeun Lee, Seoul (KR); Jiyeon Ha, Yangju-si (KR); Joongbae Yum, Seoul (KR); Bumjoon Kim, Seoul (KR)

(73) Assignee: BELL THERAPEUTICS INC., Seoul (KR)

( * ) Notice: Subject to any disclaimer, the term of this patent is extended or adjusted under 35 U.S.C. 154(b) by 0 days.

(21) Appl. No.: 19/169,587

(22) Filed: Apr. 3, 2025

(65) Prior Publication Data
US 2025/0229054 A1    Jul. 17, 2025

Related U.S. Application Data

(63) Continuation of application No. PCT/KR2024/011122, filed on Jul. 30, 2024.

(30) Foreign Application Priority Data

Jul. 31, 2023   (KR) .................. 10-2023-0099466
Jan. 5, 2024    (KR) .................. 10-2024-0002224
May 10, 2024    (KR) .................. 10-2024-0061711

(51) Int. Cl.
*A61N 1/04*   (2006.01)
*A61M 21/02*  (2006.01)
(Continued)

(52) U.S. Cl.
CPC ..... *A61M 21/02* (2013.01); *A61M 2021/0027* (2013.01); *A61M 2021/0088* (2013.01); *A61M 2205/3553* (2013.01); *A61M 2230/42* (2013.01)

(58) Field of Classification Search
CPC .......... A61M 21/02; A61M 2021/0027; A61M 2021/0088; A61M 2205/3553; A61M 2230/42
See application file for complete search history.

(56) References Cited

U.S. PATENT DOCUMENTS 9,314,583 B2   4/2016   Gavish
9,446,302 B2   9/2016   Gavish
(Continued)

FOREIGN PATENT DOCUMENTS

CN   112439119 A    3/2021
JP   2005-296358 A  10/2005
(Continued)

OTHER PUBLICATIONS

International Search Report dated Nov. 11, 2024, issued in International Application No. PCT/KR2024/011122.
(Continued)

*Primary Examiner* — Carrie R Dorna
*Assistant Examiner* — Joshua Daryl D Lannu
(74) *Attorney, Agent, or Firm* — Jefferson IP Law, LLP

(57) ABSTRACT

According to one embodiment, a method for providing a sound for sleep induction may include an operation of providing a first sound corresponding to a first user activity based on detecting the first user activity associated with user cognition regarding a period for inhalation of the user's breathing. The first user activity may be a user activity independent of the inhalation rather than a user activity caused by the inhalation of the breathing, and a start time (Continued)

point of providing the first sound may be substantially synchronized with a detection time point of the first user activity. The method may include an operation of providing a second sound corresponding to a second user activity based on detecting the second user activity associated with user cognition regarding a period for exhalation of the user's breathing. The second user activity may be a user activity independent of the exhalation rather than a user activity caused by the exhalation of the breathing, and a start time point of providing the second sound may be substantially synchronized with a detection time point of the second user activity.

20 Claims, 88 Drawing Sheets

(51) Int. Cl.
*A61N 1/36* (2006.01)
*A61N 1/378* (2006.01)
*A61N 1/40* (2006.01)
*A61N 2/00* (2006.01)
*A61N 2/02* (2006.01)
*A61M 21/00* (2006.01)

(56) References Cited

U.S. PATENT DOCUMENTS

| | | |
|---|---|---|
| 9,642,557 B2 | 5/2017 | Gavish et al. |
| 9,655,549 B2 | 5/2017 | Gavish |
| 10,314,535 B2 | 6/2019 | Gavish |
| 10,531,827 B2 | 1/2020 | Gavish |
| 10,576,355 B2 | 3/2020 | Gavish |
| 11,052,222 B2 | 7/2021 | Engel et al. |
| 2014/0350706 A1 | 11/2014 | Morishima |
| 2015/0367097 A1 | 12/2015 | Gavish |
| 2018/0056029 A1 | 3/2018 | Akimoto et al. |
| 2021/0338971 A1 | 11/2021 | Blahnik et al. |
| 2022/0088346 A1 | 3/2022 | Shin et al. |
| 2022/0122715 A1* | 4/2022 | Jooris ............... A61B 5/02405 |
| 2022/0202312 A1 | 6/2022 | Alexander et al. |
| 2023/0147172 A1 | 5/2023 | Stauffer et al. |
| 2023/0157630 A1 | 5/2023 | Kang et al. |
| 2024/0081730 A1 | 3/2024 | Hong et al. |

FOREIGN PATENT DOCUMENTS

| | | |
|---|---|---|
| JP | 2011-255008 A | 12/2011 |
| KR | 10-2017-0074372 A | 6/2017 |
| KR | 10-2018-0025230 A | 3/2018 |
| KR | 10-2020-0001226 A | 1/2020 |
| KR | 10-2021-0089782 A | 7/2021 |
| KR | 10-2378040 B1 | 3/2022 |
| KR | 10-2600175 B1 | 11/2023 |

OTHER PUBLICATIONS

Korean Office Action dated Dec. 10, 2024, issued in a Korean Patent Application No. 10-2024-0100657.
Korean Notice of Allowance dated Feb. 28, 2025, issued in a Korean Patent Application No. 10-2024-0100657.

* cited by examiner

ELECTRONIC DEVICE, METHOD, AND STORAGE MEDIUM FOR PROVIDING AUDITORY FEEDBACK FOR SLEEP INDUCTION

CROSS-REFERENCE TO RELATED APPLICATION(S)

This application is a continuation application, claiming priority under 35 U.S.C. § 365 (c), of an International application No. PCT/KR2024/011122, filed on Jul. 30, 2024, which is based on and claims the benefit of a Korean patent application number 10-2023-0099466, filed on Jul. 31, 2023, in the Korean Intellectual Property Office, of a Korean patent application number 10-2024-0002224, filed on Jan. 5, 2024, in the Korean Intellectual Property Office, and of a Korean patent application number 10-2024-0061711, filed on May 10, 2024, in the Korean Intellectual Property Office, the disclosure of each of which is incorporated by reference herein in its entirety.

TECHNICAL FIELD

The present disclosure relates to an electronic device for providing auditory feedback for sleep induction, an operating method thereof, and a storage medium.

BACKGROUND ART

The contents described below merely provide background information related to the present embodiment and do not constitute prior art.

Insomnia refers to a condition in which a person cannot achieve normal sleep, spending most of the day in a state of wakefulness (sleeplessness), or experiencing significantly insufficient sleep even when they do sleep. Symptoms include being unable to fall asleep despite prolonged wakefulness and fatigue, or waking up soon after falling asleep. For the treatment of insomnia, conventional therapies have included first-generation treatments using low-molecular compounds (e.g., pills) and second-generation treatments using biologics (e.g., antibodies, proteins, cells, etc.). However, conventional treatments have also been associated with side effects resulting from drug intake.

Meanwhile, content for sleep induction has recently been actively developed. For example, such content may include content for sleep induction or content effective for sleep induction (e.g., audio and/or graphics). For instance, U.S. Pat. No. 10,576,355 B2 discloses a configuration that induces the durations of the user's respiratory phases (e.g., inhale/exhale, etc.) to achieve a desired duration ratio by providing stimuli that change over time. In other words, conventional methods for sleep induction provide stimuli (e.g., sound) that are set to reach specific goals (e.g., an ideal inhale/exhale duration ratio) determined by a system (or algorithm). Specific goals may represent experimentally determined states known to be effective for sleep induction. Users may experience the stimuli set for specific goals, thereby transitioning their physiological state toward the goal state intended by the system.

DETAILED DESCRIPTION OF THE INVENTION

Technical Problem

As described above, conventional methods for sleep induction have provided goal-oriented content that induces the user's physiological signals (e.g., ratios of inhale/exhale durations) to achieve specific targets (e.g., a desired duration ratio). Users may experience stimuli set by the system to achieve specific goals. However, conventional systems for sleep induction merely provide stimuli (e.g., sound) corresponding to states known to be effective for sleep induction and do not disclose or imply a method for identifying the periodicity of the user's physiological information and providing stimuli based on that periodicity. For example, there are various physiological signals with periodicity, such as respiration. Conventional systems for sleep induction do not disclose a method for recognizing the periodicity of physiological signals and providing stimuli (e.g., sound) with corresponding periodicity.

Various embodiments of the present disclosure may provide an electronic device, an operating method thereof, and a storage medium capable of identifying the periodicity of the user's physiological signals (e.g., respiration) and providing sound corresponding to the periodicity of the physiological signals.

The problems addressed by the present disclosure are not limited to those mentioned above, and other problems not explicitly mentioned will be clearly understood by those skilled in the art from the descriptions below.

Technical Solution

According to an embodiment, a method for providing sound for inducing sleep may include an operation of providing a first sound corresponding to a first user activity based on detecting the first user activity associated with the user's cognition of a period for inhale of respiration of the user. The first user activity is not a user activity caused from the inhale of respiration of the user but is a user activity independent from the inhale, and the start time point of provision of the first sound may be substantially synchronized with the time point of detection of the first user activity. The method may further include an operation of providing a second sound corresponding to a second user activity based on detecting the second user activity associated with the user's cognition of a period for exhale of respiration of the user. The second user activity is not a user activity caused from the exhale of respiration of the user but is a user activity independent from the exhale, and the start time point of provision of the second sound may be substantially synchronized with the time point of detection of the second user activity.

According to an embodiment, a system for providing sound for inducing sleep may include a server and an electronic device including at least one processor. The server may be configured to provide instructions to the electronic device based on a connection to the server and/or a request to the server by the electronic device. The instructions, when executed based on at least a portion of the at least one processor of the electronic device, may cause the electronic device to perform at least one operation. The at least one operation may include providing a first sound corresponding to a first user activity based on detecting the first user activity associated with the user's cognition of a period for inhale of respiration of the user. The first user activity is not a user activity caused from the inhale of respiration of the user but is a user activity independent from the inhale, and the start time point of provision of the first sound may be substantially synchronized with the time point of detection of the first user activity. The at least one operation may further include providing a second sound corresponding to a second user activity based on detecting the second user activity associated with the user's cognition of a period for exhale of respiration of the user. The second user activity is not a user activity caused from the exhale of respiration of the user but is a user activity independent from the exhale, and the start time point of provision of the second sound may be substantially synchronized with the time point of detection of the second user activity.

According to an embodiment, a method for providing sound for inducing sleep by a system comprising a server and an electronic device may include an operation of providing instructions to the electronic device by the server based on a connection to the server and/or a request to the server by the electronic device. The method may include, by the electronic device, executing the instructions to perform an operation of providing a first sound corresponding to a first user activity based on detecting the first user activity associated with the user's cognition of a period for inhale of respiration of the user and an operation of providing a second sound corresponding to a second user activity based on detecting the second user activity associated with the user's cognition of a period for exhale of respiration of the user. The first user activity is not a user activity caused from the inhale of respiration of the user but is a user activity independent from the inhale, and the start time point of provision of the first sound may be substantially synchronized with the time point of detection of the first user activity. The second user activity is not a user activity caused from the exhale of respiration of the user but is a user activity independent from the exhale, and the start time point of provision of the second sound may be substantially synchronized with the time point of detection of the second user activity.

According to an embodiment, a method for providing sound for inducing sleep by a system comprising a server and an electronic device may include an operation of providing a server including at least one first processor. The server may be configured to provide instructions to the electronic device based on a connection to the server and/or a request to the server by the electronic device via the at least one first processor. The method may include, by the electronic device, executing the instructions to perform an operation of providing a first sound corresponding to a first user activity based on detecting the first user activity associated with the user's cognition of a period for inhale of respiration of the user and an operation of providing a second sound corresponding to a second user activity based on detecting the second user activity associated with the user's cognition of a period for exhale of respiration of the user. The first user activity is not a user activity caused from the inhale of respiration of the user but is a user activity independent from the inhale, and the start time point of provision of the first sound may be substantially synchronized with the time point of detection of the first user activity. The second user activity is not a user activity caused from the exhale of respiration of the user but is a user activity independent from the exhale, and the start time point of provision of the second sound may be substantially synchronized with the time point of detection of the second user activity.

According to an embodiment, a computer-readable storage medium storing instructions may be provided. The instructions, when executed by at least one processor of an electronic device, may cause the electronic device to perform at least one operation. The at least one operation may include providing a first sound corresponding to a first user activity based on detecting the first user activity associated with the user's cognition of a period for inhale of respiration of the user. The first user activity is not a user activity caused from the inhale of respiration of the user but is a user activity independent from the inhale, and the start time point of provision of the first sound may be substantially synchronized with the time point of detection of the first user activity. The at least one operation may further include providing a second sound corresponding to a second user activity based on detecting the second user activity associated with the user's cognition of a period for exhale of respiration of the user. The second user activity is not a user activity caused from the exhale of respiration of the user but is a user activity independent from the exhale, and the start time point of provision of the second sound may be substantially synchronized with the time point of detection of the second user activity.

According to an embodiment, an electronic device may include at least one processor and a memory storing instructions. The instructions, when executed by the at least one processor of the electronic device, may cause the electronic device to perform at least one operation. The at least one operation may include providing a first sound corresponding to a first user activity based on detecting the first user activity associated with the user's cognition of a period for inhale of respiration of the user. The first user activity is not a user activity caused from the inhale of respiration of the user but is a user activity independent from the inhale, and the start time point of provision of the first sound may be substantially synchronized with the time point of detection of the first user activity. The at least one operation may further include providing a second sound corresponding to a second user activity based on detecting the second user activity associated with the user's cognition of a period for exhale of respiration of the user. The second user activity is not a user activity caused from the exhale of respiration of the user but is a user activity independent from the exhale, and the start time point of provision of the second sound may be substantially synchronized with the time point of detection of the second user activity.

Advantages of the Invention

According to various embodiments of the present disclosure, an electronic device, an operating method thereof, and a storage medium capable of identifying the periodicity of a user's physiological signals (e.g., respiration) based on the detection of the user's intentional activities and providing sound corresponding to the periodicity of the physiological signals may be provided.

By identifying the periodicity based on the detection results of user activities associated with cognition of the periodicity of physiological signals, independent of the physiological signals, the periodicity of specific physiological signals may be determined more accurately without analyzing the physiological signals themselves. Accordingly, the periodicity of the user's physiological signals and the stimuli fed back (e.g., sound) may be synchronized in real time with greater accuracy.

Furthermore, users may be prompted to input activities related to the periodicity of physiological signals, thereby improving their awareness of the periodicity of those signals. Additionally, by providing users with feedback stimuli (e.g., sound) that are temporally synchronized with the periodicity of the relevant physiological signals, the user's awareness of the periodicity may be further enhanced. Improving user awareness of the periodicity of physiological signals, such as respiration, may induce slower breathing and/or entrainment of other physiological signals (e.g., brain waves) to the physiological signals, thereby improving the effectiveness of sleep induction.

Moreover, the problem of reduced user engagement and decreased likelihood of continued use due to the goal-oriented stimulus provision method of conventional systems may be addressed. Based on the provision of stimuli synchronized in real time with the user's physiological signals and/or stimuli with attribute changes according to the present disclosure, user engagement and continued use may be improved.

The advantages of the present invention are not limited to those mentioned above, and other advantages not explicitly described will be clearly understood by those skilled in the art from the descriptions below.

MODES FOR THE INVENTION

Figure 1A:
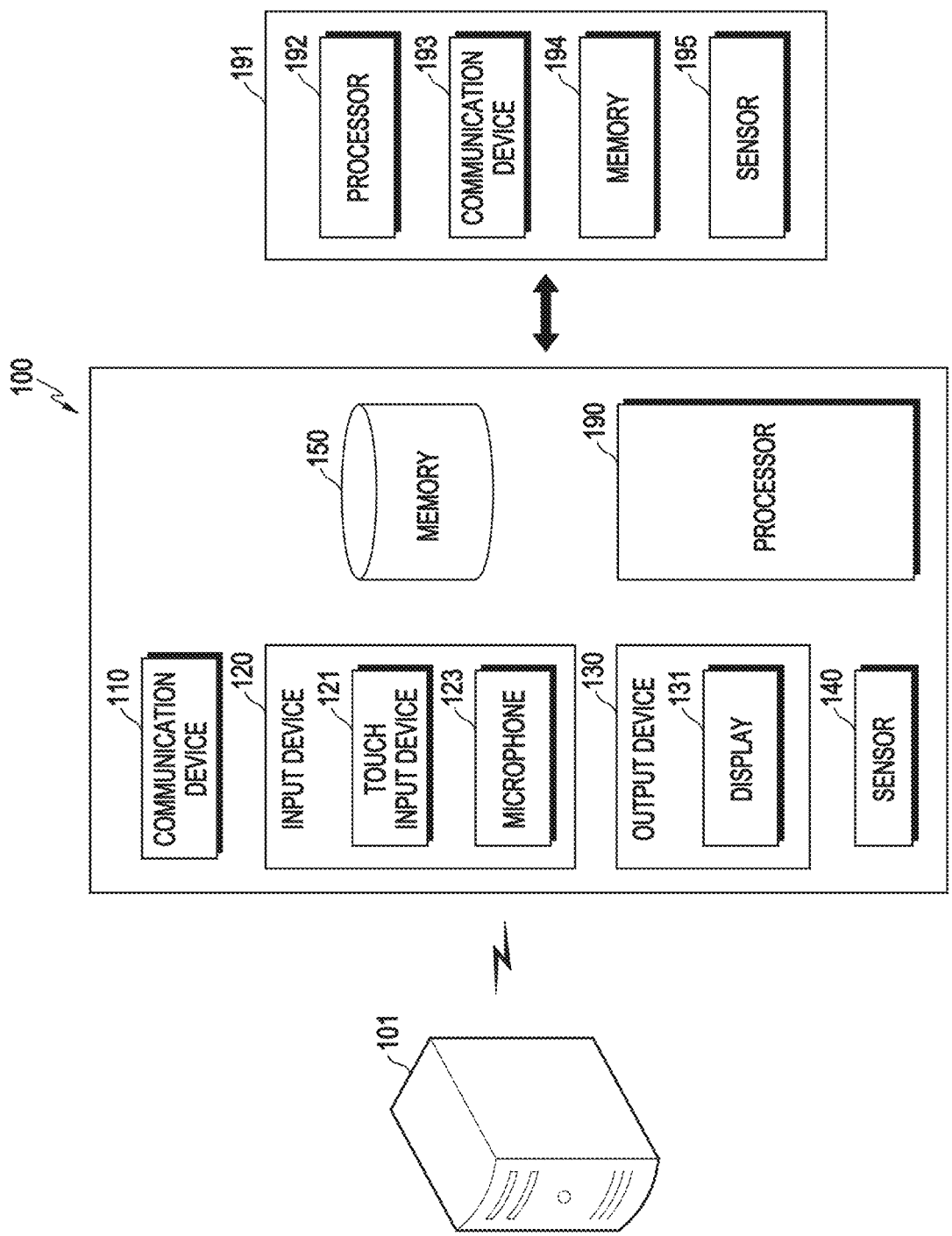
FIG. 1A is a diagram illustrating an electronic device, a server, and an external electronic device for sleep induction according to the present disclosure.

Throughout the present disclosure, the same reference numerals refer to the same components. The present disclosure does not describe all elements of the embodiments, and general information in the technical field of the disclosure or redundant content across embodiments is omitted. The terms "unit," "module," "member," and "block" used in this specification may refer to executable software (e.g., code, instructions, or programs). Alternatively, "unit," "module," "member," and "block" may be implemented as hardware with a structure. Depending on the embodiments, multiple "units," "modules," "members," or "blocks" may be implemented as a single component, or a single "unit," "module," "member," or "block" may include multiple components.

In the specification, when one part is described as being "connected" to another part, it may mean that they are in physical contact (e.g., fastened) or connected through another intervening entity. Accordingly, "connection" may refer to a state of direct physical contact or a state where another entity is interposed. Moreover, "connection" may not only refer to physical connection but also to "logical connection," which may indicate connection via wireless communication.

When a part is described as "including" a component, it may mean that the part may include other components unless otherwise explicitly stated.

In the specification, when a member is described as being "on" another member, it may mean that the member is in contact with the other member or that another member exists between the two.

The terms "first," "second," and so on are used to distinguish one component from another and are not intended to limit the components by these terms.

Singular expressions may include plural meanings unless otherwise explicitly stated in the context.

In each step, identification codes are used for convenience of explanation and do not indicate the order of the steps. Unless a specific order is explicitly described in the context, the steps may be performed in an order different from the stated sequence.

The operational principles and embodiments of the present disclosure will now be described with reference to the attached drawings.

In this specification, the term "electronic device" may be implemented in the form of a portable terminal, wearable terminal, or computer, but it is not limited to these forms as long as the device is capable of providing visual, auditory, and/or tactile content. Those skilled in the art will understand that the electronic device is not limited to these forms.

For example, the electronic device may, in one example, perform at least some operations of the various embodiments of the present disclosure without linkage to any external electronic device (this may be referred to as a "stand-alone type"). For instance, the electronic device may store an application for the stand-alone type and perform at least some operations of the various embodiments of the present disclosure by executing the stored application.

In another example, the electronic device may perform at least some operations of the various embodiments of the present disclosure in conjunction with another external electronic device. For instance, the electronic device may provide data to and/or receive data from a server (e.g., a web server, application server, and/or cloud server) and perform at least some operations of the various embodiments of the present disclosure based on this linkage.

Here, the computer may include, for example, devices capable of running a web browser such as a notebook, desktop, laptop, tablet PC, slate PC, or smartphone. The server may be a server that processes information by communicating with external devices, including application servers, computing servers, database servers, file servers, game servers, mail servers, proxy servers, and web servers.

The portable terminal may, for example, include any type of handheld-based device with ensured portability and mobility, such as a PCS (Personal Communication System), GSM (Global System for Mobile Communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (Wideband Code Division Multiple Access), WiBro (Wireless Broadband Internet) terminal, smartphone, or similar devices. It may also include wearable devices such as watches, rings, bracelets, anklets, necklaces, glasses, contact lenses, or head-mounted devices (HMDs). The electronic device may also be implemented as a device specifically designed for sleep induction purposes, which will be described later.

The at least one processor may include a CPU, GPU, NPU, DPU, FPGA, ASIC, and/or SoC, with no limitation on the implementation form. For example, depending on the embodiment, an operation performed by the electronic device and/or server may be executed by any one of the at least one processor (e.g., CPU, GPU, NPU, FPGA, ASIC, and/or SoC) or in collaboration with two or more processors. For example, multiple operations performed by the electronic device and/or server may be executed by any one of the at least one processor (e.g., CPU, GPU, NPU, FPGA, ASIC, and/or SoC), or some operations may be executed by one processor while others are executed by another processor. For instance, the electronic device and/or server may include at least one memory storing at least one instruction. The at least one memory may include volatile memory and/or non-volatile memory, with no limitation on the implementation form. The at least one instruction, when executed by at least one processor, may cause the electronic device and/or server to perform at least one operation (e.g., at least some of the operations performed by the electronic device and/or server as described in this disclosure). The instructions causing the execution of one or more operations by the electronic device and/or server may be stored in a single, physically independent memory or distributed across multiple memories. One or more instructions may be executed solely by a single processor or distributed and executed by two or more processors. For example, the execution of multiple operations by at least one processor may mean that a single processor individually executes all instructions causing the multiple operations, or that multiple processors collectively execute the instructions causing the multiple operations in a distributed manner. Those skilled in the art will understand this.

Meanwhile, the at least one processor may operate based on the inference of an artificial intelligence (AI) model. The AI model may be trained using training data. Such training may be performed either on the device implementing the AI according to the present disclosure or through a separate server and/or system. Examples of learning algorithms include supervised learning, unsupervised learning, semi-supervised learning, or reinforcement learning, but are not limited to these examples. The at least one processor may also operate based on specified rule-based logic.

The AI model may consist of multiple neural network layers. Each of the multiple neural network layers may have multiple weight values and perform neural network computations through operations between the computation results of the previous layer and the multiple weight values. The multiple weights of the neural network layers may be optimized based on the training results of the AI model.

For instance, during the training process, the weights may be updated to reduce or minimize the loss or cost values obtained by the AI model. The artificial neural network may include a deep neural network (DNN), and examples include CNN (Convolutional Neural Network), DNN (Deep Neural Network), RNN (Recurrent Neural Network), RBM (Restricted Boltzmann Machine), DBN (Deep Belief Network), BRDNN (Bidirectional Recurrent Deep Neural Network), or Deep Q-Networks, but are not limited to these examples.

The processor may generate a neural network, train or learn the neural network, perform computations based on received input data, generate an information signal based on the results of the computations, or retrain the neural network.

With reference to the attached drawings, the operational principles and embodiments of the present disclosure will be described.

FIG. 1A is a diagram illustrating an electronic device, a server, and an external electronic device for sleep induction according to the present disclosure.

Referring to FIG. 1A, the electronic device 100 may provide content (or referred to as "stimulus") for inducing sleep in a subject. For example, the content may include visual, auditory, and/or tactile content without limitation. Auditory and/or tactile content, which may stimulate the user's body (e.g., ears and/or sensory organs), may be referred to as "stimulus." In various embodiments of the present disclosure, the term "content" may be interchangeably used with "stimulus."

Referring to FIG. 1A, the electronic device 100 may include a communication device 110, an input device 120, an output device 130, one or more sensors 140, a memory 150, and at least one processor 190. The components of the electronic device 100 shown in FIG. 1A is not essential for implementing the electronic device 100 according to the present disclosure. Therefore, the electronic device 100 described in this specification may include more or fewer components than those listed above.

Among these components, the communication device 110 may include one or more components that enable communication with various devices equipped with communication devices. For example, it may include a wired communication device, a cellular-based wireless communication device, an IEEE 802.11-based wireless communication device (e.g., commonly referred to as Wi-Fi), a short-range communication device (e.g., Bluetooth, Bluetooth Low Energy, UWB, Zigbee, but not limited thereto), or a location information module. For instance, the electronic device 100 may transmit and/or receive data to and from the server 101 via the communication device 110. Here, the server 101 may provide data that causes the electronic device 100 to perform at least some of the operations described in various embodiments of the present disclosure. For example, if the electronic device 100 is implemented as a stand-alone type, data transmission and/or reception between the electronic device 100 and the server 101 may not be required, which will be understood by those skilled in the art. The communication device 110 may include a transceiver, a communicator, and the like.

The input device 120 is for inputting image information (or signals), audio information (or signals), data, or information entered by a user. It may include at least one camera, a touch input device 121 provided in a touchscreen, and/or at least one microphone 123, without limitation. Touch input on the touchscreen, voice data, and/or image data collected by the input device 120 may be analyzed and processed as user control commands. The input device 120 may include various input devices (inputters).

The camera processes image frames such as still images or videos obtained by the image sensor in shooting mode. The processed image frames may be displayed on the display 131 (or the screen of the electronic device 100 described in the present disclosure) or stored in the memory 150.

The microphone 123 (hereinafter referred to as "mic") processes external sound signals into electrical voice data. The processed voice data may be utilized in various ways depending on the function being performed (or the application being executed) by the device. Meanwhile, the mic may implement various noise reduction algorithms to eliminate noise generated during the process of receiving external sound signals.

The output device 130 is configured to generate outputs related to vision, hearing, or touch and may include at least one of a display 131, at least one speaker, a haptic module, or a light output device. The display 131 may form a layered structure with the touch input device 121 or be integrated to implement a touchscreen. Such a touchscreen may perform output functions and/or input functions. The output device 130 may include various output devices (outputters) for generating outputs.

The processor 190 may output content related to biometric information through the output device 130.

In an embodiment, the processor 190 may output content related to biometric data through the output device 130 based on biofeedback or bio-sonification. According to an embodiment, the electronic device 100 may identify the periodicity of specific physiological signals of the user based on the detection of activities performed by the user. Subsequently, the electronic device 100 may provide content that is substantially synchronized with the identified periodicity. From the user's perspective, they may experience content that is substantially synchronized with the periodicity of their physiological signals through activities related to the periodicity of their physiological signals, which may be referred to as biofeedback. Meanwhile, the content may be implemented as sound, and the provision of sound substantially synchronized with physiological signals through the above-described process may be referred to as bio-sonification.

For example, in perspective of biofeedback, the processor 190 may monitor the body's physiological processes in real time and provide content related to this information through the output device 130. Here, the physiological processes may include periodic physiological signals (e.g., respiration (inhale and exhale), heart rate, blood pressure) as well as non-periodic physiological signals (e.g., muscle tension, skin temperature), but are not limited thereto.

The processor 190 may provide a user interface (UI) through the output device 130 to guide the user's cognition of periodic vital signs. The processor 190 may acquire at least one user activity indicating the user's cognition of the physiological signals via the input device 120 and/or the sensor 140. The processor 190 may provide at least one piece of content corresponding to each of the at least one user activity through the output device 130. Users may experience the provided content.

By detecting user activities based on the user's cognition of their physiological signals, the periodicity of the physiological signals may be identified. This enables the provision of content that is substantially synchronized with the periodicity more accurately without performing physiological signal analysis. Additionally, since users need to recognize the periodicity of the physiological signals to perform user activities, their cognitive focus on the periodicity of the physiological signals may be improved, potentially inducing slower breathing and/or earlier sleep onset. Furthermore, the cognitive focus on the periodicity of physiological signals may be further enhanced through the content experience based on biofeedback. Moreover, other physiological signals of the user (e.g., brainwaves, without limitation) may synchronize with the periodic physiological signals. For example, if the periodic physiological signal is respiration involving inhale and exhale, the other physiological signal may be brainwaves (or a specific region of the brain) that may be synchronized through the content. As a result, the periodicity of respiration and brainwaves (or specific brain regions) may be synchronized, which may induce relatively faster sleep onset.

Meanwhile, the operations performed by the processor 190 described above may be executed by the electronic device 100 alone without any connection to the server 101 or in conjunction with the server 101. For instance, the electronic device 100 may download instructions (or code or programs) from the server 101 for displaying a UI to guide the user's cognition of physiological signals, acquiring (or identifying) at least one user activity that indicates the user's cognition of physiological signals, and displaying at least one piece of content corresponding to the at least one user activity. In this case, the electronic device 100 may execute the instructions received from the server 101 to display a UI for guiding the user's cognition of physiological signals, acquire (or identify) at least one user activity indicating the user's cognition of physiological signals, and display at least one piece of content corresponding to the at least one user activity. The electronic device 100 may temporarily store at least one instruction received from the server 101. Alternatively, the electronic device 100 may download and execute an application containing the at least one instruction from a source such as an application market, as will be understood by those skilled in the art.

For example, the electronic device 100 may receive first data from the server 101 for displaying a UI to guide the user's cognition of periodic physiological signals (vital signs). Based on the first data, the electronic device 100 may display a UI to guide the user's cognition of periodic physiological signals. For instance, the electronic device 100 may acquire at least one user activity indicating the user's cognition of physiological signals through the input device 120 and/or the sensor 140. The electronic device 100 may provide second data to the server 101 for displaying the at least one user activity indicating the user's cognition of physiological signals. Based on the second data, the server 101 may provide third data to the electronic device 100 for displaying at least one piece of content corresponding to the at least one user activity. The electronic device 100 may then display at least one piece of content corresponding to the at least one user activity based on the third data. The display 131 outputs information processed by the device 100. For example, the display 131 may present execution screen information of an application running on the device (e.g., an application) or UI (User Interface) or GUI (Graphic User Interface) information according to the execution screen.

The sensor 140 may sense at least one of information related to at least one entity included in the electronic device 100, information about the surrounding environment of the electronic device 100, or information about the user wearing (or carrying) the electronic device 100, and provide corresponding sensing signals. The processor 190 may control the operation and/or functionality of the electronic device 100 or perform data processing, functions, or operations related to applications installed on the device based on the sensing signals.

The sensor 140 may include one or more sensors, specifically, a proximity sensor, an illumination sensor, a touch sensor (which may be implemented as part of the touch input device 121 or as separate hardware, with no limitation on the implementation form), an acceleration sensor, a magnetic sensor, a gravity sensor (G-sensor), a gyroscope sensor, a motion sensor, an RGB sensor, an infrared sensor (IR sensor), a fingerprint recognition sensor (finger scan sensor), an ultrasonic sensor, an optical sensor (e.g., a camera), a microphone, an environmental sensor (e.g., barometer, hygrometer, thermometer, radiation detection sensor, heat detection sensor, or gas detection sensor, among others), or a biometric sensor (e.g., healthcare sensor, biometric recognition sensor). The device may utilize a combination of information sensed by at least two of these sensors.

The memory 150 may store at least one instruction that causes the electronic device 100 to perform various functions. The memory 150 may store data for presenting content (e.g., music files, still images, videos, etc.). The memory 150 may also store at least one application program (or application) that causes the electronic device 100 to perform operations according to various embodiments of the present disclosure, as well as data and instructions for the operation of the electronic device 100. Some of these applications may be downloaded from an external server via wireless communication. For example, the electronic device 100 may download an application and store it in the memory 150. By executing the application, the electronic device 100 may perform operations according to various embodiments of the present disclosure. Alternatively, the electronic device 100 may temporarily download data from the server 101 that causes operations to be performed according to various embodiments of the present disclosure and store this data in the memory 150.

The memory 150 may include storage media of at least one type, such as flash memory, hard disk, SSD (Solid State Disk), SDD (Silicon Disk Drive), multimedia card micro type, card-type memory (e.g., SD or XD memory), RAM (random access memory), SRAM (static random access memory), ROM (read-only memory), EEPROM (electrically erasable programmable read-only memory), PROM (programmable read-only memory), magnetic memory, magnetic disk, or optical disk. Those skilled in the art will understand that the memory 150 may also refer to cache memory for interaction with the processor 190, and/or cache memory or registers included within the processor 190. Furthermore, the memory 150 may be a database that is separate from the electronic device 100 but connected via wired or wireless communication and may also be implemented as a database system.

The processor 190 may include one or more processors and at least one core. The processor 190 may execute instructions stored in the memory 150. It may be implemented as a memory that stores data for algorithms or programs reproducing algorithms for controlling the operations of components within the electronic device 100 and at least one processor (not shown) that performs the aforementioned operations using the data stored in the memory. In this case, the memory and the processor may be implemented as separate chips or as a single chip.

In an embodiment, the electronic device 100 may provide various UIs in the form of web services based on a platform, such as websites or web applications, but is not limited thereto. Additionally, the platform may be provided in forms such as PC applications or mobile applications, but the embodiments are not limited to these examples. In this case, various user terminals may utilize the various UIs provided by the electronic device 100 based on the platform.

The external electronic device 191 may include a processor 192, a communication device 193, a memory 194, and/or a sensor 195. For example, the processor 192 of the external electronic device 191 may recognize at least one user activity for perceiving the periodicity of physiological signals based on at least one piece of data sensed by the sensor 195. The external electronic device 191 may transmit information related to the user activity (e.g., the type of user activity, the occurrence, maintenance, and/or termination of the user activity, without limitation) to the electronic device 100 via the communication device 193. Alternatively, in another implementation, the external electronic device 191 may transmit at least one sensing data (or preprocessed and/or postprocessed data) sensed by the sensor 195 to the electronic device 100. In this case, the electronic device 100 may identify at least one user activity related to the recognition of the periodicity of physiological signals based on the information related to the user activity and/or the sensed data received from the external electronic device 191. Detailed examples of the external electronic device 191 will be described later.

At least one component of the configuration shown in FIG. 1A may be added or removed corresponding to the performance of the components. Additionally, the relative positions of the components may change according to the performance or structure of the system, which will be readily understood by those skilled in the art. Meanwhile, as illustrated in FIG. 1A, the server 101 being implemented as a physical computing device is merely exemplary.

Figure 1B:
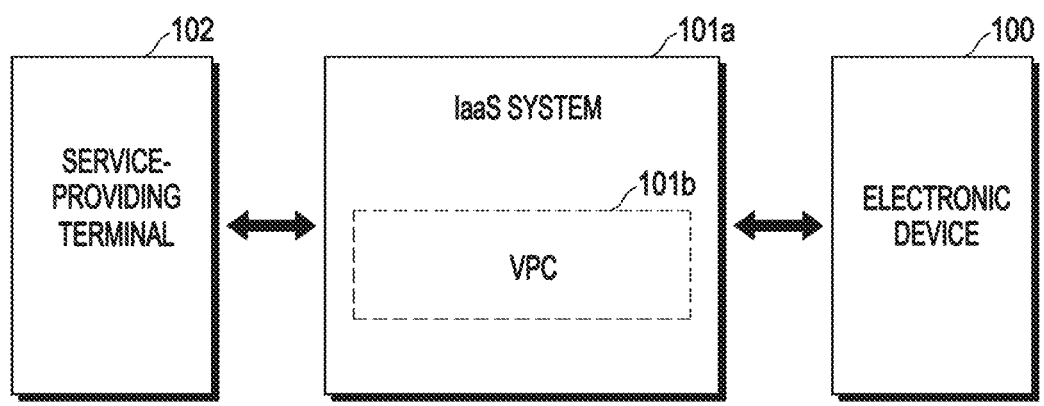
FIG. 1B is a diagram illustrating a system for providing services according to an embodiment.

FIG. 1B is a diagram illustrating a system for providing services according to an embodiment.

In one embodiment, the service-providing terminal 102 may provide data for creating a virtual private cloud (VPC) 101b to an infrastructure as a service (IaaS) system 101a. The IaaS system 101a may provide hardware resources for executing operating systems and/or programs in response to client requests. For instance, based on a request from the service-providing terminal 102, the IaaS system 101a may execute and/or create a virtual private cloud 101b for providing services (e.g., sound for sleep induction, but not limited thereto). The virtual private cloud 101b may provide data to the electronic device 100, which is described as a user terminal in this disclosure, to cause the execution of operations by the electronic device 100. The electronic device 100 may perform at least one operation to access the virtual private cloud 101b. Based on the access procedure, the virtual private cloud 101b may provide data to the electronic device 100, causing the execution of operations by the electronic device 100 as described in this disclosure.

Figure 1C:
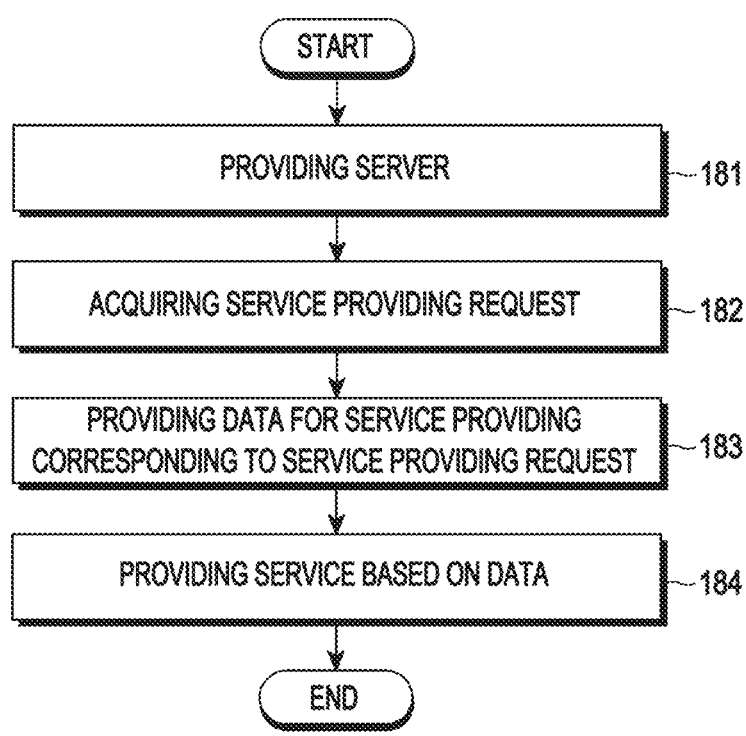
FIG. 1C is a diagram illustrating a method for providing services according to an embodiment.

FIG. 1C is a diagram illustrating a method for providing services according to an embodiment.

In one embodiment, the method may include an operation 181 of providing a server. The operation 181 of providing a server may include, for example, creating, constructing, and/or activating a physical device, such as the server 101, but is not limited thereto. Alternatively, as shown in FIG. 1B, the operation 181 of providing a server may include transmitting a request to create a virtual private cloud (VPC) 101b within the IaaS system 101a, and the creation, execution, and/or activation of the virtual private cloud 101b, but is not limited thereto.

In one embodiment, the method may include an operation 182 of obtaining a service provision request. The method may include an operation 183 of providing data for service provision corresponding to the service provision request. For instance, the electronic device 100 may perform at least one operation to access the server 101 (or the virtual private cloud 101b). For example, the server 101 (or the virtual private cloud 101b) may perform at least one operation for access as the acquisition of the service provision request and provide data for service provision to the electronic device 100. For example, after performing at least one operation for access, the server 101 (or the virtual private cloud 101b) may be implemented to further receive a service provision request from the electronic device 100. Based on receiving the service provision request, the server 101 (or the virtual private cloud 101b) may provide data for service provision to the electronic device 100.

In one embodiment, the method may involve providing services based on data.

For example, the electronic device 100 may provide the services described in this disclosure based on data received from the server 101 (or the virtual private cloud 101b), and the provided services will be described in detail later. The electronic device 100 may temporarily store the data received from the server 101 (or the virtual private cloud 101b) for service provision and then delete it. Alternatively, in another implementation, the electronic device 100 may store the data received from the server 101 (or the virtual private cloud 101b) and delete the data based on the confirmation of an additional deletion command. For instance, the electronic device 100 may provide services in a cloud-based manner or by downloading and executing an application package, with no limitation on the method of provision. If the application package is downloaded, the server 101 may be implemented as the source of the application package. However, this is merely an example, as an application market (not shown) may also be implemented as the source of the application package. The service-providing terminal 102 may generate an application package associated with instructions that cause the execution of operations described in this disclosure and/or provide the application package to a source (e.g., a server and/or application marketplace).

Figure 2:
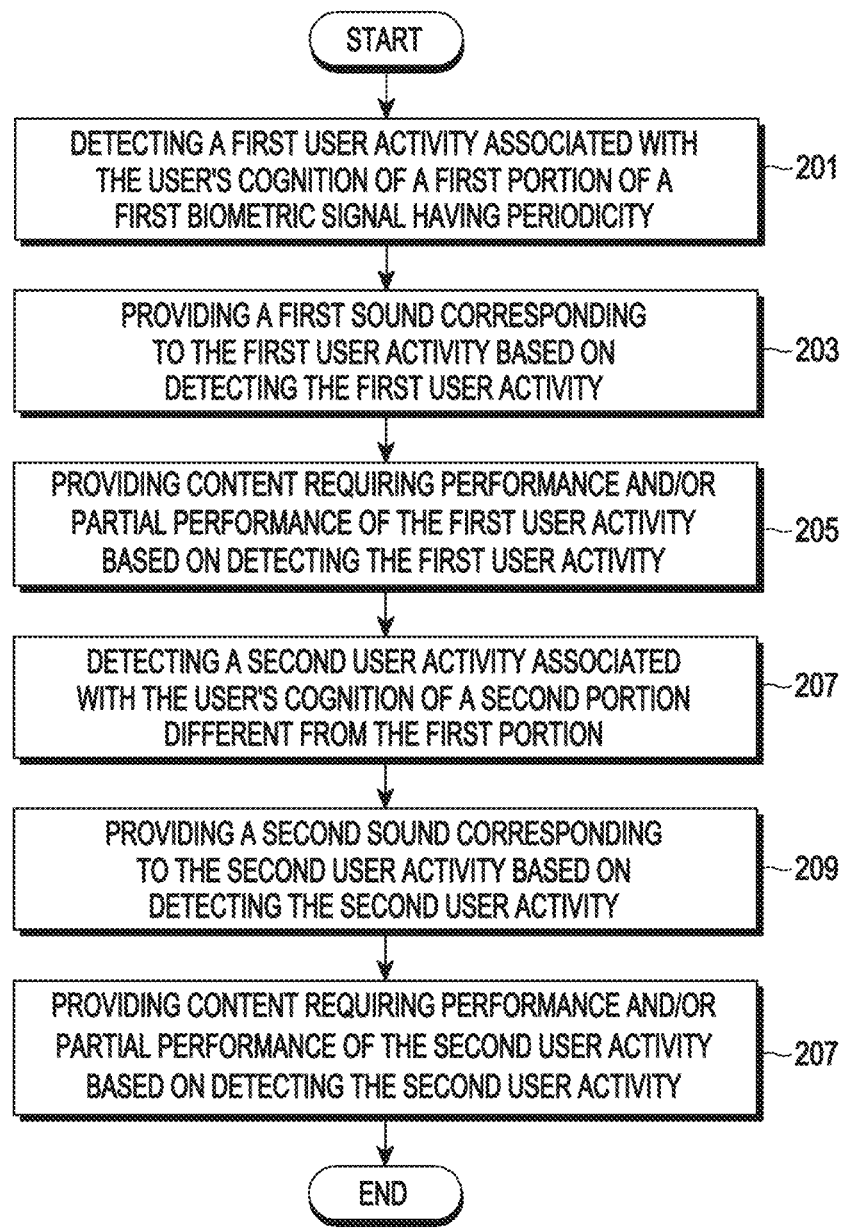
FIG. 2 is a diagram illustrating a method for providing sound according to an embodiment.
Figure 3A:
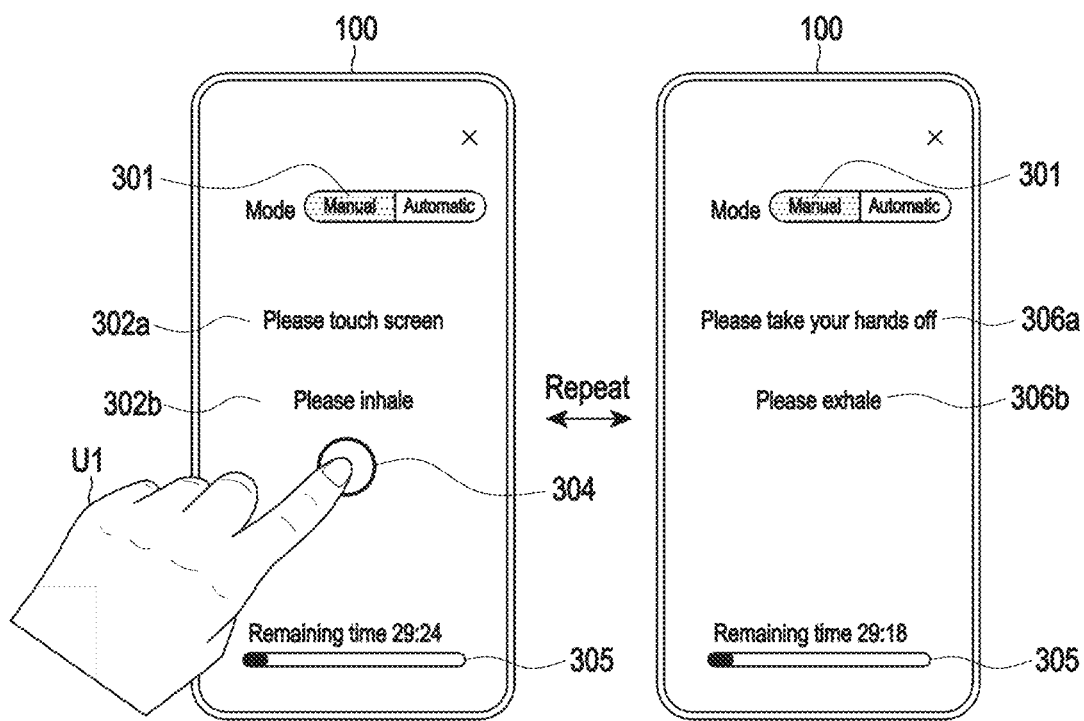
FIG. 3A is a diagram illustrating a screen provided by an electronic device according to an embodiment.

FIG. 2 is a diagram illustrating a sound provision method according to an embodiment. The embodiment of FIG. 2 will be described with reference to FIGS. 3A to 3D. FIG. 3A is a diagram illustrating a screen provided by an electronic device according to an embodiment. FIGS. 3B to 3G are diagrams illustrating user activities and sounds provided according to an embodiment.

The operations performed in FIG. 2 may be implemented such that they are performed by the electronic device 100 in conjunction with other electronic devices (e.g., the server 101 and/or the external electronic device 191) or without any such connection. This applies equally to embodiments other than those described in FIG. 2, as will be readily understood by those skilled in the art. For example, the electronic device 100 may perform at least some of the operations performed in FIG. 2 by executing pre-stored instructions (which may also be referred to as programs or applications, without limitation). The electronic device 100 may receive and store such instructions (or programs or applications) via access to an application market or a designated website, but there is no limitation on the reception pathway, as will be understood by those skilled in the art.

Alternatively, the electronic device 100 may perform at least some of the operations described in FIG. 2 based on data received from the server 101. The data received from the server 101 may be temporarily stored in the electronic device 100 and subsequently deleted, or it may remain stored until a deletion command is confirmed.

Alternatively, some of the operations described in FIG. 2 may be performed by the electronic device 100, while the remaining operations are performed by another entity (e.g., the server 101 and/or the external electronic device 191). This concept may also apply to embodiments other than those described in FIG. 2, as will be readily understood by those skilled in the art. Additionally, all the operations described in FIG. 2 may be performed by the server 101 instead of the electronic device 100. This principle similarly applies to embodiments other than those described in FIG. 2, as will be understood by those skilled in the art.

Referring to FIG. 2, the electronic device 100 may detect a first user activity associated with the user's cognition of a first portion of a periodic first physiological signal. In one example, the periodic first physiological signal may be respiration, though there is no limitation on the type or number of the first physiological signals. For instance, respiration may involve alternating repetitions of inhale and exhale actions. Accordingly, an example of the first portion of the first physiological signal may be the inhalation phase, while an example of the second portion of the first physiological signal may be the exhalation phase. The first physiological signal may have periodicity, for example, due to the repetition of its first and second portions. The duration of the first portion and the duration of the second portion may constitute one cycle of the first physiological signal. The first user activity associated with the user's cognition of the first portion of the first physiological signal may be configured to differ from the second user activity associated with the user's cognition of the second portion of the first physiological signal.

For example, the first user activity and/or the second user activity may be configured as intentional activities performed by the user that are unrelated to (or independent of, uncorrelated with, or not associated with) the first physiological signal. For instance, the first user activity may be configured as a tap-on event (e.g., an event where the user touches the touchscreen), and the second user activity may be configured as a tap-off event (e.g., an event where the user releases the touchscreen). If the first physiological signal is respiration, the act of respiration performed by the user is not associated with the tap-on/off events. In other words, tap-on/off events cannot be detected as a result of the user's natural respiratory activity, and the user must manipulate their finger independently of their breathing activity to perform the tap-on/off events. Thus, the user activity may be configured to be unrelated to the first physiological signal (or parameters influenced by the physiological signal). By performing user activities that are unrelated to the first physiological signal, the periodicity of the first physiological signal may be identified. Consequently, the periodicity identified in this manner may be more accurate than that based on parameter analysis of the physiological signal associated with the first physiological signal. Moreover, in contrast to conventional goal-oriented methods determined by systems, the voluntary performance of user activities may enhance the effectiveness of sleep induction while encouraging long-term use of the service by the user. For example, by listening to periodic sounds generated in accordance with the performance of user activities, the user may become aware of their first physiological signal (e.g., respiration). By listening to sounds that are substantially synchronized with their first physiological signal (e.g., respiration), the user's awareness (or cognition) of their first physiological signal may increase. It is well-known that awareness of one's breathing may induce a sense of relaxation. Relaxation may reduce the influence of the amygdala on orexinergic neurons, and as the activation level of orexinergic neurons decreases, the activation level of arousal systems (e.g., monoaminergic/cholinergic neurons) may also decrease. Meanwhile, the activation level of GABAergic neurons may remain relatively high, thereby enhancing the effect of sleep induction. Furthermore, as the user's awareness of their first physiological signal increases, the influence of thoughts unrelated to the first physiological signal on the amygdala may decrease, leading to a reduction in the activation level of orexinergic neurons.

Meanwhile, to enhance the sleep induction effect described above, a high level of synchronization between the periodicity of the first physiological signal and the periodicity of the sound is required. The electronic device 100 according to the embodiment may provide sound based on detecting user activities associated with the user's cognition rather than analyzing physiological signals related to respiration (e.g., thoracic movement due to inhalation and exhalation, heart rate (HR), etc.). This approach enables a higher level of synchronization. Specifically, providing sounds that are synchronized with relatively high accuracy at the start points of inhalation and exhalation is required. However, users typically breathe in a pattern of inhale-hold-exhale, which increases the likelihood of errors in accurately determining the exact start point of exhalation. The electronic device 100 according to the embodiment may improve the synchronization between physiological signals and sound by providing sounds based on the detection of user activities associated with the user's cognition, rather than analyzing physiological data related to respiration. Notably, as user activities based on the user's cognition—as described above—contribute to sleep induction, the sleep induction effect may also increase. Furthermore, even if the electronic device 100 does not include sensors for measuring physiological data associated with physiological signals, it may still provide sounds accurately synchronized with the physiological signals The electronic device 100 only needs to be equipped with simple sensors for detecting user activities (e.g., a touchscreen, pressure sensor, or switch, among others, without limitation), and there is no need to include sensors for measuring physiological signals such as EEG or ECG.

For example, the first user activity and the second user activity may each be configured as activities corresponding to the tension and relaxation, respectively, of at least part of the user's body muscles. For instance, the first user activity may be configured as a tap-on event (e.g., an event where the user touches the touchscreen), and the second user activity may be configured as a tap-off event (e.g., an event where the user releases the touchscreen). When a tap-on event occurs, pressure may be applied between the user's finger and the surface of the touchscreen, potentially causing tension in the user's finger (or the nearby muscles). Conversely, when a tap-off event occurs, the tension previously caused in the user's finger (or the nearby muscles) may be alleviated (i.e., muscle relaxation may occur). While muscle relaxation aids sleep induction, it is more effective to require the user to briefly tense their muscles and then relax them, rather than unilaterally demanding muscle relaxation. Muscle relaxation may also reduce the activation level of the arousal system initiated by the amygdala, thereby enhancing the sleep induction effect.

Meanwhile, there are no restrictions on the method of detecting the first user activity and/or the second user activity. For instance, the electronic device 100 may determine that the first user activity is detected based on confirming the occurrence of the first user activity using at least one sensing data. For example, the first user activity may be configured as a tap-on event (e.g., an event where the user touches the touchscreen), and the second user activity may be configured as a tap-off event (e.g., an event where the user releases the touchscreen). The electronic device 100 may confirm each of the tap-on and tap-off events based on sensing data (or processed results) from the touchscreen. For instance, the electronic device 100 may confirm the occurrence of the first user activity based on a single occurrence of a tap-on event. Alternatively, the electronic device 100 may confirm the occurrence of the first user activity based on the occurrence of a tap-on event exceeding a preset consecutive number of times (or occurring for longer than a preset duration). It should be understood by those skilled in the art that this may also be expressed as the electronic device 100 confirming the maintenance of the first user activity.

The electronic device 100 may confirm the occurrence of the second user activity based on the detection of an event corresponding to the second user activity (e.g., a tap-off event). However, this is merely illustrative. The electronic device 100 may also confirm the detection of the second user activity based on the interruption of an event corresponding to the first user activity (e.g., a tap-on event), failure to detect it, failure to meet detection conditions, or detection of non-occurrence.

In operation 203, the electronic device 100 may provide a first sound (also referred to as auditory content, auditory stimulus, or auditory feedback) corresponding to the first user activity based on the detection of the first user activity. Alternatively, the sound may be referred to as physical feedback because it vibrates the eardrum inside the user's ear and/or causes entrainment of at least part of the user's body. The details of the first sound will be described with reference to FIGS. 3B through 3E. Meanwhile, the provision of the first sound and/or the second sound may include, for example, output of the first sound and/or the second sound through a speaker included in the electronic device 100 or transmission of data for sound output to an external device connected to the electronic device 100 either by wire or wirelessly. The external device may include, but is not limited to, wired earphones, wireless earphones, wired speakers, wireless speakers, or wireless content-providing devices, as will be understood by those skilled in the art.

The electronic device 100, in operation 205, may provide content requesting the execution and/or partial execution of the first user activity based on the detection of the first user activity. For example, referring to FIG. 3A, the electronic device 100 may present, as content, a first object 302a requesting the execution of the first user activity (e.g., a tap-on event) and/or a second object 302b requesting the execution of the first part (e.g., inhalation). The electronic device 100 may confirm that the first user activity will occur based on a touch 304 performed by the user. Meanwhile, the electronic device 100 may also present a toggler 301 indicating the current operation mode and/or a progress bar 305 indicating the remaining time of the program. However, these are merely illustrative and not limiting. The operation mode may include a manual mode, in which sounds are provided based on the detection of user activities, and an automatic mode, in which sounds are provided at specified intervals regardless of the detection of user activities. These modes will be described in greater detail later. Although not shown, the electronic device 100 may provide the first sound corresponding to the first user activity based on the detection of the first user activity (or the detection of maintaining the first user activity).

Meanwhile, part of the period during which the content requesting the execution of the first user activity and/or the first part is provided may overlap with part of the period during which the first sound is provided. However, this is merely illustrative. The entire period of content provision may overlap with the entire period of the first sound provision, or the entire period of the first sound provision may overlap with the entire period of content provision. Alternatively, the content provision period and the first sound provision period may be implemented so that they do not overlap, as will be understood by those skilled in the art. Depending on the implementation, the electronic device 100 may be configured to repeat the provision of the first sound according to the accumulation of the detection of the first user activity while ceasing the provision of the content.

In the embodiment of FIG. 2, it was described that content requesting the execution of the first user activity and/or the first part is provided, triggered by the detection of the first user activity, and that content requesting the execution of the second user activity and/or the second part is provided, triggered by the detection of the second user activity. However, this is merely illustrative.

In another example, the content requesting the execution of the first user activity and/or the first part may be provided, triggered not by the detection timing of the first user activity but by the passage of a predetermined time after the detection of the first user activity. In this case, the provision of content requesting the execution of the first user activity and/or the first part may commence while the first sound is being provided after the detection timing of the first user activity. The content requesting the execution of the second user activity and/or the second part may be provided, triggered not by the detection timing of the second user activity but by the passage of a predetermined time after the detection of the second user activity. In this case, the provision of content requesting the execution of the second user activity and/or the second part may commence while the second sound is being provided after the detection timing of the second user activity.

In another example, content requesting the execution of the first user activity and/or the first part may be provided, triggered by the detection of the second user activity. In this case, the provision of content requesting the execution of the first user activity and/or the first part may commence at the timing of the provision of the second sound (or while the second sound is being provided) after the detection timing of the second user activity.

Content requesting the execution of the second user activity and/or the second part may be provided, triggered by the detection of the first user activity. In this case, the provision of content requesting the execution of the second user activity and/or the second part may commence at the timing of the provision of the first sound (or while the first sound is being provided) after the detection timing of the first user activity.

The electronic device 100, in operation 207, may detect a second user activity related to the user's recognition of a second portion of the first physiological sign, for example, exhalation, which is different from the first portion. In operation 209, based on the detection of the second user activity, the electronic device 100 may provide a second sound (also referred to as auditory content or auditory stimulation) corresponding to the second user activity. The details of the second sound are described with reference to FIGS. 3B to 3B. In operation 211, based on the detection of the second user activity, the electronic device 100 may provide content that requests the performance of the second user activity and/or the second portion. For example, referring to FIG. 3A, the electronic device 100 may present, as content, a third object 306a requesting the performance of the second user activity, for example, a tap-off event, and/or a fourth object 306b requesting the performance of the second portion, for example, exhalation. The electronic device 100 may determine that the second user activity is likely to occur based on the release of a touch 304 by the user. Meanwhile, although not shown, based on the detection of the second user activity (or the detection of the maintenance of the second user activity), the electronic device 100 may provide the second sound corresponding to the second user activity.

Meanwhile, the duration of the content that requests the performance of the second user activity and/or the second portion may partially overlap with, for example, the duration of the second sound being provided, but this is merely exemplary. The entire duration of the content provision may overlap with the duration of the second sound provision, the entire duration of the second sound provision may overlap with the duration of the content provision, or the durations of the content provision and the second sound provision may not overlap at all, as would be understood by a person skilled in the art. Depending on the implementation, the electronic device 100 may be configured to repeat the provision of the second sound based on the accumulation of second user activity detections while discontinuing the provision of the content. For example, until the cumulative number of alternating detections of the first user activity and the second user activity reaches N times (where N is a natural number of 1 or more), the electronic device 100 may alternately provide both the first sound and the second sound along with alternately providing both types of content. However, if the cumulative number of alternating detections of the user activities exceeds N times, the electronic device 100 may be configured to alternately provide the first sound and the second sound while discontinuing the alternate provision of the content.

In another implementation, the electronic device 100 may provide the content requesting the performance of user activities and/or portions of the first physiological signal prior to the provision of the sounds and then discontinue such content provision.

The provision of the first sound and the second sound may be performed through a speaker embedded in the electronic device 100 or through an external output device (e.g., wired/wireless earphones or a Bluetooth speaker) operatively connected to the electronic device 100. Accordingly, the provision of the first sound and the second sound may include the output of the sound and/or the provision of data for output to the external output device, as would be understood by a person skilled in the art.

Figure 3B:
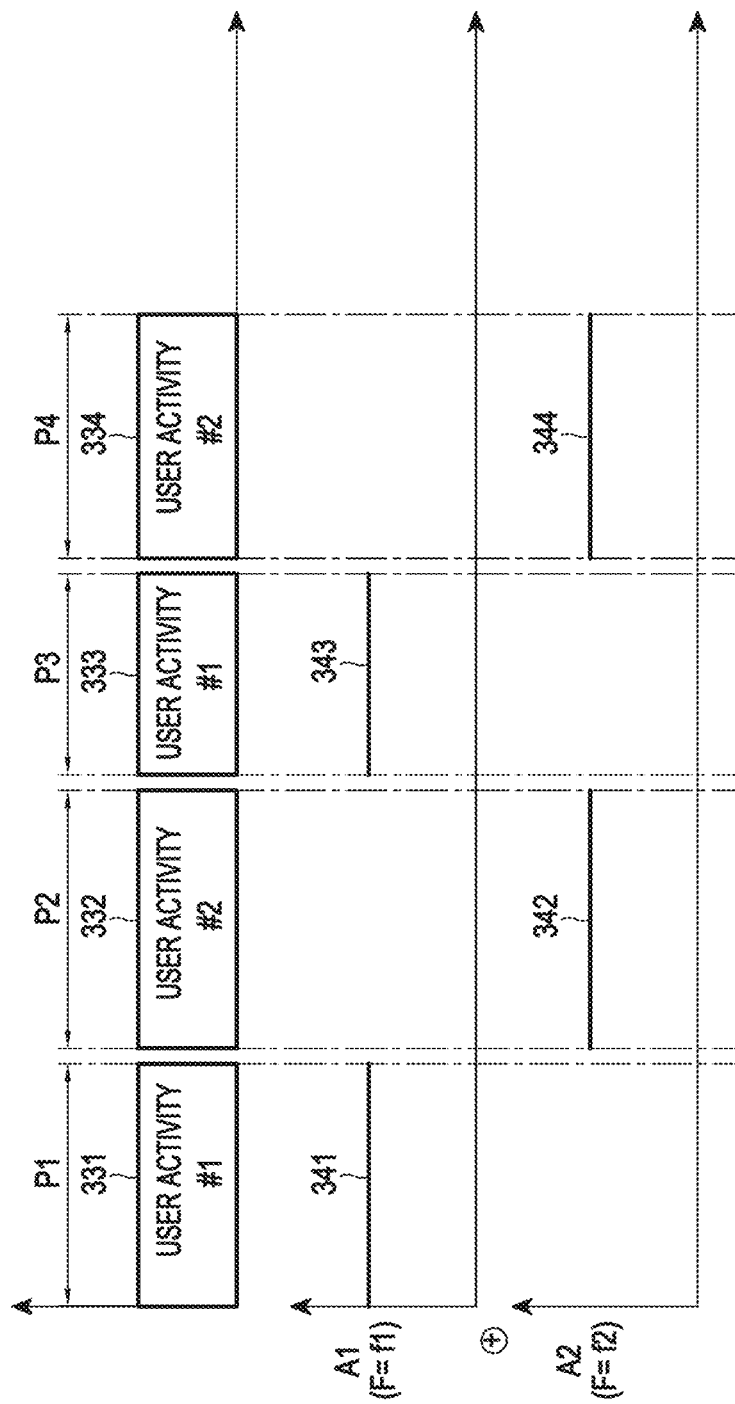
FIGS. 3B, 3C, 3D, 3E, and 3F are diagrams illustrating user activities and provided sounds according to an embodiment.

Referring to FIG. 3B, the electronic device 100 may alternately provide the first sound 341, 343 and the second sound 342, 344. For example, the electronic device 100 may identify the occurrence (or maintenance) of the first user activity 331 during the first period P1. Based on the occurrence (or maintenance) of the first user activity 331, the electronic device 100 may provide the first sound 341 corresponding to the first user activity 331. In the example illustrated in FIG. 3B, the first sound 341 may be a sound with a constant amplitude (e.g., A1) and a single frequency (e.g., f1), but this is merely exemplary and not limiting. The first sound 341 may also be a composite sound of sub-sounds with multiple frequencies. Although not illustrated, at least one additional sound may be provided simultaneously with at least part of the first sound 341, details regarding this will be described later. The first sound 341 may be expressed as a sound with musical tones, such as instrumental sounds, electronic sounds, MIDI sounds, or special effect sounds, but it is not limited thereto. For example, the sound 341 may be a sound mimicking natural sounds or human breathing sounds (e.g., a sound mimicking breathing based on the user's or another person's voice), with no limitation on the type of sound. For instance, the electronic device 100 may provide a breathing sound based on the user's voice, generated using features of the user's recorded or otherwise obtained voice. The electronic device 100 may provide a sound mimicking the user's inhalation based on the detection (or maintenance) of the first user activity and a sound mimicking the user's exhalation based on the detection (or maintenance) of the second user activity. Alternatively, the electronic device 100 may provide a sound mimicking the inhalation of another person based on the detection (or maintenance) of the first user activity and a sound mimicking the exhalation of another person based on the detection (or maintenance) of the second user activity. The "other person" could be, for example, a family member, acquaintance, or celebrity, without limitation. The sound may be expressed to include binaural beats, and the frequency corresponding to the binaural beats may be a frequency suitable for sleep induction, but this is not limiting. Additionally, the electronic device 100 may provide additional sounds (e.g., natural sounds or white noise, but not limited thereto) together with the main sound.

In the example of FIG. 3b, the electronic device 100 may, for instance, stop providing the first sound 341 based on the cessation of the first user activity 331), although the trigger for stopping the provision of the first sound 341 is not limited. For example, the detection of the second user activity 332 could serve as a trigger to stop providing the first sound 341. Meanwhile, the cessation of the first sound 341 may, for example, refer to the immediate termination of the output of the first sound 341 or the application of an ending effect (e.g., a fade-out effect), as would be understood by a person skilled in the art. For instance, the provision timing of the first sound 341 may be substantially synchronized with the detection timing of the first user activity 331. Similarly, the cessation timing of the first sound 341 may be substantially synchronized with the timing of the cessation trigger (e.g., the detection failure of the first user activity 331 or the detection of the second user activity 332), or it may not be substantially synchronized.

Meanwhile, the electronic device 100 may identify the occurrence (or maintenance) of the second user activity 332 during the second period P2. The electronic device 100 may provide the second sound 342 corresponding to the second user activity 332 based on the occurrence (or maintenance) of the second user activity 332. In the example of FIG. 3b, the second sound 342 may have a constant amplitude (e.g., A2) and a single frequency (e.g., f2), but this is illustrative and not limiting. For example, the amplitude of the second sound 342 may change, and/or its frequency may vary, without any limitations on its waveform. The characteristics of the second sound 342 (e.g., amplitude and/or frequency, without limitation) may be identical to or at least partially different from those of the first sound 341. The electronic device 100 may stop providing the second sound 342 based on the cessation of the second user activity 332, but there are no limitations on the trigger for stopping the provision of the second sound 342. In FIG. 3b, the first sound 341 and the second sound 342 are represented along separate coordinate axes for clarity, however, a person skilled in the art would understand that the electronic device 100 provides the sounds represented on both axes sequentially in time. Furthermore, the "+" symbol in FIG. 3b may indicate the synthesis of independent sounds 341, 342, 343, 344, but it is not limited to this interpretation. In one example, the electronic device 100 may play the first sounds 341, 343 corresponding to the first user activities 331, 333 using one player (or based on a single audio playback function) and play the second sounds 342, 344 corresponding to the second user activities 332, 334 using another player (or based on a separate audio playback function). In this case, the electronic device 100 may independently execute each sound corresponding to each activity based on the execution of multiple players (or multiple audio playback function calls). As will be described in more detail later, the electronic device 100 may, based on multiple players (or multiple function calls), play sounds corresponding to both activities concurrently during certain segments. This is merely illustrative, as the electronic device 100 may also play sounds corresponding to both activities using a single player (or a single audio playback function call).

The electronic device 100 may subsequently and repeatedly identify the occurrence (or maintenance) of the first user activity 333 and provide the corresponding first sound 343, as well as identify the occurrence (or maintenance) of the second user activity 334 and provide the corresponding second sound 344. The attributes of the first sound 343 corresponding to the first user activity 333 may be identical to or at least partially different from the first sound 341 corresponding to the first user activity 331 in the previous cycle. Similarly, the attributes of the second sound 344 corresponding to the second user activity 334 may be identical to or at least partially different from the second sound 342 corresponding to the second user activity 332 in the previous cycle.

Figure 3C:
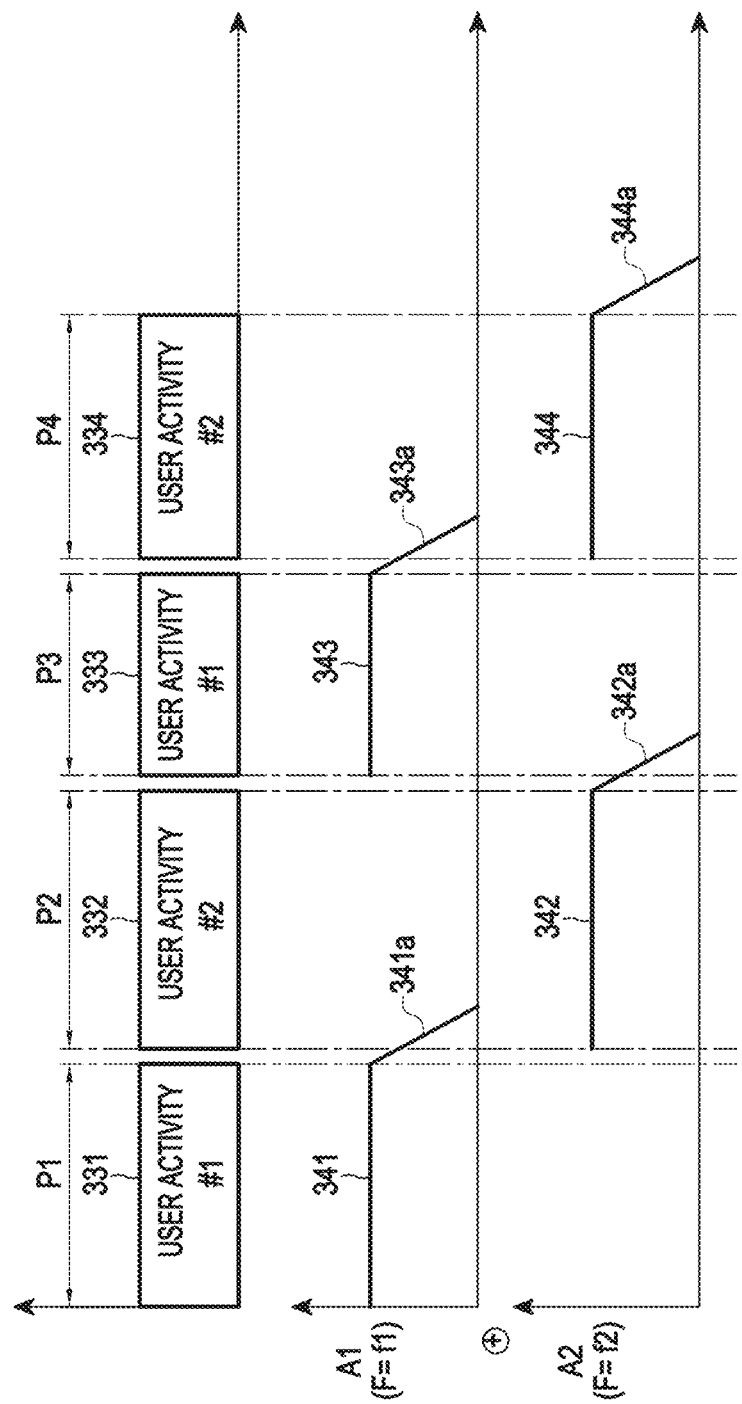

Referring to FIG. 3c, in contrast to FIG. 3b, the electronic device 100 may provide the first sound 341a with an applied termination effect based on identifying the termination (or failure) of the detection of the first user activity 331 while providing the first sound 341. In one example, the first sound 341a with the applied termination effect may include an effect where the amplitude decreases over time (e.g., referred to as a fade-out), but the type and/or number of termination effects are not limited. Meanwhile, the termination (or failure) of the detection of the first user activity 331 is merely an example trigger for applying the termination effect. In another example, the electronic device 100 may apply the termination effect to provide the first sound 341a triggered not by the termination of detection of the first user activity 331 but by the detection of the second user activity 332. Alternatively, a designated time lapse may also serve as a trigger for applying the termination effect.

As described above, the electronic device 100 may provide each of the sounds with applied termination effects (e.g., 341a, 341b, 341c, 341d) based on identifying triggers for termination effects, which may be implemented in various ways. As also mentioned, at least part of a sound with an applied termination effect (e.g., the first sound 341a) may overlap with at least part of a sound without a termination effect (e.g., the second sound 342). For instance, as previously explained, the electronic device 100 may independently provide each sound corresponding to multiple activities by executing multiple players (or invoking multiple sound playback functions). Consequently, at least part of the sound with a termination effect (e.g., the first sound 341a) and at least part of the sound without a termination effect (e.g., the second sound 342) may be played simultaneously by respective players. The results of this playback may then be output together through an audio output device, such as a speaker. Meanwhile, this is merely an example, and the electronic device 100 may alternatively play the result corresponding to a combination of both sounds by executing a single player (or invoking a single function), without limitation. Furthermore, the termination effect, provided here for convenience of explanation, may involve portions of sound that are pre-stored and designated with specific waveforms for termination effects or may be generated by applying specific effects to pre-stored sounds. The manner of implementing and expressing these effects is not restricted.

In FIG. 3C, the detection start time of the first user activity 331 may be substantially synchronized with the start time of the first sound 341. Additionally, the detection end time of the first user activity 331 (or the detection start time of the second user activity 332) may be substantially synchronized with the start time of the termination effect of the first sound 341.

Based on the asymmetrical synchronization of the aforementioned start and end times, the user's slow breathing may be induced. Through the synchronization of the start time, the user's neurons, brain waves, and/or attention may be synchronized with the sound. Consequently, the user may also become synchronized with the termination effect, leading to progressively slower breathing. Slow breathing activates the parasympathetic nervous system, which, in turn, enhances the sleep-inducing effect due to its activation. Furthermore, slow breathing may induce hyperpolarization, thereby amplifying the sleep-inducing effect. Additionally, as slow breathing reduces the influence on the amygdala, the likelihood of activation of the arousal system originating from the amygdala, as described above, may decrease, further enhancing the sleep-inducing effect.

Figure 3D:
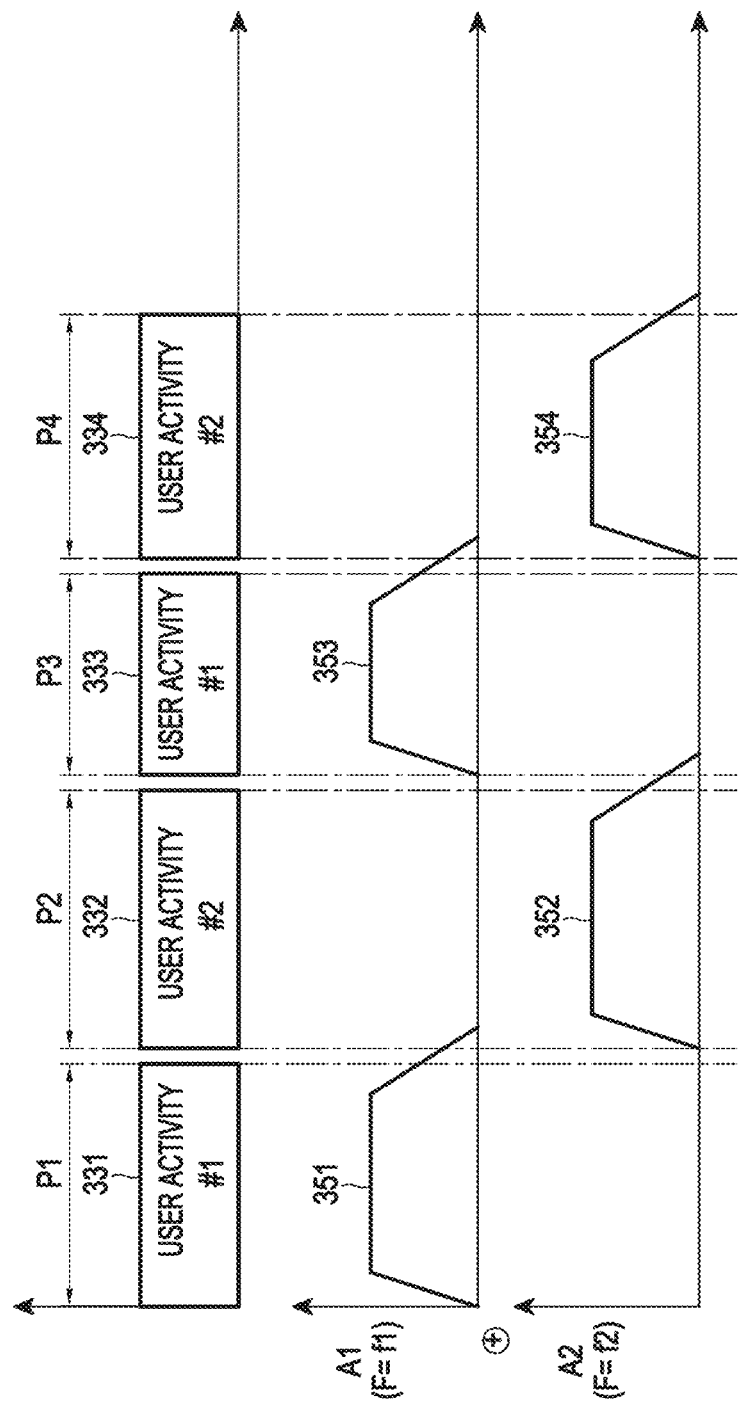

Referring to FIG. 3D, the first sound 351, corresponding to the first user activity 331, and the second sound 352, corresponding to the second user activity 332, may be provided. Unlike the example in FIG. 3B, where the first sound 341 maintains a substantially constant amplitude, the first sound 351 in FIG. 3D may change over time, consisting of a portion where the amplitude increases, a portion where the amplitude remains constant, and a portion where the amplitude decreases. Furthermore, the provision of sounds 351, 352, 353, 354 may continue even after the termination of the corresponding user activities 331, 332, 333, 334. For example, the detection (or confirmation) time of the user activities 331, 332, 333, 334 may be substantially synchronized with the start time of the sounds 351, 352, 353, 354, but the end time of the provision of sounds 351, 352, 353, 354 may differ from the detection termination time (or release time) of the user activities 331, 332, 333, 334. As a result, there may be instances where sound 351 and sound 352 overlap, or the synthesized result of sounds 351 and 352 is provided. If the frequencies of sounds 351 and 352 differ, portions of these sounds with different frequencies may be provided simultaneously. As described above, users may experience sounds synchronized at the start time, perceiving these sounds as self-generated rather than system-induced, which may enhance the neural entrainment effect relative to the user's breathing frequency. Additionally, differing end times may encourage the user to perform longer and slower breathing. As noted, slower breathing is effective for inducing sleep, thereby enhancing the sleep-inducing effect for the user. In particular, the reduction in amplitude during the final portion of sounds 351, 352, 353, 354 allows for the inducement of slower breathing without disrupting the entrainment effect, further contributing to the sleep-inducing process.

Figure 3E:
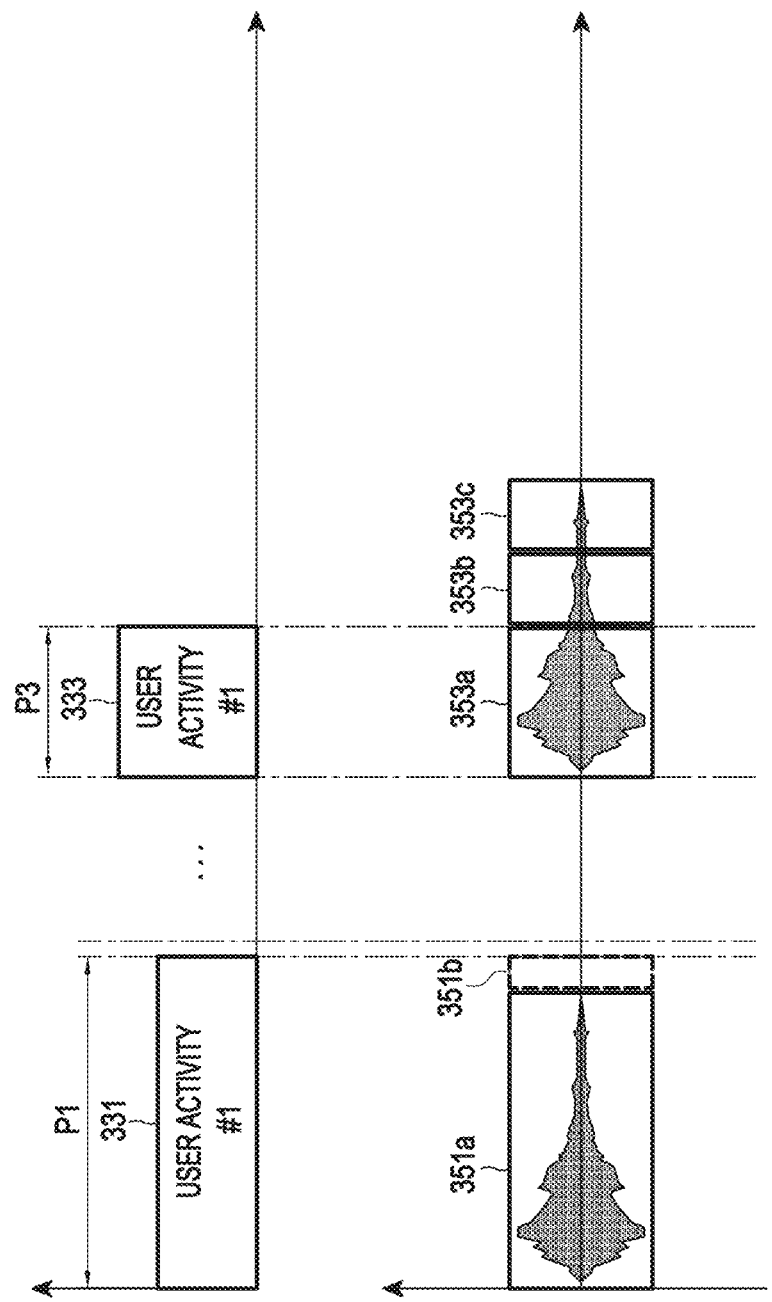

Referring to FIG. 3E, the electronic device 100 may provide a sound 351a corresponding to the first user activity 331, where the sound 351a has a waveform. The waveform of the sound 351a may, for example, involve an increasing amplitude followed by a decreasing amplitude, but there is no limitation on the waveform. At least one characteristic of the waveform (or envelope), such as attack, decay, sustain, or release, may be implemented to correspond to breathing characteristics, although this is merely exemplary and not limiting. Attack represents the time for the sound to reach its maximum level after being initially generated, during which the sound increases sharply, determining how the sound begins. Decay refers to the time it takes for the sound to decrease from the maximum level to the sustain level, during which the sound gradually diminishes to reach the sustain level. Sustain indicates the duration during which the sound is maintained at a steady level. Release represents the time for the sound to fade away naturally after the user ceases input, during which the sound gradually decreases. Breathing characteristics may include, for example, movements of the thorax during breathing or airflow through the respiratory organs (e.g., the nose, though not limited to this). These characteristics may also involve derivative or integral values of the airflow, though there are no restrictions on processing methods, types, or quantities of characteristics. The sound 351a may consist of a first part (or initial phase) with increasing amplitude and a second part (or later phase) with decreasing amplitude, but there is no limitation on the waveform of sound 351a. For instance, the sound 351a may have a specified playback duration, which may be a fixed value or a value that varies depending on cumulative counts. Accordingly, if the first user activity 331 is detected beyond the playback duration of the sound 351a, the provision of sound 351a may cease during the remaining portion 351b. However, this is merely exemplary, as it may also be implemented to provide a sound corresponding to the reverberation of sound 351a during the remaining portion 351b, without limitations on the types of sounds playable in the remaining portion. Meanwhile, the duration (P3) of the first user activity 333 may be shorter than the specified playback duration. The electronic device 100 may confirm the interruption of the detection of the first user activity 333 while providing the first part 353a of the sound with a specified waveform. Based on the confirmation of the detection interruption of the first user activity 333, the electronic device 100 may apply an ending effect (e.g., a fade-out effect, though not limited to this) to the second part 353b of the sound and provide it. The duration of the applied ending effect may be predetermined, and the third part 353c of the sound may not be provided after the ending effect duration has elapsed.

Figure 3F:
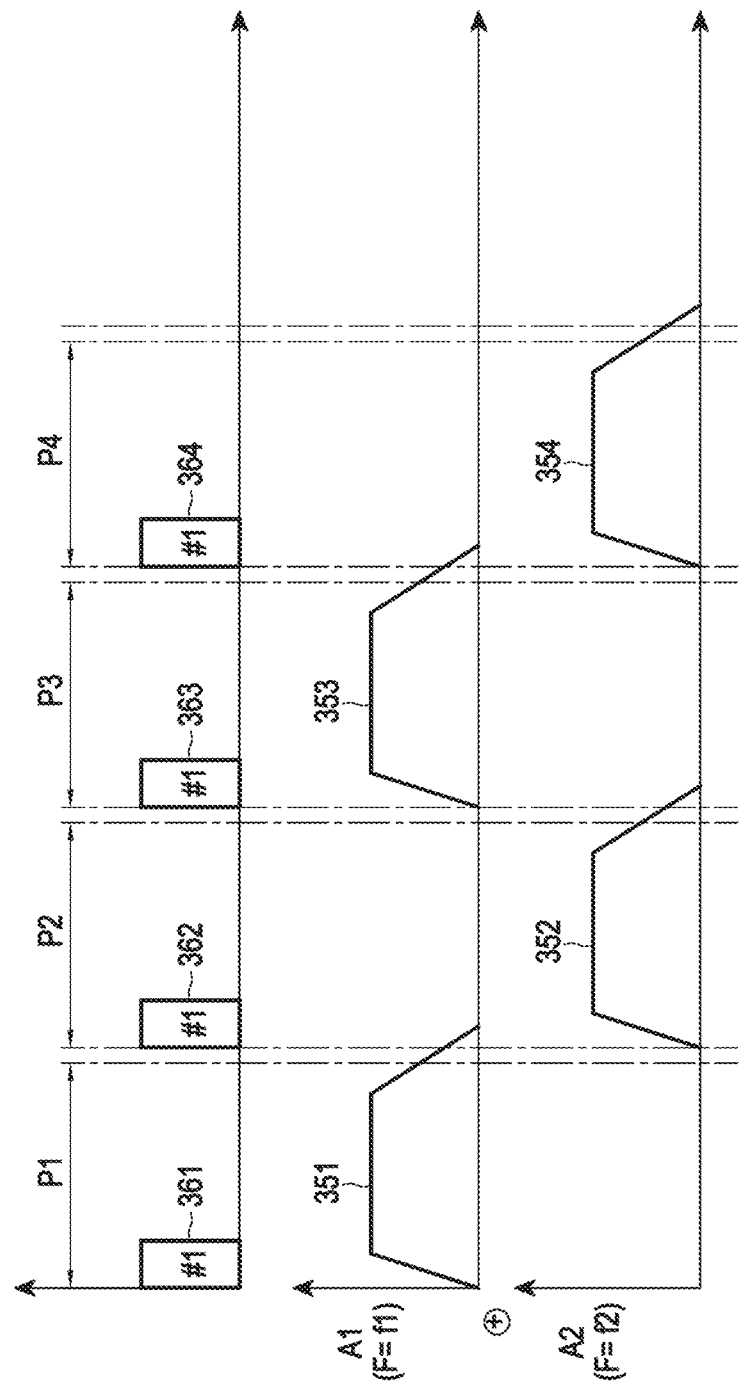

In FIG. 3F, the electronic device 100 may provide a first sound 351 based on the detection of a first user activity 361 associated with the user's recognition of the first part of the first biological signal (e.g., the inhalation phase of breathing). The electronic device 100 may also provide a second sound 352 based on the detection of a second user activity 362 associated with the user's recognition of the second part of the first biological signal (e.g., the exhalation phase of breathing). For example, even if the first user activity 361 is not maintained, the electronic device 100 may provide the first sound 351 based on the detection of the first user activity 361. Similarly, the electronic device 100 may provide each sound 352, 353, 354 based on the detection of each corresponding user activity 362, 363, 364. Meanwhile, although each sound 351, 352, 353, 354 is shown with an amplitude that decreases over a specified time period, this is merely exemplary. For instance, it is understood that the amplitude of the first sound 351 corresponding to the first user activity 361 may decrease when triggered by the detection of another activity, such as the second user activity 362. In another example, each sound may be implemented to have a specified waveform. For instance, based on the detection of each user activity 361, 362, 363, 364, sounds 351, 352, 353, 354 with fixed playback durations may be provided. This implementation may also apply to other embodiments.

Figure 3G:
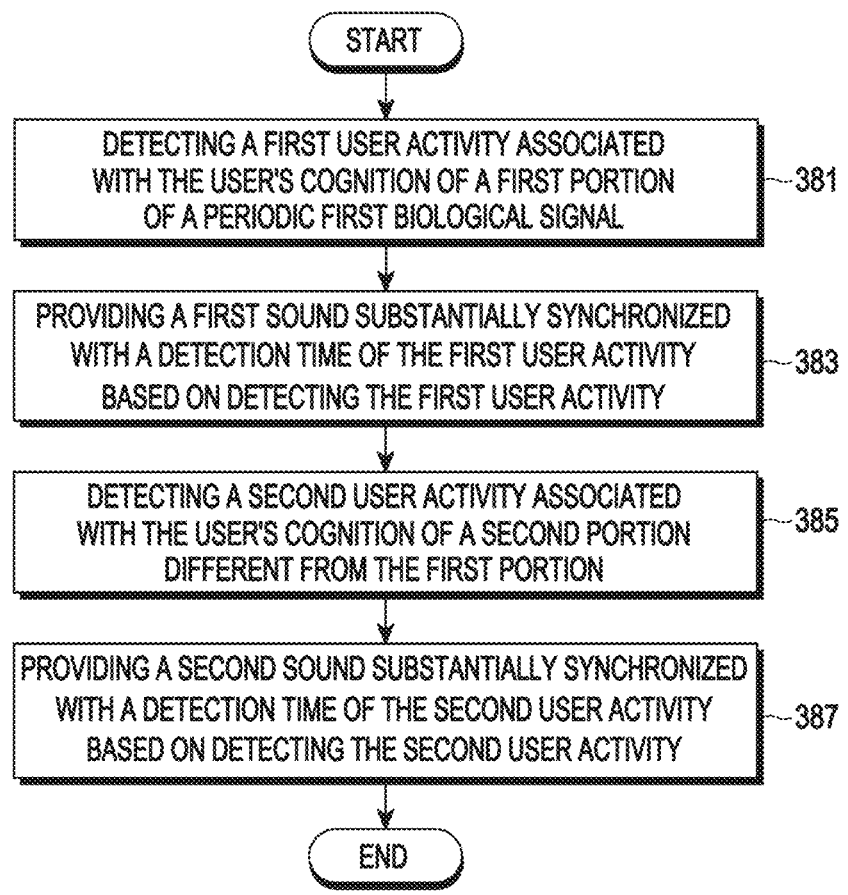
FIG. 3G is a diagram illustrating a method for providing sound according to an embodiment.

FIG. 3G illustrates a method for providing sounds according to an embodiment. In this embodiment, the electronic device 100, in operation 381, may detect a first user activity associated with the user's recognition of the first part of a periodic first biological signal. In operation 383, the electronic device 100 may provide a first sound synchronized with the detection time of the first user activity based on the detection of the first user activity. In operation 385, the electronic device 100 may detect a second user activity associated with the user's recognition of a second part different from the first part. In operation 387, the electronic device 100 may provide a second sound synchronized with the detection time of the second user activity based on the detection of the second user activity. In the embodiment illustrated in FIG. 3G, the electronic device 100 may refrain from providing any content related to the input of user activities and/or the execution of parts of the first biological signal. For example, even if the electronic device 100 includes a display, such as in the case of a smartphone, it may be implemented to avoid providing content. Alternatively, the electronic device 100 may be implemented to include sensors for detecting user activities and speakers for providing sounds, but exclude a display. In this case, the electronic device 100 may provide sounds synchronized with each detection time of the user activities and may be implemented to refrain from providing content.

The electronic device 100 may repeat the operation of providing a first sound based on the detection of a first user activity associated with the user's recognition of the first part of a first biological signal, and the operation of providing a second sound based on the detection of a second user activity associated with the user's recognition of the second part of the first biological signal. For example, the user may perform the first user activity, then perform the second user activity, and subsequently repeat performing the first and second user activities. The electronic device 100 may repeatedly provide the first sound and the second sound in response to the repeated detection of the first and second user activities. Meanwhile, for instance, the attributes of the first sound provided during the first instance of the first sound (e.g., 351 in FIG. 3F), such as volume, waveform, frequency, or timbre, may differ from the attributes of the first sound provided during the second instance (e.g., 353 in FIG. 3F). In this disclosure, the first sound may refer to a sound provided in response to the detection of the first user activity, and the second sound may refer to a sound provided in response to the detection of the second user activity. Thus, the repetition of providing the first sound may include not only the repetitive provision of the same audio source but also providing audio with modified attributes and/or providing different audio sources. Similarly, the repetition of providing the second sound may include not only the repetitive provision of the same audio source but also providing audio with modified attributes and/or providing different audio sources.

Figure 3H:
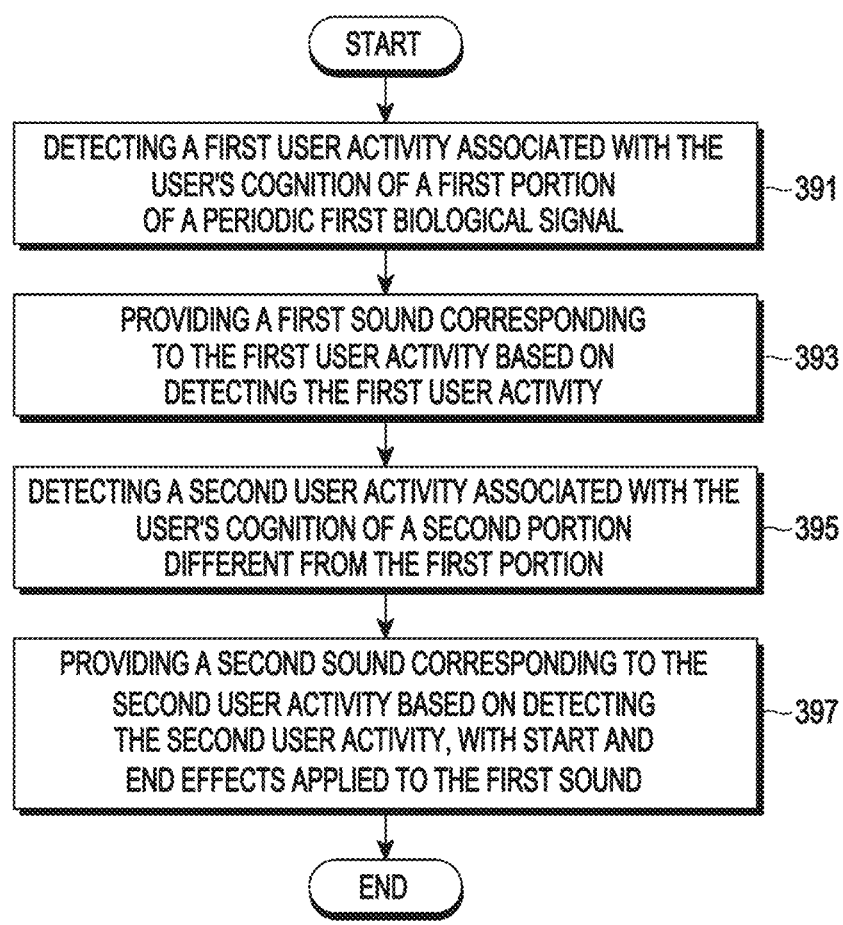
FIG. 3H is a diagram illustrating a method for providing sound according to an embodiment.

FIG. 3H illustrates a sound provision method according to an exemplary embodiment.

According to one embodiment, the electronic device 100 may, in operation 391, detect a first user activity associated with the user's recognition of a first part of a periodic first biological signal. In operation 393, the electronic device 100 may provide a first sound corresponding to the first user activity based on the detection of the first user activity. In operation 395, the electronic device 100 may detect a second user activity associated with the user's recognition of a second part, which is different from the first part, of the first biological signal. In operation 397, the electronic device 100 may initiate the provision of a second sound corresponding to the detection of the second user activity and provide the first sound with an applied termination effect. Accordingly, the termination effect and the second sound may overlap at least partially until the provision of the first sound is fully completed. The termination effect may, for instance, be an effect in which the amplitude gradually decreases, such as a fade-out, but it is not limited to this example. Meanwhile, the application of the termination effect may not only refer to directly applying the effect to a predefined waveform but also include providing a predefined waveform with the termination effect, such as the aforementioned fade-out, as would be understood by those skilled in the art.

Figure 3I:
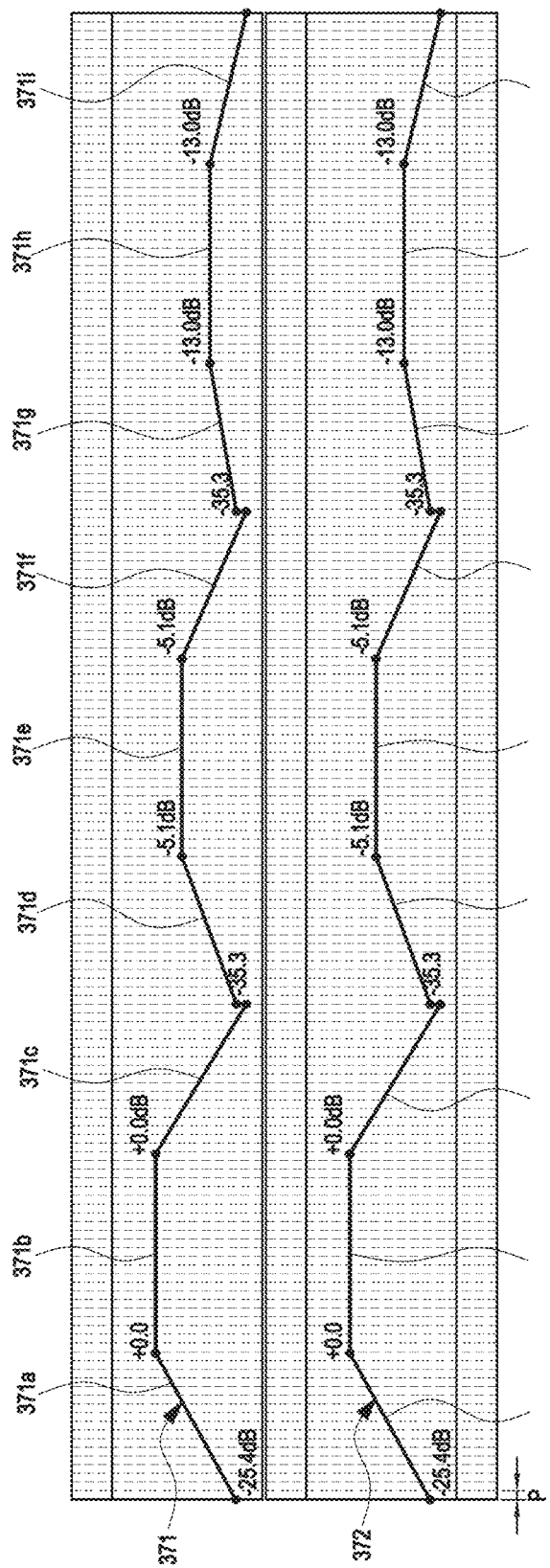
FIG. 3I is a diagram illustrating changes in sound attributes based on the cumulative number of detections according to an embodiment.

FIG. 3I illustrates changes in sound properties according to the cumulative detection count, based on an exemplary embodiment.

Referring to FIG. 3I, the period "P" may indicate the duration during which a sound is provided once in response to the detection of a user activity.

For example, the amplitude of a sound 371 corresponding to the first part of a biological signal (e.g., inhalation) and/or the amplitude of a sound 372 corresponding to the second part (e.g., exhalation) may change as the cumulative count of sound provision increases. For instance, the amplitude of the first portion 371a of sound 371 and/or the first portion 372a of sound 372 may increase as the cumulative count increases. Similarly, the amplitude of the second portion 371b of sound 371 and/or the second portion 372b of sound 372 may remain constant regardless of the cumulative count increase. For the third portion 371c of sound 371 and/or the third portion 372c of sound 372, the amplitude may decrease as the cumulative count increases. In another example, the amplitude of the fourth portion 371d of sound 371 and/or the fourth portion 372d of sound 372 may increase as the cumulative count increases. For the fifth portion 371 of sound 371 and/or the fifth portion 372e of sound 372, the amplitude may remain constant irrespective of the cumulative count increase. Similarly, the sixth portion 371f of sound 371 and/or the sixth portion 372f of sound 372 may have a decreasing amplitude as the cumulative count increases. The seventh portion 371g of sound 371 and/or the seventh portion 372g of sound 372 may have an increasing amplitude with cumulative count increases, while the eighth portion 371h of sound 371 and/or the eighth portion 372h of sound 372 may remain constant. Finally, the ninth portion 371i of sound 371 and/or the ninth portion 372i of sound 372 may exhibit a decreasing amplitude as the cumulative count increases. The amplitude of the second portions 371b, 372b may be greater than that of the fifth portions 371, 372e, and the amplitude of the fifth portions 371, 372e may be greater than that of the eighth portions 371h, 372h. Consequently, the maximum amplitude of the sounds experienced by the user may gradually decrease with an increase in cumulative count. This may simulate the effect of the sound source moving farther away from the user, thereby enhancing the sleep induction effect.

Meanwhile, the properties changing with the cumulative count increase are not limited to amplitude. For example, the frequency of the sound may change with the cumulative count. When a sound comprises multiple sub-sounds, the amplitude of at least some sub-sounds may change with cumulative count increases. Similarly, the frequency of at least some sub-sounds may change with cumulative count increases, altering the harmony formed by the sub-sounds. Additionally, background sounds (e.g., nature sounds) may be provided with the cumulative count increase, but this is not limited to specific examples.

Figure 4A:
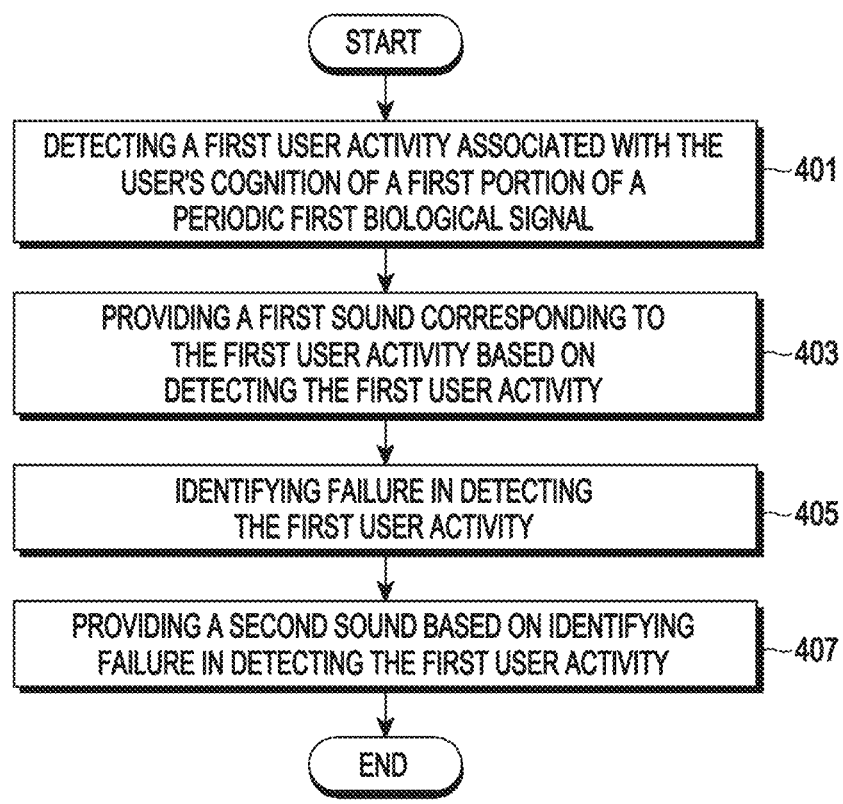
FIG. 4A is a flowchart illustrating a method for providing sound according to an embodiment.

FIG. 4A illustrates a flowchart describing a sound provision method according to one embodiment. The embodiment of FIG. 4A will be explained with reference to FIGS. 4B through 4E. FIGS. 4B through 4E are diagrams explaining sound provision according to various embodiments.

Figure 4B:
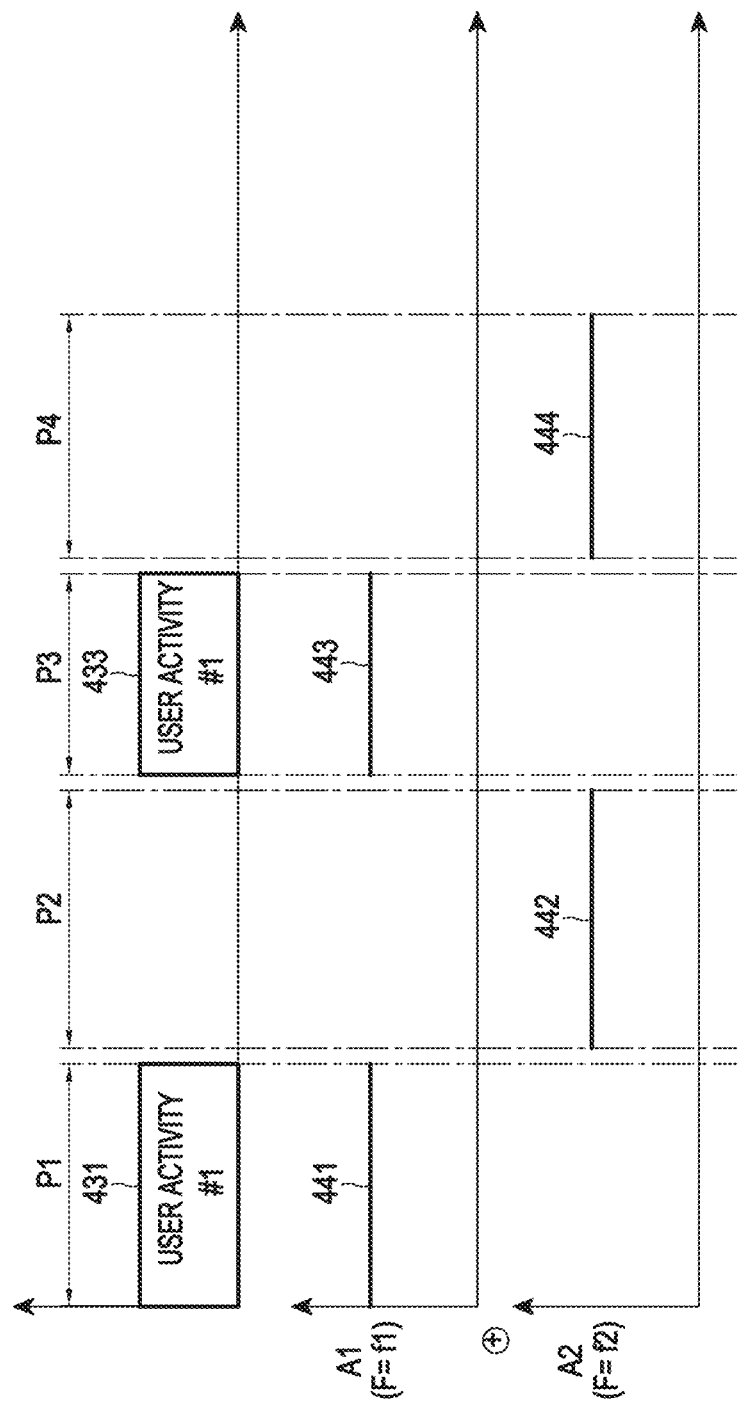
FIGS. 4B, 4C, 4D, and 4E are diagrams illustrating sound provision according to various embodiments.

According to one embodiment, electronic device 100 may, in operation 401, detect a first user activity, for example, first user activity 331 as shown in FIG. 4B, associated with a user's cognition of the first part of periodic first biometric information. In operation 403, electronic device 100 may provide first sound 441 corresponding to first user activity 331 based on the detection 431 of the first user activity. For example, electronic device 100 may maintain the provision of first sound 441 based on the continued detection of first user activity 331, however, this is not restrictive. In operation 405, electronic device 100 may identify the failure to detect first user activity. For instance, if first user activity 331 is a tap-on event, electronic device 100 may detect a user's touch action on touch input device 121 during the first period P1 and then detect the release of the touch during the second period P2. Upon the user's release of the touch, electronic device 100 may identify the failure to detect first user activity. Electronic device 100 may, in operation 407, provide second sound 442 corresponding to a second user activity based on the identified failure of first user activity detection. For example, the trigger for providing second sound 442 could be the failure to detect first user activity 331. In the embodiment depicted in FIG. 4B, it is illustrated that the provision of first sound 441 stops upon the failure to detect first user activity 331, but this is merely an example. Based on the detection of first user activity 433, electronic device 100 may provide first sound 443. Upon identifying the failure to detect first user activity 433, electronic device 100 may provide second sound 444. For example, in the scenario illustrated in FIG. 4B, the start time of the provision of first sound 441 and the detection start time of first user activity 331 may be substantially synchronized. The end time of the provision of first sound 441 and the detection failure identification time of first user activity 331 may be substantially synchronized. The start time of the provision of second sound 442 and the detection failure identification time of first user activity 331 may be substantially synchronized. The end time of the provision of second sound 442 and the detection start time of first user activity 331 may be substantially synchronized.

Meanwhile, as illustrated in FIG. 4B, the example where the first biological sign consists of two parts and the type of user activities associated with the cognition of each part is also two is merely illustrative, and the number of parts is not limited. For instance, if the first biological sign is breathing, one breathing cycle may consist of three parts, such as an inhalation part, a hold part, and an exhalation part. Here, the hold part may refer to the phase where the breath is held after inhaling and before exhaling.

Figure 4C:
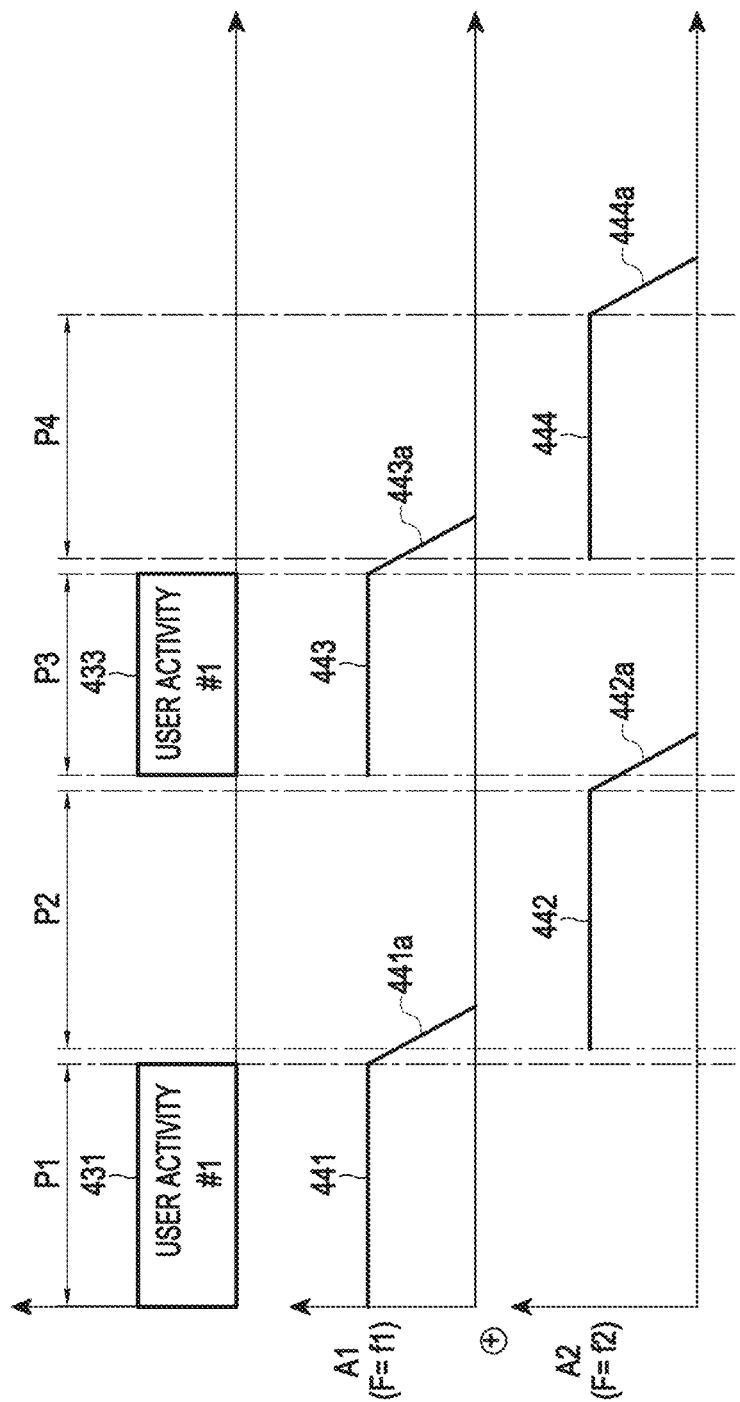

In the embodiment of FIG. 4C, the electronic device 100 may provide sounds 441a, 442a, 443a, and 444a to which termination effects corresponding to sounds 441, 442, 443, and 444 are applied. For example, the electronic device 100 may begin providing the first sound 441 at the detection start time of the first user activity 331. The electronic device 100 may identify the detection failure of the first user activity 331. Based on identifying the detection failure of the first user activity 331, the electronic device 100 may begin providing the second sound 442. Additionally, the electronic device 100 may provide the first sound 441a with a termination effect (for instance, fade-out, though not limited thereto) applied, based on identifying the detection failure of the first user activity 331. For example, the electronic device 100 may begin providing the first sound 443 at the detection start time of the first user activity 433. The electronic device 100 may provide the second sound 442a with a termination effect (for instance, fade-out, though not limited thereto) applied, based on identifying the detection of the first user activity 433. In the example illustrated in FIG. 4C, the start time of providing the first sound 441 and the detection start time of the first user activity 331 may be substantially synchronized. The start time of providing the first sound 441a with the termination effect applied and the time of identifying the detection failure of the first user activity 331 may be substantially synchronized. The start time of providing the second sound 442 and the time of identifying the detection failure of the first user activity 331 may be substantially synchronized. The start time of providing the second sound 442a with the termination effect applied and the detection start time of the first user activity 331 may be substantially synchronized.

Figure 4D:
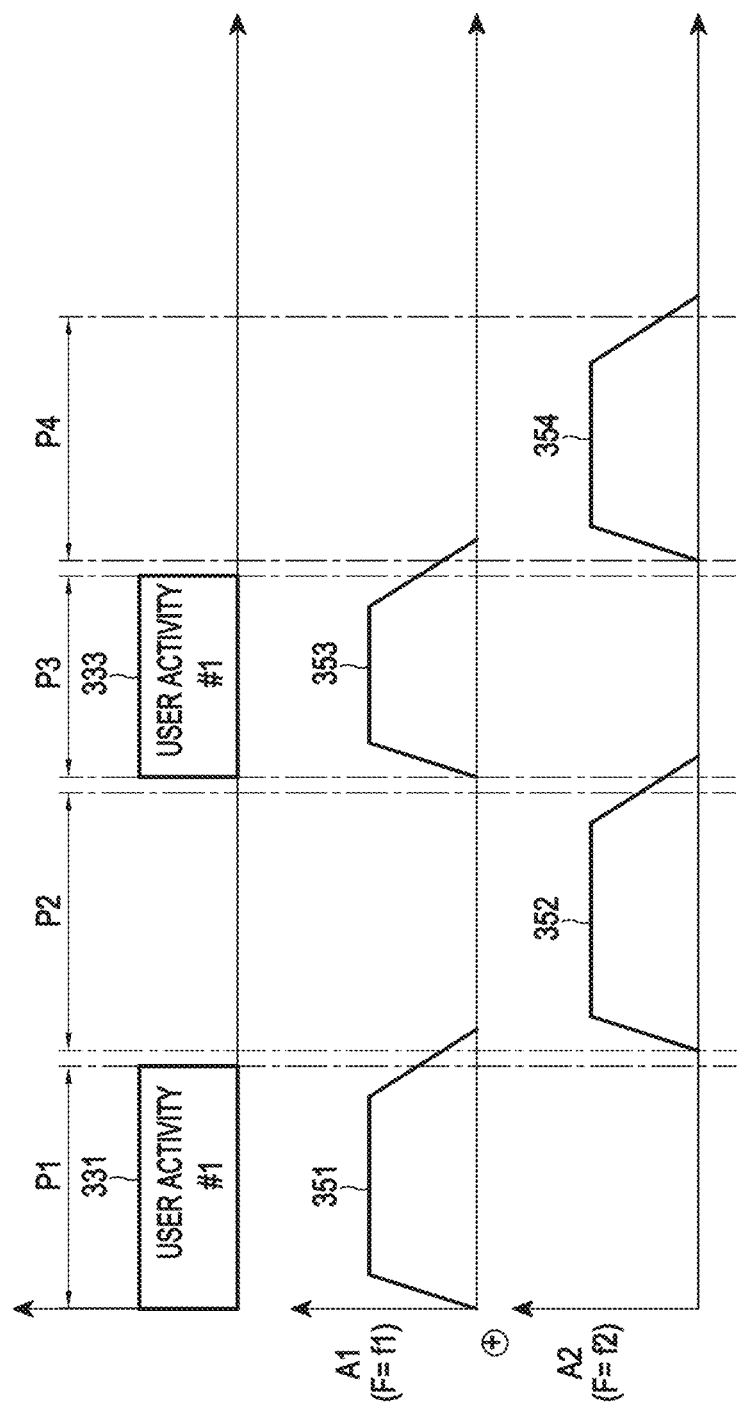

In the embodiment of FIG. 4D, the electronic device 100 may provide each of the first sounds 351 and 353 based on identifying the detection of the first user activities 331 and 333. The electronic device 100 may provide each of the second sounds 352 and 354 based on identifying the detection failures of the first user activities 331 and 333. For example, the sounds 351, 352, 353, and 354 may have a specified duration (which may be a fixed value or variable) and may not terminate based on the detection failure and/or detection of the user activities 331 and 333. In the example illustrated in FIG. 4D, the start time of providing the first sounds 351 and 353 may be substantially synchronized with the detection start time of the first user activities 331 and 333. The start time of providing the second sounds 352 and 354 may be substantially synchronized with the detection failure confirmation time of the first user activities 331 and 333. The end time of providing the sounds 351, 352, 353, and 354 may, for example, be set independently of the detection and/or detection failure of the user activities.

Figure 4E:
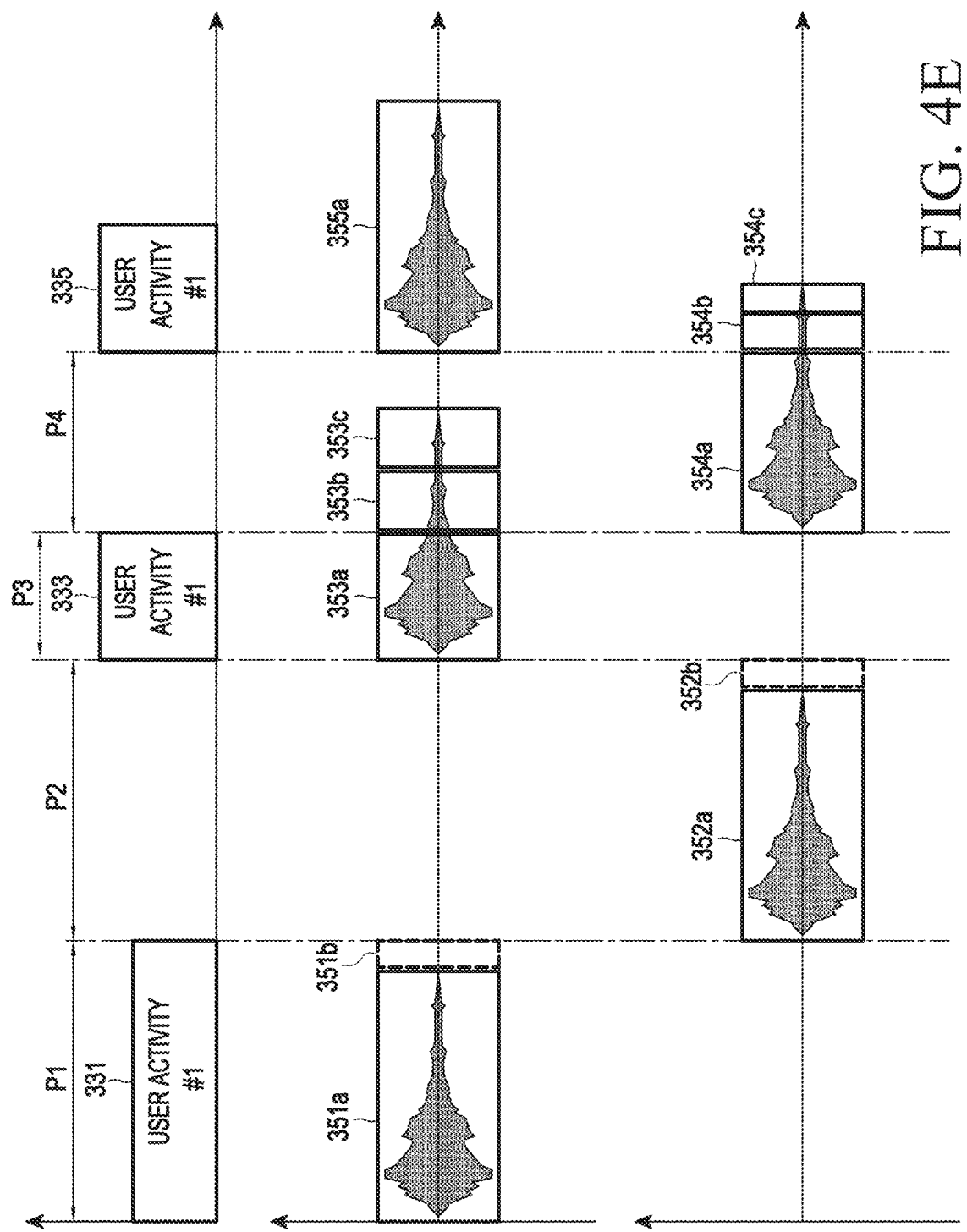

In the embodiment of FIG. 4E, the electronic device 100 may provide a sound 351a having a waveform corresponding to the first user activity 331. As described above, the sound 351a may have a specified playback duration (which may be a fixed value or a value that varies based on the cumulative count). Accordingly, if the first user activity 331 is detected beyond the playback duration of the sound 351a, the provision of the sound 351a may be stopped during the remaining portion 351b. However, this is exemplary, and a sound corresponding to the reverb of the sound 351a may be implemented to be provided in the remaining portion 351b, and there are no limitations on the sounds playable during the remaining portion 351b.

The electronic device 100 may identify the maintenance of detection of the first user activity 331 during the first period P1 and identify the detection failure of the first user activity 331. For example, during the second period P2, the electronic device 100 may identify the detection failure of the first user activity. Based on identifying the detection failure of the first user activity 331, the electronic device 100 may provide the second sound 352a. Meanwhile, the second sound 352a may, for example, have a specified playback duration (which may be a fixed value or a value that varies depending on the cumulative count). Accordingly, if the second period P2, during which the first user activity is not detected, exceeds the playback duration of the second sound 352a, the provision of the second sound 352a may be stopped during the remaining portion 352b. However, this is exemplary, and a sound corresponding to the reverb of the second sound 352a may be implemented to be provided in the remaining portion 352b, with no limitations on the sounds playable during the remaining portion 352b.

Meanwhile, the maintenance duration P3 of the first user activity 333 may be shorter than the designated playback duration. The electronic device 100 may identify the interruption of detection of the first user activity 333 while providing the first portion 353a of a sound with a designated waveform. Based on identifying the interruption of detection of the first user activity 333, the electronic device 100 may apply and provide a termination effect (e.g., a fade-out effect, though not limited thereto) to the second portion 353b. Meanwhile, the duration of the termination effect may be predetermined, and the third portion 353c after the expiration of the termination effect's duration may not be provided.

Based on identifying the detection failure of the first user activity 333, the electronic device 100 may start providing the first portion 354a of the second sound. Meanwhile, the duration P4, during which the first user activity is not detected, may be shorter than the playback duration of the second sound. After the period P4, the electronic device 100 may detect the first user activity 335. Based on detecting the first user activity 335, the electronic device 100 may apply and provide a termination effect (e.g., a fade-out effect, though not limited thereto) to the second portion 354b. Meanwhile, the duration of the termination effect may be predetermined, and the third portion 354c after the termination effect's duration may not be provided. Subsequently, based on detecting the first user activity 335, the electronic device 100 may provide the first sound 355a.

As described above, depending on the duration P1 associated with the first user activity 331, the entirety of the first sound 351a, i.e., the stored waveform, may be played. Alternatively, depending on the duration P3 associated with the first user activity 331, the first portion 353a of the first sound may be provided, a termination effect may be applied to the second portion 353b and provided, and the third portion 353c may not be provided. In other words, depending on the user activity, the entire stored waveform may be provided, or only a part of it may be provided. It will be understood by those skilled in the art that the term "provision of the first sound" in the present disclosure may refer to either the entire provision of the stored waveform (or audio source) as the first sound or the provision of a part of the waveform (or audio source). Similarly, "provision of the second sound" may refer to either the entire provision of the stored waveform (or audio source) as the second sound or the provision of a part of the waveform (or audio source). In FIG. 4E, each of the sounds 351a and 352a may consist, for example, of a first portion (or first half) where the amplitude increases and a second portion (or second half) where the amplitude decreases, though the waveforms of the sounds 351a and 352a are not limited to this structure.

Figure 5A:
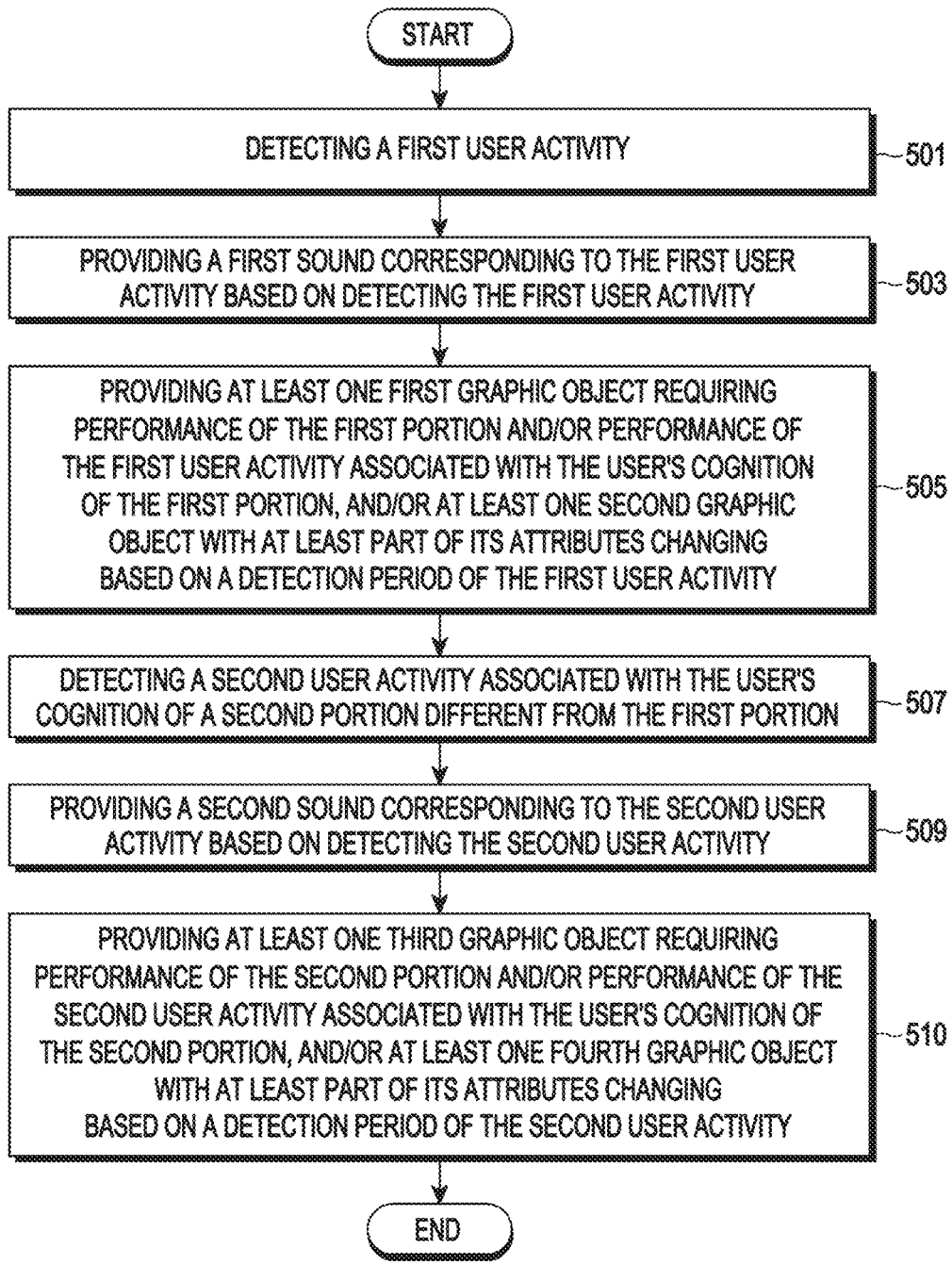
FIG. 5A is a diagram illustrating a method for providing sound according to an embodiment.
Figure 5B:
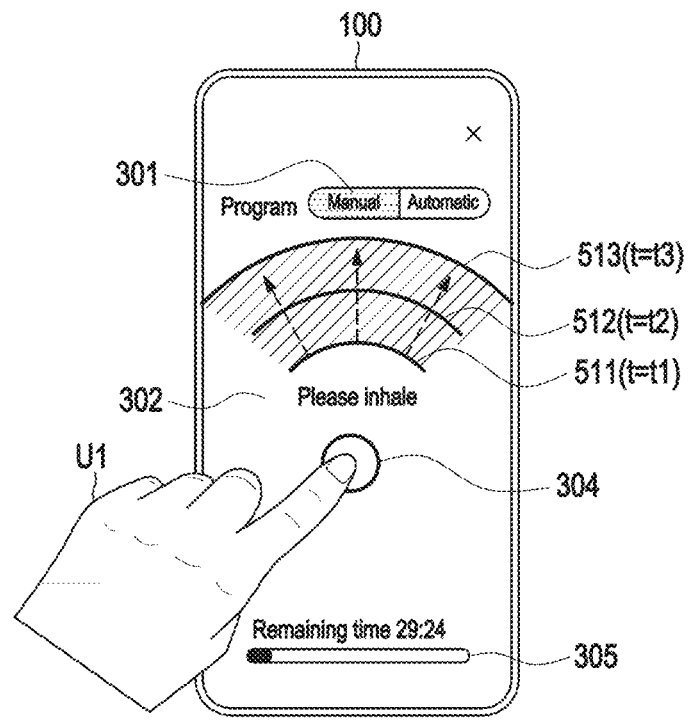
FIGS. 5B, 5C, and 5D are diagrams illustrating content provided by an electronic device according to an embodiment.
Figure 5C:
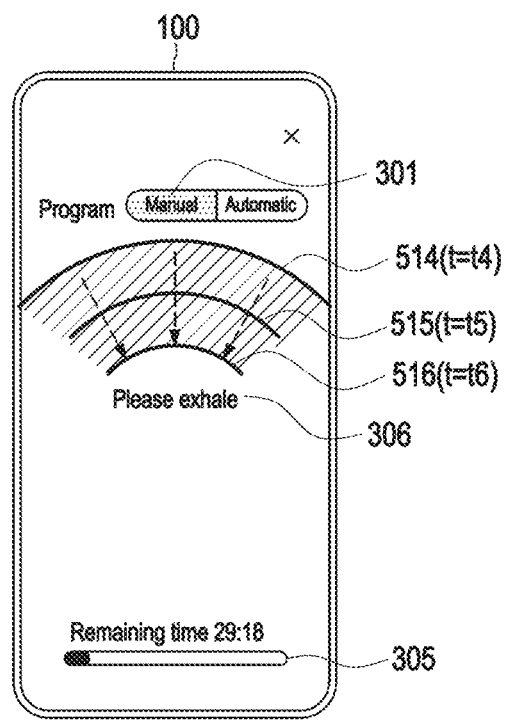
Figure 5D:
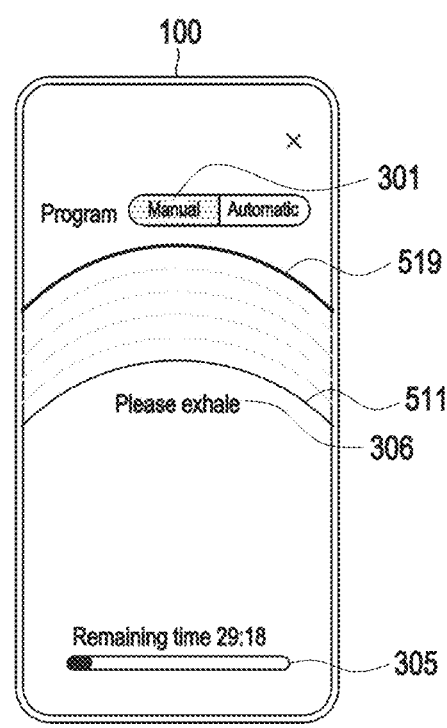

FIG. 5A is a diagram illustrating a method for providing sounds according to an embodiment. The embodiment of FIG. 5A will be explained with reference to FIGS. 5B to 5D. FIGS. 5B to 5D are diagrams illustrating content provided by an electronic device.

According to one embodiment, the electronic device 100 may, in operation 501, detect a first user activity 304 (e.g., a tap-on event, but not limited thereto), as shown in FIG. 5B. In operation 503, the electronic device 100 may provide a first sound corresponding to the first user activity 304 based on the detection of the first user activity. In operation 505, the electronic device 100 may provide, as shown in FIG. 5B, at least one first graphic object 302, which requires the performance of the first part of the first biological signal and/or the performance of the first user activity related to the cognition of the first part, and/or at least one second graphic object 511, 512, 513, whose attributes, at least in part, change in response to the detection period of the first user activity 304. For example, based on the detection and/or maintenance of the first user activity 304, the electronic device 100 may provide the second graphic object 511 with a first attribute at a first time point t1, the second graphic object 512 with a second attribute at a second time point t2, and the second graphic object 513 with a third attribute at a third time point t3. For instance, in the example of FIG. 5B, the attributes of the second graphic objects 511, 512, 513 include changes in size (or area, and/or shape), but this is merely illustrative. A person skilled in the art will understand that attributes such as color, transparency, and/or saturation may also be modified.

In the embodiment illustrated in FIG. 5C, the electronic device 100 may detect, in operation 507, a second user activity associated with the cognition of a second part of the first biological signal distinct from the first part. For example, as shown in FIG. 5C, the second user activity may be a tap-off event. The electronic device 100 may detect the second user activity based on the release of the first user activity 304. Meanwhile, as described above, in this and other embodiments, the detection of the second user activity may be substituted with identifying the failure of detecting the first user activity, as understood by those skilled in the art. In operation 509, the electronic device 100 may provide a second sound corresponding to the second user activity based on the detection of the second user activity. In operation 510, the electronic device 100 may provide at least one third graphic object 306, which requires the performance of the second part and/or the second user activity related to the cognition of the second part, and/or at least one fourth graphic object 514, 515, 516, whose attributes, at least in part, change in response to the detection period of the second user activity. For instance, based on the detection and/or maintenance of the second user activity, the electronic device 100 may provide the fourth graphic object 514 with a third attribute at the fourth time point t4, the fourth graphic object 515 with a second attribute at the fifth time point t5, and the fourth graphic object 516 with a first attribute at the sixth time point t6. For example, in the illustration of FIG. 5C, the attributes of the fourth graphic object 514, 515, 516, such as size (or area and/or shape), change, but this is illustrative, as attributes such as color, transparency, and/or saturation may also change, as understood by those skilled in the art. In FIGS. 5B and 5C, the tendency of attribute changes (e.g., size increases) for the second graphic object 511, 512, 513 corresponding to the first user activity may be opposite to the tendency of attribute changes (e.g., size decreases) for the fourth graphic object 514, 515, 516 corresponding to the second user activity, but this is illustrative and not restrictive. According to the described implementation, while the user is performing an inhalation, the size of the second graphic object 511, 512, 513 may increase based on the detection and/or maintenance of the first user activity. Similarly, while the user is performing an exhalation, the size of the fourth graphic object 514, 515, 516 may decrease based on the detection and/or maintenance of the second user activity. Consequently, the periodic changes in attributes (or animation effects) of the second graphic object 511, 512, 513 and the fourth graphic object 514, 515, 516, such as the periodic changes in size, may be substantially synchronized with the periodicity of the sounds and/or the periodicity of the user's first biological signal. Furthermore, experiencing the attribute changes in the graphic objects may enhance the user's entrainment to periodicity. For example, respiration-neural entrainment could be achieved, potentially enhancing the effect of inducing sleep (see: "Respiration modulates oscillatory neural network activity at rest," Daniel S. Kluger, Joachim Gross). Additionally, experiencing the attribute changes in the graphic objects may amplify the delayed performance effect of the first biological signal. For instance, the user might be more inclined to extend the inhalation duration based on experiencing the size increase of the graphic object during the inhalation process.

For example, in the embodiment illustrated in FIG. 5D, the electronic device 100 may provide an object 511 whose attributes change based on the input and/or maintenance of a user activity. Additionally, the electronic device 100 may provide a reference object 519. In one example, the reference object 519 may represent the maximum size (or the size at the time of detecting the second user activity) of at least one object recorded at at least one past moment within the session. For instance, the maximum size (or the size at the time of detecting the second user activity) of at least one size of the object 511 provided at each of at least one past moment may vary. The electronic device 100 may provide a reference object 519 corresponding to the maximum value among the maximum sizes of at least one size. The user may recognize the size of the reference object 519 as the maximum recorded length of their inhalation (or as expressed by the depth of their breath or the total duration of their breathing). Consequently, the user may be intuitively motivated to surpass this maximum record, potentially increasing their voluntary inhalation length (or the depth of their breathing or the total duration of their breathing). Meanwhile, the reference object 519 may also have a size corresponding to a value associated with an inhalation length effective for inducing sleep (which may be a fixed or variable value). The attributes of the reference object 519 and/or the type of information it represents are not limited.

Figure 6A:
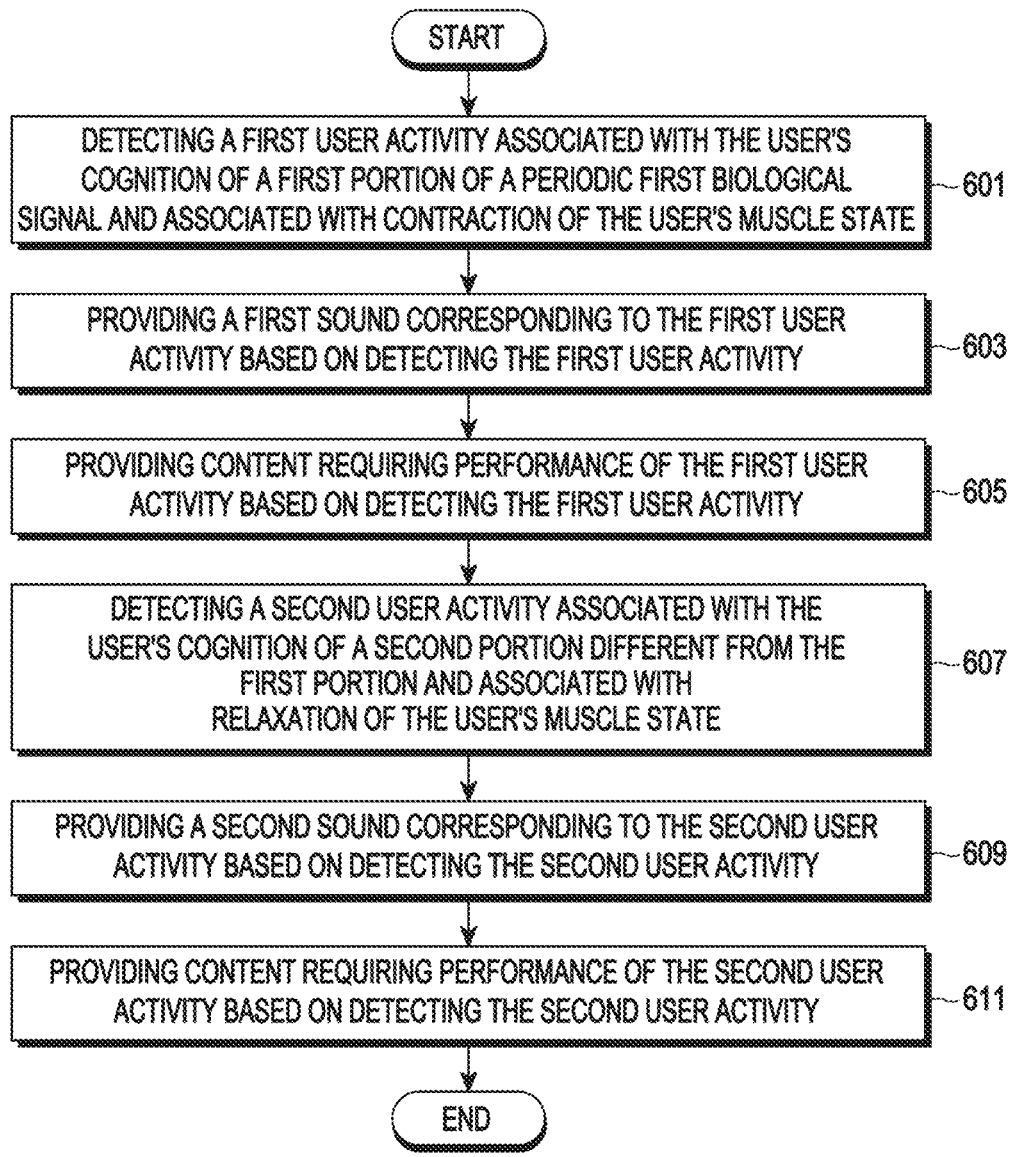
FIG. 6A is a flowchart illustrating a method for providing sound according to an embodiment.

FIG. 6A is a flowchart illustrating a method for providing sound according to an embodiment. The embodiment of FIG. 6A will be described with reference to FIGS. 6B through 6H, which illustrate user activities in various embodiments.

Figure 6B:
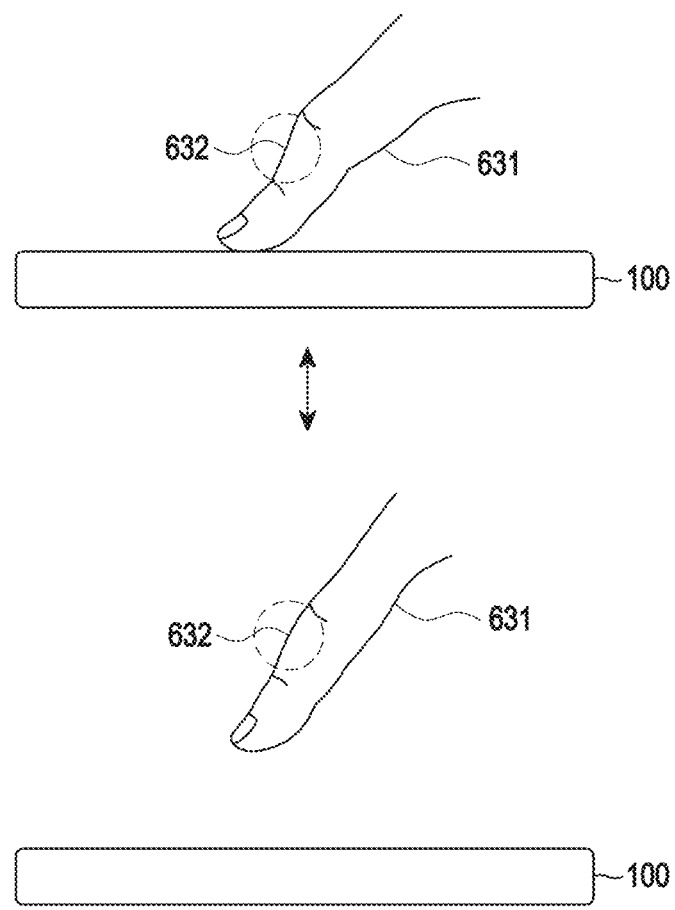
FIGS. 6B, 6C, 6D, 6E, 6F, 6G, and 6H are diagrams illustrating user activities according to various embodiments.

In operation 601, the electronic device 100 may detect a first user activity associated with the user's cognition of the first part of a periodic first biosignal and linked to a contraction of the user's muscle state. For example, as shown in FIG. 6B, a tap-on event where the user's finger 631 touches at least part of the electronic device 100 may be detected as the first user activity. In this case, for a tap-on event to occur, touch and/or pressure between the finger 631 and the electronic device 100 may be required, which may result in tension in part 632 of the finger 631. In operation 603, the electronic device 100 may provide a first sound corresponding to the first user activity based on the detection of the first user activity. In operation 605, the electronic device 100 may provide content that prompts the performance of the first user activity based on the detection of the first user activity.

The electronic device 100, in operation 607, may detect a second user activity associated with the user's cognition of a second part, distinct from the first part, of a periodic first biosignal and linked to the relaxation of the user's muscle state. For example, as shown in FIG. 6B, a tap-off event, where the user's finger 631 releases its touch on the electronic device 100, may be detected as the second user activity. Based on the release of the user's finger 631 from the electronic device 100, the tension in part 632 of the finger 631 may be alleviated. In operation 609, the electronic device 100 may provide a second sound corresponding to the second user activity based on its detection. In operation 611, the electronic device 100 may provide content prompting the performance of the second user activity based on its detection. As described above, the first user activity and the second user activity may each cause at least a part of the user's body to experience tension and relaxation. The relaxation of the body state may activate the parasympathetic nervous system, thereby enhancing sleep effects associated with parasympathetic activation. However, if users are directly asked to relax their body, they may find it challenging to maintain a relaxed state continuously. Instead, requesting the user to lightly tense and then relax their body may make it easier for them to sustain relaxation over time. Additionally, the cycle of tension and relaxation in at least a part of the user's body may be synchronized with the cycle of sound provision and/or content provision. This synchronization may enhance the user's physical entrainment effect, potentially further amplifying sleep-induction effects.

Figure 6C:
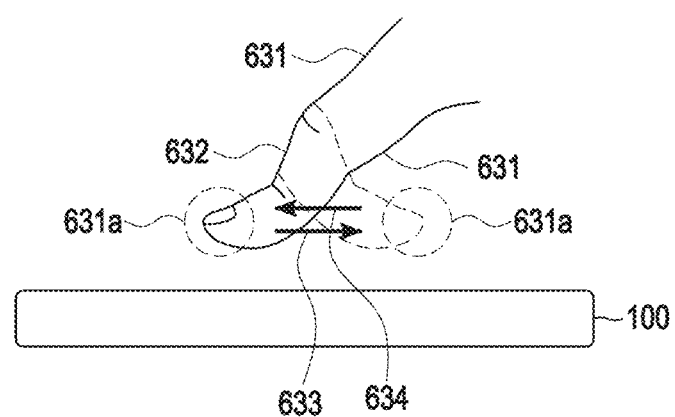

In the example of FIG. 6C, the first user activity may involve moving a portion 631a of the finger 631 in a first direction 634. For instance, the electronic device 100 may identify the movement direction (or change direction) of the touch position as the first direction 634 based on detecting that the touch position on the touch input device 121 by the finger 631 has moved from a first position to a second position. However, the method of identifying the movement direction (or change direction) is not limited to this. To input the first direction 634, tension may be induced in a portion 631a of the finger 631. In the example of FIG. 6C, the second user activity may involve moving a portion 631a of the finger 631 in a second direction 633, which may be the opposite of the first direction 634, though this is not limiting. For instance, the electronic device 100 may identify the movement direction (or change direction) of the touch position as the second direction 633 based on detecting that the touch position on the touch input device 121 by the finger 631 has moved from the second position back to the first position. However, the method of identifying the movement direction (or change direction) is not limited to this. To input the second direction 633, the tension induced in a portion 631a of the finger 631 may be alleviated. For example, the electronic device 100 may detect user activities based on direction changes. The electronic device 100 may identify a change in the touch position to the first direction 634, a stop (or hold) of the touch position, and a change in the touch position to the second direction 633. In this case, the electronic device 100 may detect the second user activity based on identifying the stop of the touch position and/or the change in the touch position to the second direction 633. Similarly, the electronic device 100 may identify a change in the touch position to the second direction 633, a stop (or hold) of the touch position, and a change in the touch position to the first direction 634. In this case, the electronic device 100 may detect the first user activity based on identifying the stop of the touch position and/or the change in the touch position to the first direction 634.

Figure 6D:
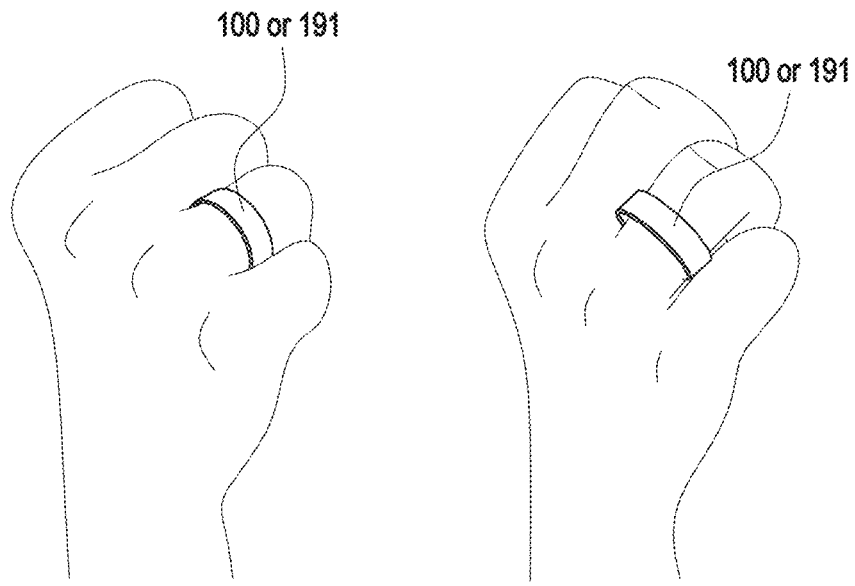

In the example of FIG. 6D, the first user activity may involve the action of clenching the user's fist. The electronic device 100 or the external electronic device 191 may, for example, be implemented as a ring-shaped wearable electronic device. Meanwhile, in the embodiment of FIG. 6D, the user is illustrated as strongly clenching their fist, however, this is merely for explanatory purposes, and the user does not need to exert significant force when clenching their fist. Those skilled in the art will understand that the muscle tension in the wearing area of the electronic device 100 or the external electronic device 191 may simply be relatively high. The electronic device 100 or the external electronic device 191 may be implemented to include an EMG sensor. The EMG sensor may measure the degree of muscle tension/relaxation or provide data for measuring the degree of muscle tension/relaxation based on electrical signals generated from muscles in contact with the skin. If the ring-shaped wearable electronic device is implemented as the external electronic device 191 and is wirelessly connected (e.g., via BLE, though not limited thereto) to the electronic device 100, the electronic device 100 may receive the degree of muscle tension/relaxation or data from the external electronic device 191 to identify the degree of muscle tension/relaxation. The electronic device 100 may detect the first user activity based on the identified degree of muscle tension/relaxation. For example, the electronic device 100 may identify the initiation of the first user activity based on an increase in muscle tension/relaxation (or by identifying a negative peak). The second user activity may involve the action of opening the user's fist. Any action intended to induce the muscles in the wearing area of the electronic device 100 or the external electronic device 191 to be in a relatively relaxed state may be considered as the second user activity without limitation. The electronic device 100 may detect the second user activity based on the identified degree of muscle tension/relaxation. For instance, the electronic device 100 may identify the initiation of the second user activity based on a decrease in muscle tension/relaxation (or by identifying a positive peak).

Figure 6E:
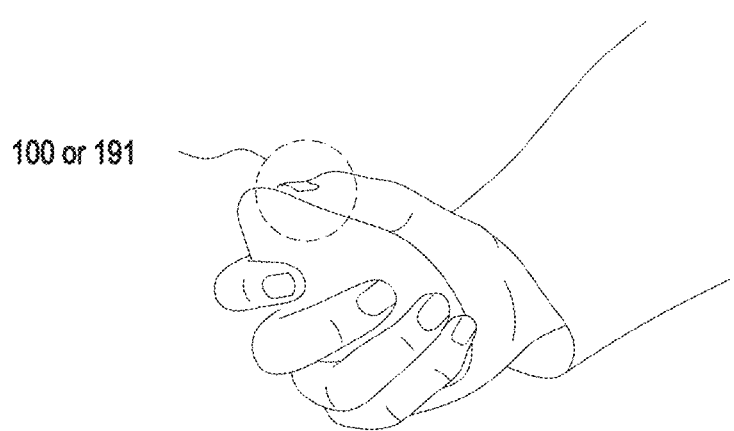

In the example of FIG. 6E, the electronic device 100 or the external electronic device 191 may be implemented as a portable device that may be gripped by the user. The first user activity may involve the user applying pressure to the portable device, while the second user activity may involve releasing the applied pressure on the portable device. For instance, the user may alternately grip the portable device tightly and then reduce the applied pressure while still holding the device, thereby performing the first and second user activities. The portable device may be implemented with an exterior made of deformable material or may include multiple sub-surfaces whose relative positions may change. Accordingly, while the user performs the first and second user activities, the shape of the portable device may change; however, this is not a limitation. When the user applies pressure to the portable device, at least some of the muscles in the user's hand may tense. Conversely, when the user releases the applied pressure, at least some of the muscles in the user's hand may relax. The portable device may include at least one sensor designed to measure the pressure applied by the user. The electronic device 100 may detect the first and/or second user activity based on the sensing results of the at least one sensor.

Figure 6F:

In the example of FIG. 6F, the electronic device 100 or the external electronic device 191 may be implemented as an electronic device in the form of a stuffed toy (or a pillow). The exterior of the stuffed toy (or pillow) may be made of a relatively soft material, however, this is not a limitation. Alternatively, although not shown, the electronic device 100 or the external electronic device 191 may be implemented with a housing such as a pad that is part of (or integrated into) a bed. The first user activity may involve the user hugging (or applying pressure to at least a portion of) the electronic device 100 or the external electronic device 191. The second user activity may involve releasing the applied pressure on the electronic device 100 or the external electronic device 191. For example, the user may hug and then release the electronic device 100 or the external electronic device 191 to perform the first and second user activities. When the user applies pressure to the electronic device 100 or the external electronic device 191, at least some of the muscles in the user's body may tense. Conversely, when the user releases the applied pressure, at least some of the muscles in the user's body may relax. The electronic device 100 or the external electronic device 191 may include at least one sensor designed to measure the pressure applied by the user. The electronic device 100 may detect the first and/or second user activity based on the sensing results of the at least one sensor.

Figure 6G:
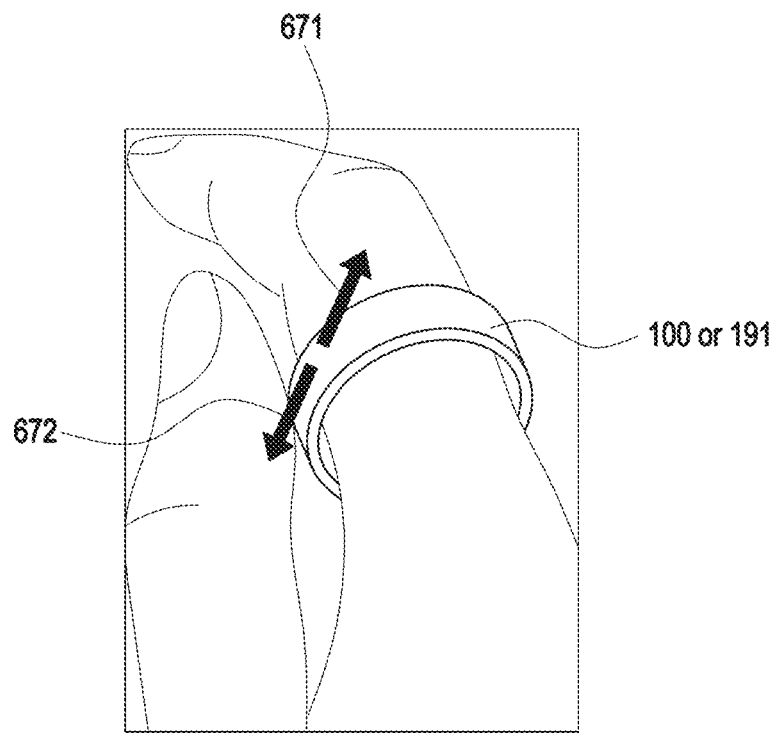

In the example of FIG. 6G, the electronic device 100 or the external electronic device 191 may be implemented, for instance, as a ring-shaped wearable device. The wearable device may include a touch input device designed to sense touches made by the user. Based on the sensing results from the touch input device, the wearable device may identify information related to the user's touch and/or the movement of the touch position. In this example, the first user activity may involve a touch movement (which may also be referred to as a drag or flick) in the first direction 671, and the second user activity may involve a touch movement in the second direction 672. However, this is not limiting. As described in FIG. 6C, the movement of the finger in different directions (671 and 672) may cause tension and relaxation in certain muscles of the finger.

Figure 6H:
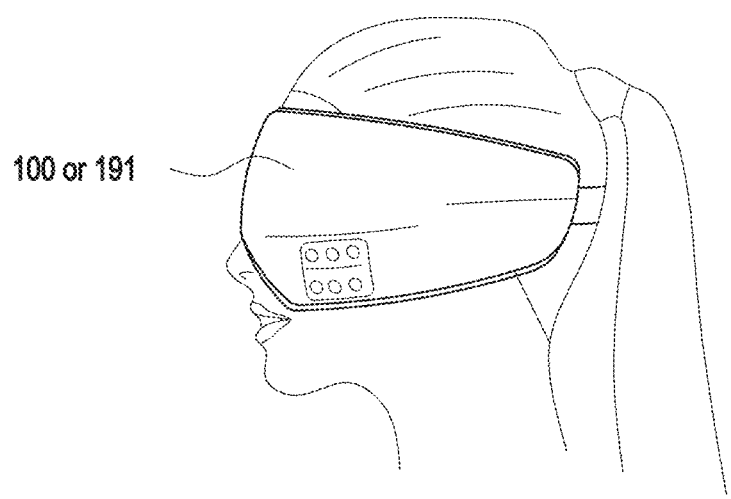

In the example of FIG. 6H, the electronic device 100 or the external electronic device 191 may be implemented in the form of an eye mask that includes a housing designed to cover the user's eye region. The electronic device 100 or the external electronic device 191 may include a speaker for sound output. Based on the detection of at least one user activity, the electronic device 100 or the external electronic device 191 may provide sound.

For instance, the electronic device 100 may detect at least some of the user activities based on changes in the orientation of the electronic device 100 (which may also be referred to as changes in the tilt degree).

As the execution of user activities for inducing the tension and relaxation of muscles described above is required, the activation of the parasympathetic nervous system may improve due to the tension and relaxation of at least some of the user's muscles, thereby enhancing the sleep-inducing effect. Furthermore, the cycle of muscle tension and relaxation in at least part of the body may be substantially synchronized with the cycle of sound provision and/or content provision. As a result, the synchronization effect on the user's body may increase, further enhancing the sleep-inducing effect.

Meanwhile, the aforementioned user activities are merely illustrative, and the user activities may be related to a biometric signal (e.g., breathing). For instance, it will be understood by those skilled in the art that sound may be provided based on measurable parameters that change with breathing (e.g., the rising or falling motion of the chest or airflow at the nose during inhalation/exhalation, but not limited thereto).

Figure 6I:
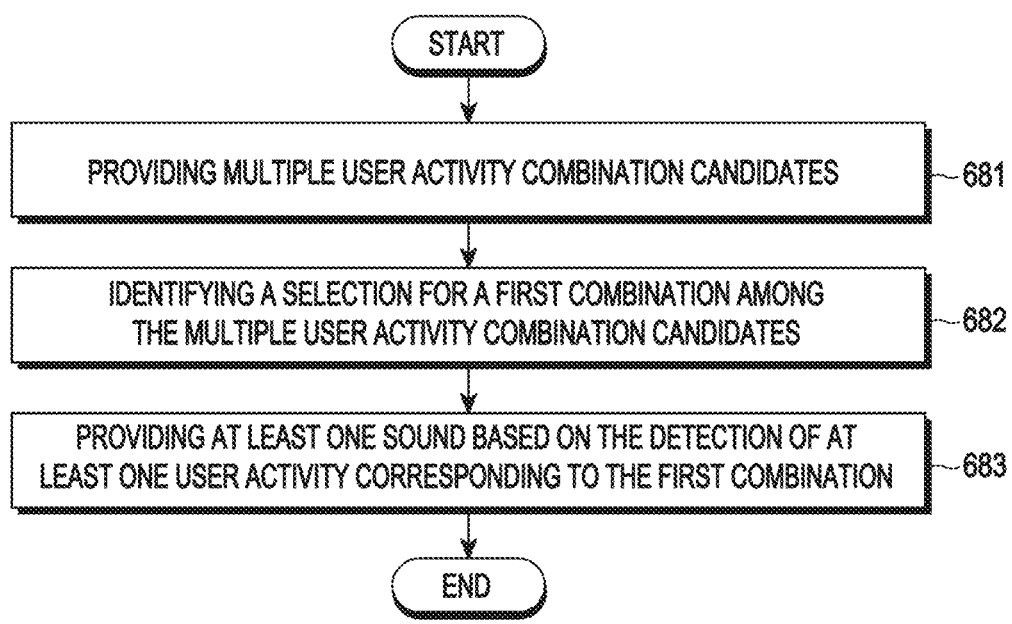
FIG. 6I is a diagram illustrating a method for providing sound according to an embodiment.

FIG. 6I illustrates a diagram explaining a sound provision method according to an embodiment.

In operation 681, the electronic device 100 may provide multiple user activity combination candidates. These multiple user activity combinations may represent, for example, combinations of user activities corresponding to multiple inhalations/exhalations. For instance, one combination could be a tap-on/tap-off combination on a touchscreen, as described in FIG. 6B. Another combination could involve combinations of touch-drag inputs in different directions, as explained in FIG. 6C. Yet another combination could involve the combination of clenching and unclenching a fist, as described in FIG. 6D, without limitation. The combination of user activities that feels comfortable may vary from user to user. The electronic device 100 may set a default user activity combination, but as in this embodiment, it may provide multiple candidates and configure the user activity combination that triggers sound provision based on the user's selection. In operation 682, the electronic device 100 may identify a selection for a first combination among the multiple user activity combination candidates. Based on the user's selection, the electronic device 100 may configure the user activity combination that triggers sound provision. In operation 683, the electronic device 100 may provide at least one sound based on the detection of at least one user activity corresponding to the first combination.

Figure 6J:
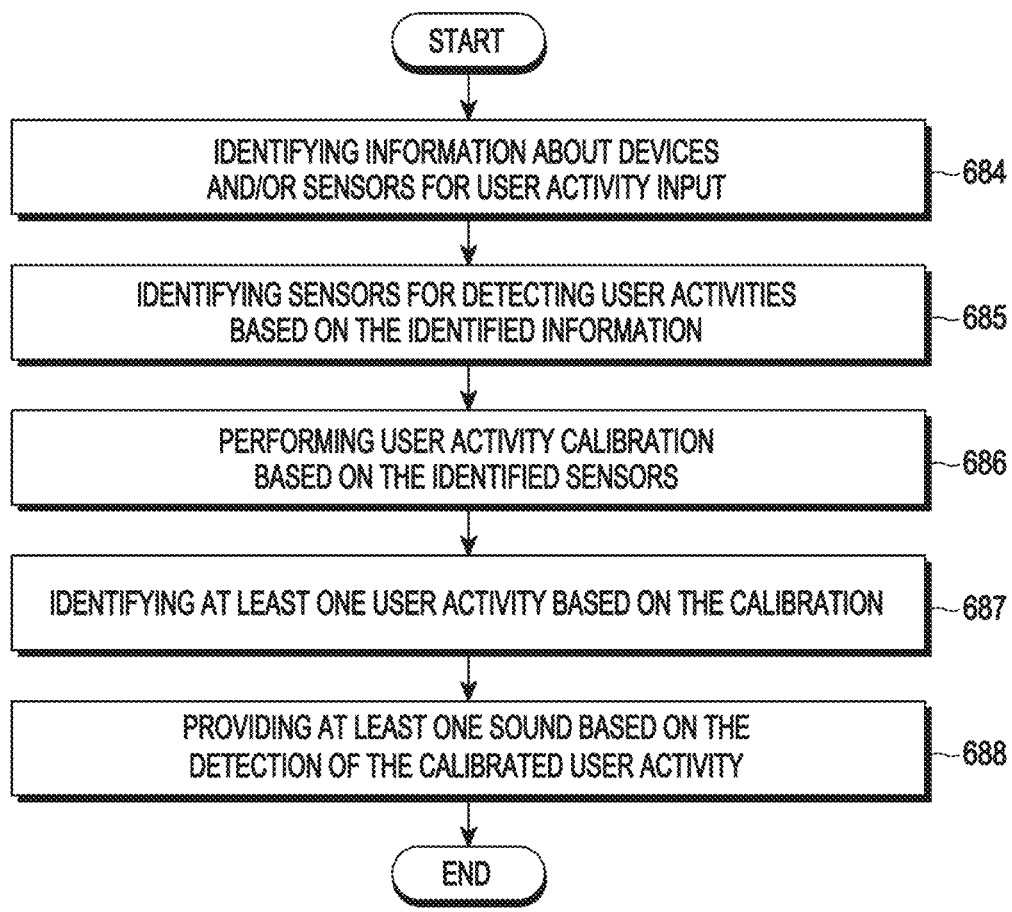
FIG. 6J is a diagram illustrating a method for providing sound according to an embodiment.

FIG. 6J illustrates a diagram explaining a sound provision method according to an embodiment.

As explained with reference to FIG. 6I, the electronic device 100 may present predefined multiple candidates and configure user activities that trigger sound generation based on the selected combination. In this embodiment, user flexibility may be further enhanced. In operation 684, the electronic device 100 may identify information about devices and/or sensors for user activity input. In operation 685, based on the identified information, the electronic device 100 may identify sensors for detecting user activities. For instance, the electronic device 100 may provide a list of selectable devices and/or sensors or a list of selectable user activity types. The electronic device 100 may identify information about devices and/or sensors for user activity input based on at least one user input from at least one list, but the identification method is not limited. In operation 686, the electronic device 100 may perform user activity calibration based on the identified sensors. In operation 687, the electronic device 100 may identify at least one user activity based on the calibration. For example, during a first period, the electronic device 100 may provide content requesting the performance of a first user activity corresponding to inhalation while identifying a first sensing value (or first time-series value) corresponding to the first user activity based on the identified sensor. Similarly, during a second period, the electronic device 100 may provide content requesting the performance of a second user activity corresponding to exhalation while identifying a second sensing value (or second time-series value) corresponding to the second user activity based on the identified sensor. The electronic device 100 may determine at least one sensing condition for the first and/or second user activities based on the first sensing value (or first time-series value) and/or the second sensing value (or second time-series value). In operation 688, the electronic device 100 may provide at least one sound based on the detection of the calibrated user activity. For instance, the electronic device 100 may provide at least one sound corresponding to the first and/or second user activities based on the sensor's detection of at least one sensing value satisfying the sensing condition for the first and/or second user activities.

Figure 6K:
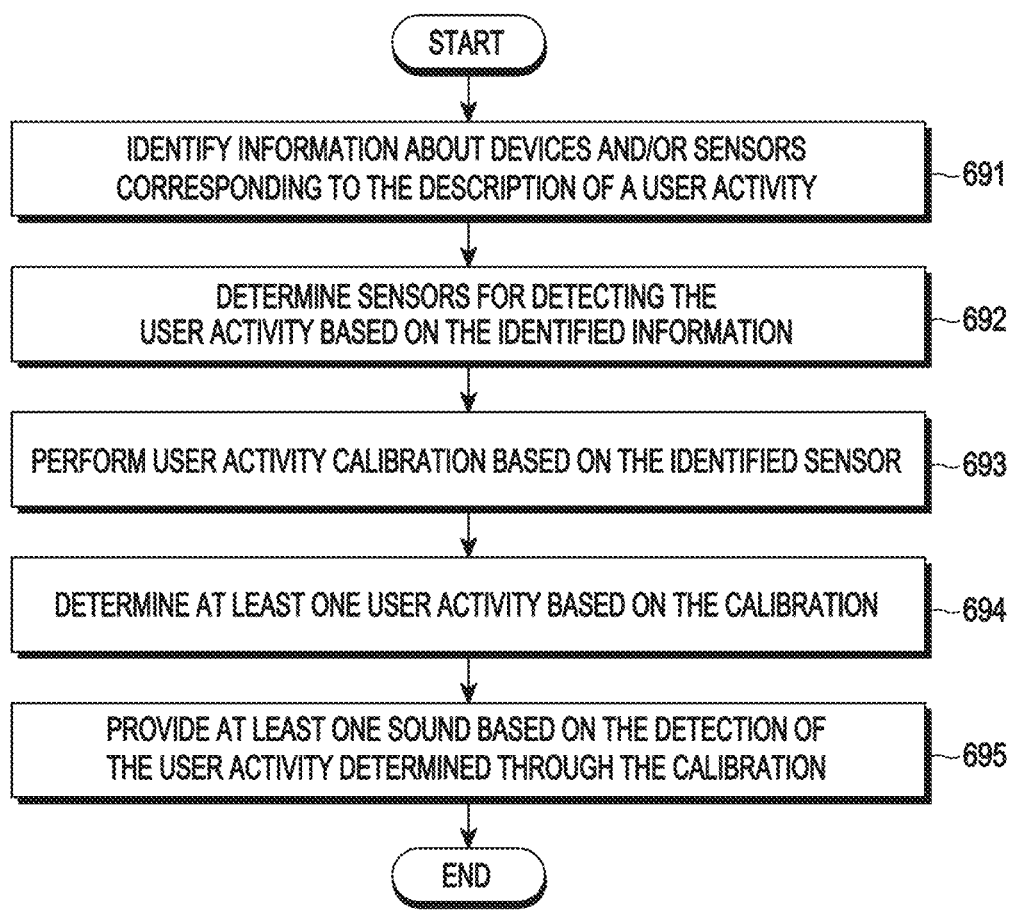
FIG. 6K is a diagram illustrating a method for providing sound according to an embodiment.
Figure 6L:
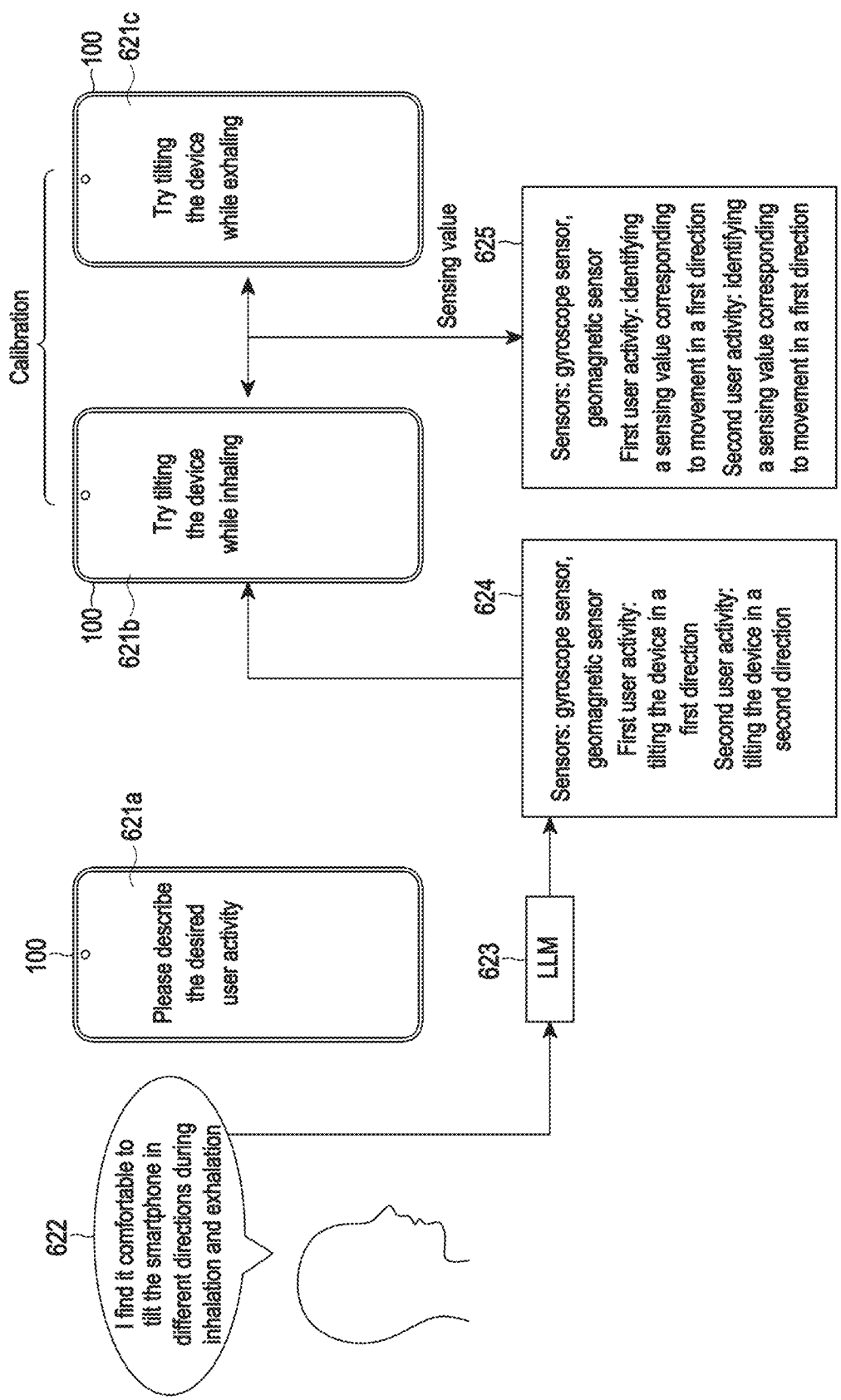
FIG. 6L is a diagram illustrating calibration according to an embodiment.

FIG. 6K illustrates a diagram explaining a sound provision method according to an embodiment, which is described with reference to FIG. 6L. FIG. 6L depicts calibration in accordance with the embodiment.

Referring to FIG. 6K, in operation 691, the electronic device 100 may identify information about devices and/or sensors corresponding to the description of a user activity. In operation 692, based on the identified information, the electronic device 100 may determine sensors for detecting the user activity. For instance, as shown in FIG. 6L, the electronic device 100 may provide content 621a requesting a description of the user activity desired by the user. In response, the user may provide a description 622 of the user activity. The description 622 may be analyzed by an artificial intelligence model, such as a large language model (LLM) 623. Based on the analysis, information about devices and/or sensors corresponding to the user activity description (e.g., sensors like gyro sensor, geomagnetic sensor) 624 may be identified. It will be understood by those skilled in the art that the artificial intelligence model may be executed by the electronic device 100 or by an external electronic device (e.g., an LLM server). Based on the analysis result from the artificial intelligence model, the electronic device 100 may determine that at least one activity involves tilting the electronic device 100 in a first direction and/or a second direction.

The electronic device 100, in operation 693, may perform user activity calibration based on the identified sensor. In operation 694, the electronic device 100 may determine at least one user activity based on the calibration. For example, as illustrated in FIG. 6L, the electronic device 100 may provide content 621b requesting the performance of a first user activity. The electronic device 100 may determine sensing values (or time-series values) during or after the provision of content 621b requesting the first user activity. Similarly, the electronic device 100 may provide content 621c requesting the performance of a second user activity. The electronic device 100 may determine sensing values (or time-series values) during or after the provision of content 621c requesting the second user activity. Accordingly, the electronic device 100 may identify conditions 625 (e.g., at least one sensing value for determining occurrence) to judge whether at least one user activity has occurred. Subsequently, in operation 695, the electronic device 100 may provide at least one sound based on the detection of the user activity determined through the calibration. For instance, the electronic device 100 may provide a sound corresponding to the user activity based on the confirmation that the condition 625 for determining the activity has been satisfied.

Figure 7A:
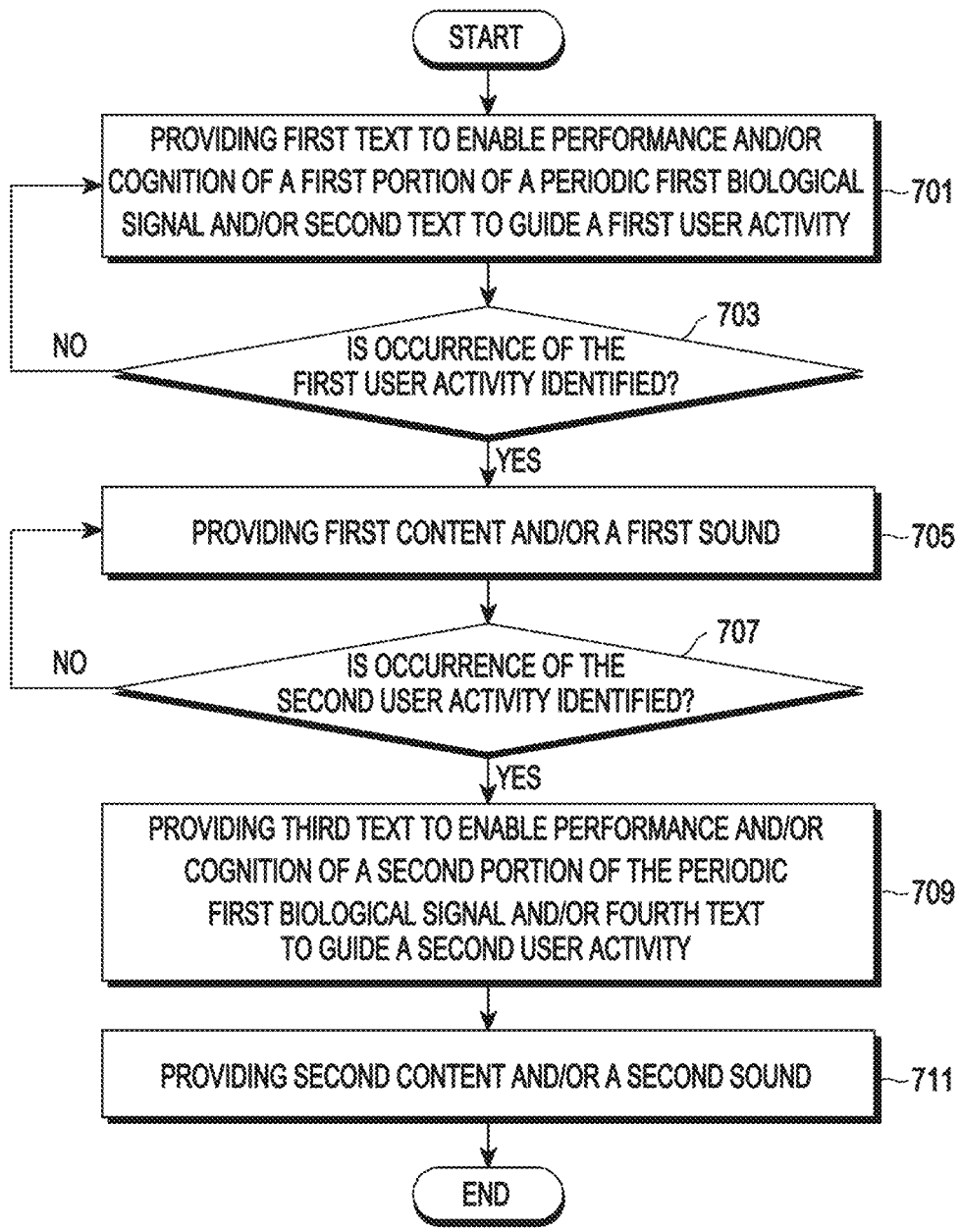
FIGS. 7A, 7B, 7C, and 7D are diagrams illustrating a method for providing sound according to an embodiment.

FIG. 7A illustrates a diagram for explaining a sound provision method according to an embodiment.

The electronic device 100, in operation 701, may provide a first text prompting the performance and/or cognition of a first portion of a periodic first biological signal and/or a second text prompting a first user activity. For instance, the electronic device 100 and/or the server 101 may perform connection and/or authentication procedures associated with the user's account. After completing the connection and/or authentication procedures, the electronic device 100 may provide the first text and/or the second text. In operation 703, the electronic device 100 may determine whether the occurrence of the first user activity is identified. Based on identifying the occurrence of the first user activity (703 operation—Yes), the electronic device 100, in operation 705, may provide a first content and/or a first sound associated with the performance of the first portion of the first biological signal, the cognition of the first portion, and/or the performance of the first user activity. After beginning the provision of the first content and/or the first sound, in operation 707, the electronic device 100 may determine whether the occurrence of the second user activity is identified. If the occurrence of the second user activity is not identified (707 operation—No), the electronic device 100 may maintain the provision of the first content and/or the first sound, but this is not limiting. Based on identifying the occurrence of the second user activity (707 operation—Yes), the electronic device 100, in operation 709, may provide a third text prompting the performance and/or cognition of the second portion of the periodic first biological signal and/or a fourth text prompting the second user activity. In operation 711, the electronic device 100 may provide a second content and/or a second sound associated with the performance of the second portion of the first biological signal, the cognition of the second portion, and/or the performance of the second user activity. Although not shown, after beginning the provision of the second content and/or the second sound, the electronic device 100 may again determine whether the first user activity is identified.

Figure 7B:
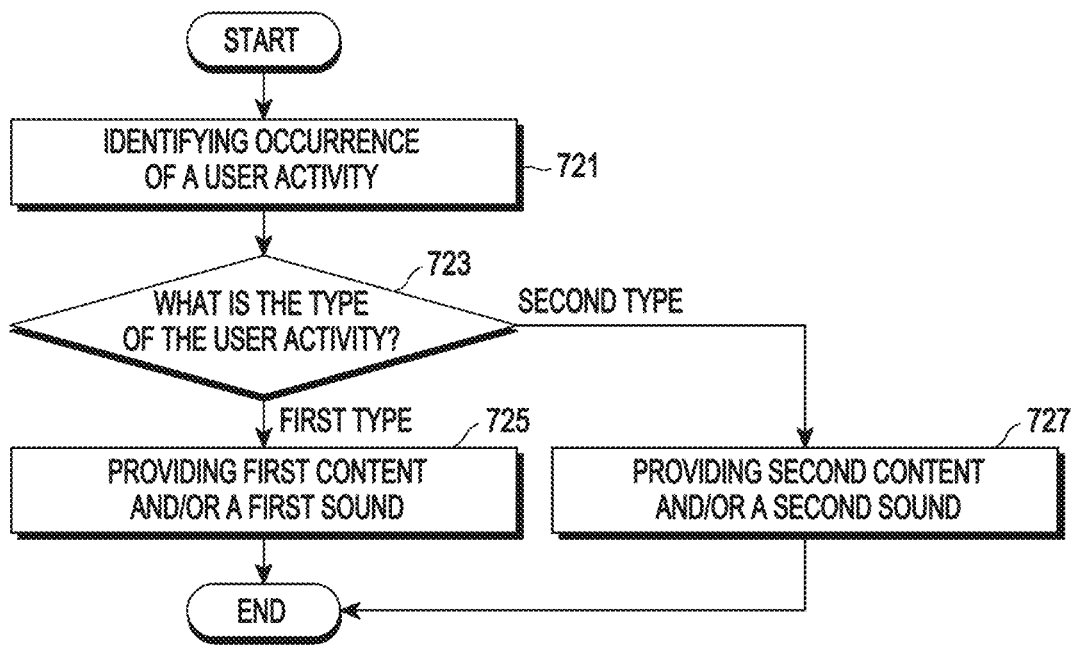

FIG. 7B illustrates a diagram for explaining a sound provision method according to an embodiment.

The electronic device 100, in operation 721, may identify the occurrence of a user activity. In operation 723, the electronic device 100 may identify the type of the user activity. The distinction between operations 721 and 723 is illustrative, the electronic device 100 may alternatively be implemented to directly identify the occurrence of a user activity of a specific type, as understood by those skilled in the art. If the type of user activity is identified as a first type, the electronic device 100, in operation 725, may provide a first content and/or a first sound associated with the performance of the first portion of the first biological signal, the cognition of the first portion, and/or the performance of the first type of user activity. The first sound may correspond to the first type of user activity. If the type of user activity is identified as a second type, the electronic device 100, in operation 727, may provide a second content and/or a second sound associated with the performance of the second portion of the first biological signal, the cognition of the second portion, and/or the performance of the second type of user activity. The second sound may correspond to the second type of user activity.

Figure 7C:
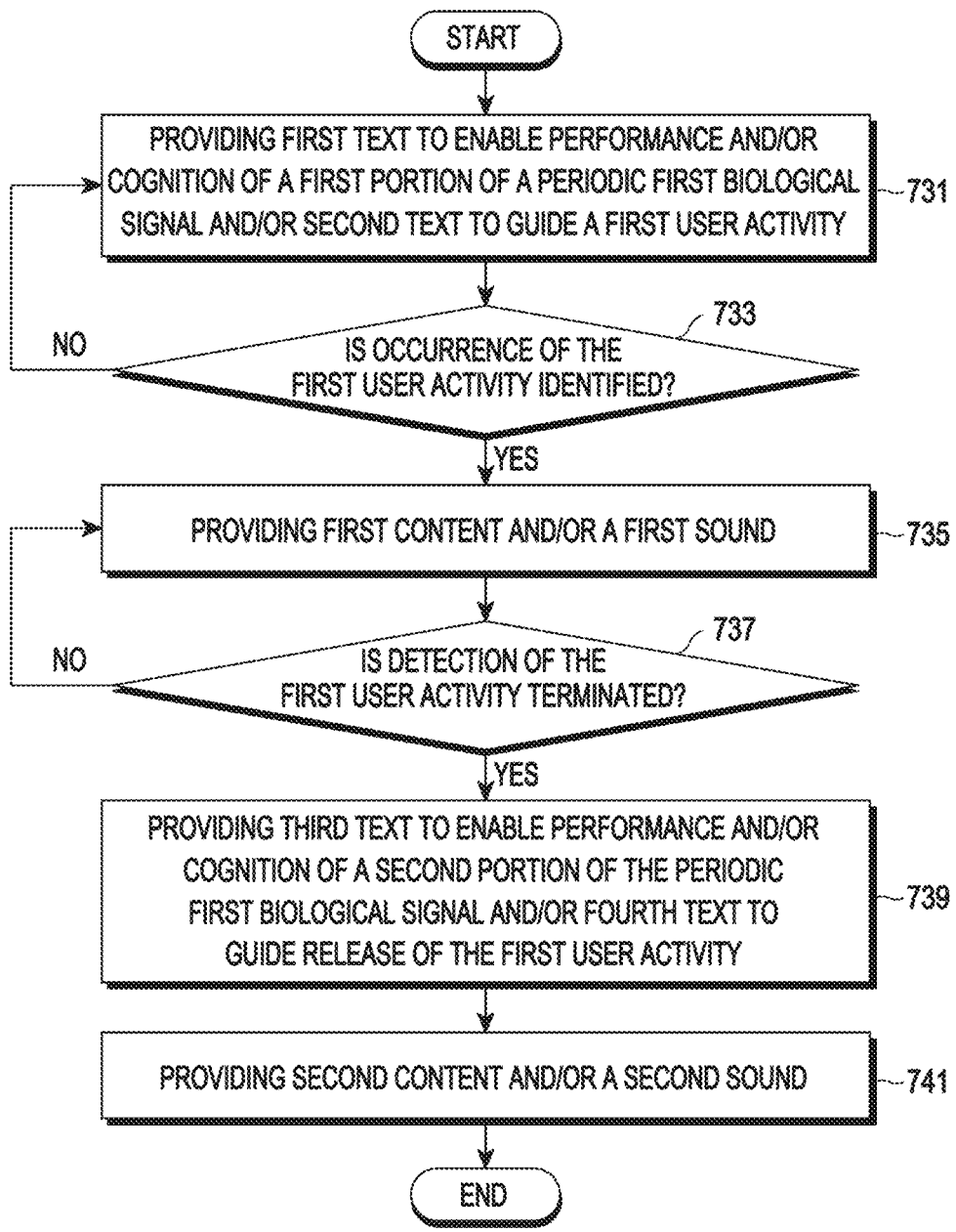

FIG. 7C illustrates a diagram for explaining a sound provision method according to an embodiment.

The electronic device 100, in operation 731, may provide a first text to facilitate performing and/or recognizing the first portion of a periodic first biological signal and/or a second text to guide the first user activity. In operation 733, the electronic device 100 may identify whether the first user activity occurs. Based on identifying the occurrence of the first user activity (operation 733—Yes), the electronic device 100, in operation 735, may provide a first content and/or a first sound associated with performing the first portion of the first biological signal, recognizing the first portion, and/or performing the first user activity. After starting the provision of the first content and/or the first sound, the electronic device 100, in operation 737, may identify whether the detection of the first user activity is interrupted. If the detection of the first user activity is maintained (operation 737—No), the electronic device 100 may continue providing the first content and/or the first sound, although this is not limiting. Based on identifying the failure to detect the first user activity (operation 737—Yes), the electronic device 100, in operation 739, may provide a third text to facilitate performing and/or recognizing the second portion of the periodic first biological signal and/or a fourth text to guide the release of the first user activity. In operation 741, the electronic device 100 may provide a second content and/or a second sound associated with performing the second portion of the first biological signal, recognizing the second portion, and/or releasing the first user activity. Although not illustrated, the electronic device 100 may subsequently identify whether the first user activity occurs again after starting the provision of the second content and/or the second sound.

Figure 7D:
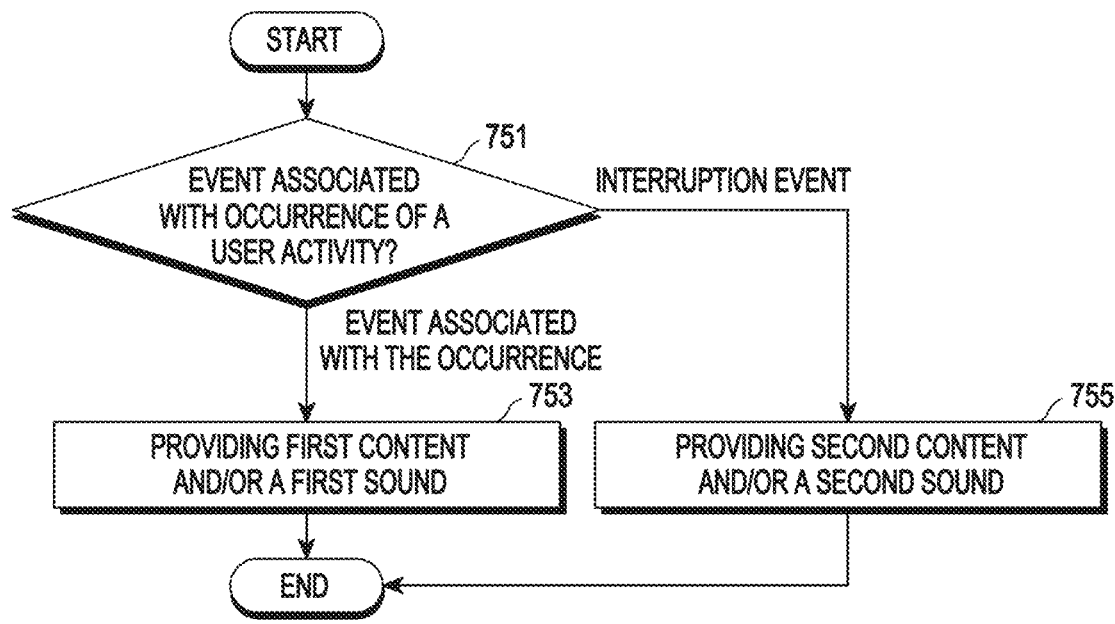

FIG. 7D illustrates a diagram for explaining a sound provision method according to an embodiment.

The electronic device 100, in operation 753, may identify the type of event associated with the occurrence of a user activity. If the type of event is an occurrence event of the user activity, the electronic device 100, in operation 753, may provide first content and/or a first sound associated with performing the first portion of a periodic first biological signal, recognizing the first portion, and/or performing the first type of user activity. The first sound may correspond to the first type of user activity. If the type of event is an interruption event of the user activity, the electronic device 100, in operation 755, may provide second content and/or a second sound associated with performing the second portion of the periodic first biological signal, recognizing the second portion, and/or releasing the first type of user activity. The second sound may correspond to the second type of user activity.

Figure 8A:
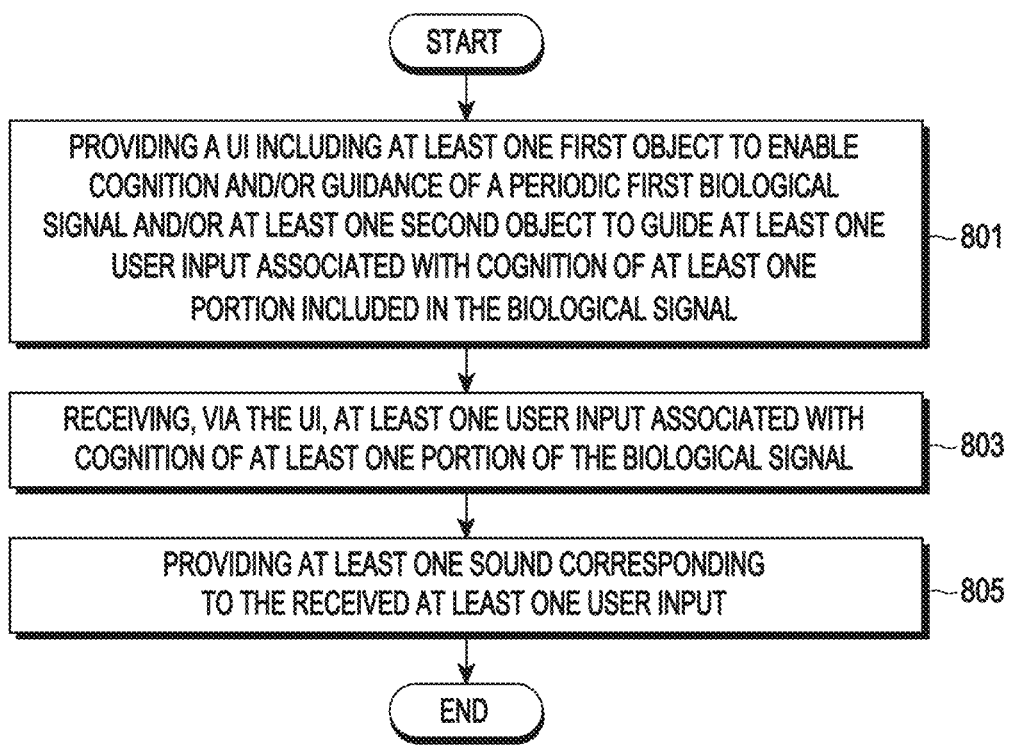
FIG. 8A is a diagram illustrating a method for providing sound according to an embodiment.

FIG. 8A illustrates a diagram explaining a sound provision method according to an embodiment. The embodiment of FIG. 8A will be explained with reference to FIG. 8B, which depicts a screen provided according to an embodiment.

Figure 8B:
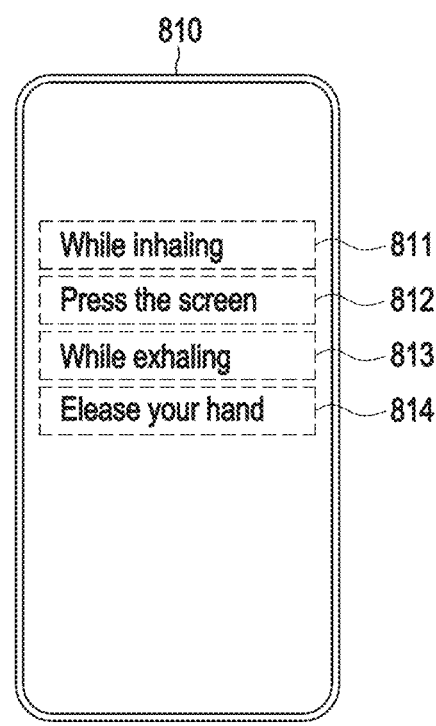
FIG. 8B is a diagram illustrating a screen provided according to an embodiment.

The electronic device 100, in operation 801, may provide a user interface that includes at least one first object for recognizing and/or inducing periodic first biological signals, and/or at least one second object for inducing user input associated with recognizing at least one part of the biological signals. For example, as shown in FIG. 8B, the electronic device 100 may provide a user interface 810. The user interface 810 may include a first sub-object 811 to induce inhalation, the first portion of the first biological signal, with a prompt such as "Take a deep breath." The user interface 810 may also include a second sub-object 812 to induce performance of a first user activity associated with recognizing the first portion of the first biological signal, with a prompt such as "Press and hold the screen." The user interface 810 may further include a third sub-object 813 to induce exhalation, the second portion of the first biological signal, with a prompt such as "Exhale slowly." It may also include a fourth sub-object 814 to induce performance of a second user activity associated with recognizing the second portion of the first biological signal, with a prompt such as "Release your hand." The first sub-object 811 and third sub-object 813 may be included in at least one first object for recognizing and/or inducing the first biological signal, as shown in FIG. 8A. The second sub-object 812 and fourth sub-object 814 may be included in at least one second object for inducing user input associated with recognizing at least one part of the biological signal, as described in FIG. 8A. In one example, independently of the type of detected user activity and/or the type of sound being provided, the electronic device 100 may maintain the provision of the user interface 810; however, this is merely illustrative. In other implementations, as explained with reference to FIG. 3A, the user interface displayed on the screen may change depending on the type of detected user activity and/or the type of sounds being provided, as will be understood by those skilled in the art.

Meanwhile, in the embodiment of FIG. 8A, the visual representation of the first object and/or the second object described is merely illustrative, and the method of representing the first object and/or the second object is not limited. For example, instead of, or in addition to, the visual representation of the sub-objects 811, 812, 813, and 814 described in FIG. 8B, corresponding audio outputs may be provided. Similarly, in embodiments other than FIG. 8A, the visual representation of text (or objects and/or content) may be replaced with auditory representations, or auditory representations may be additionally provided along with visual representations.

Figure 8C:
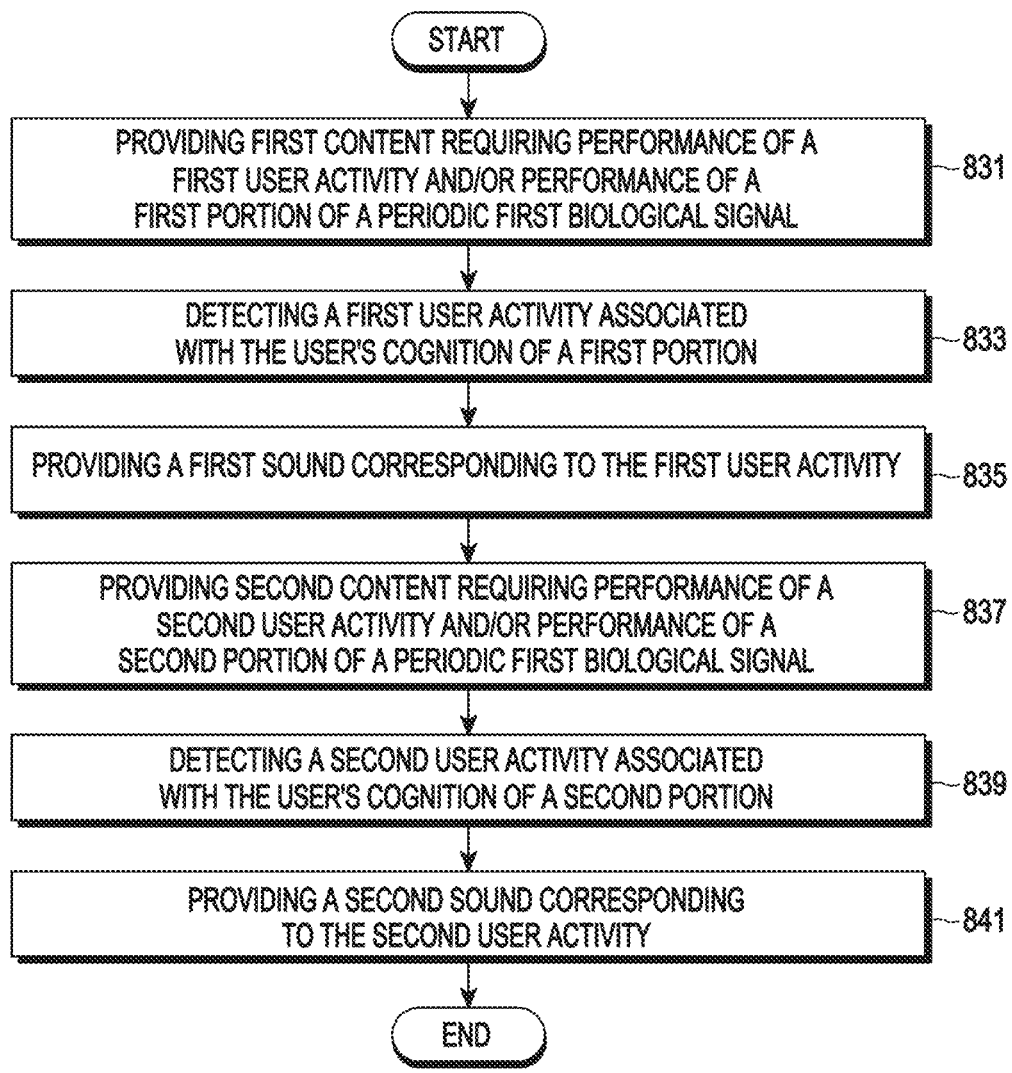
FIG. 8C is a diagram illustrating a method for providing sound according to an embodiment.

FIG. 8C illustrates a diagram explaining a sound provision method according to an embodiment.

The electronic device 100, in operation 831, may provide first content that requires the performance of a first user activity and/or the performance of the first part of a first biometric signal with periodicity, based on the detection of the first user activity. In operation 833, the electronic device 100 may detect the first user activity associated with the user's cognition of the first part of the first biometric signal. For instance, the electronic device 100 may detect the first user activity after the provision of the first content has begun; however, the detection timing is not limited. In operation 835, the electronic device 100 may provide a first sound corresponding to the first user activity. The first sound may be substantially synchronized with the detection of the first user activity.

The electronic device 100, in operation 837, may provide second content that requires the performance of a second user activity and/or the performance of the second part of the first biometric signal with periodicity, based on the detection of the second user activity. In operation 839, the electronic device 100 may detect the second user activity associated with the user's cognition of the second part of the first biometric signal. For instance, the electronic device 100 may detect the second user activity after the provision of the second content has begun, however, the detection timing is not limited. In operation 841, the electronic device 100 may provide a second sound corresponding to the second user activity. The second sound may be substantially synchronized with the detection of the second user activity.

Figure 9:
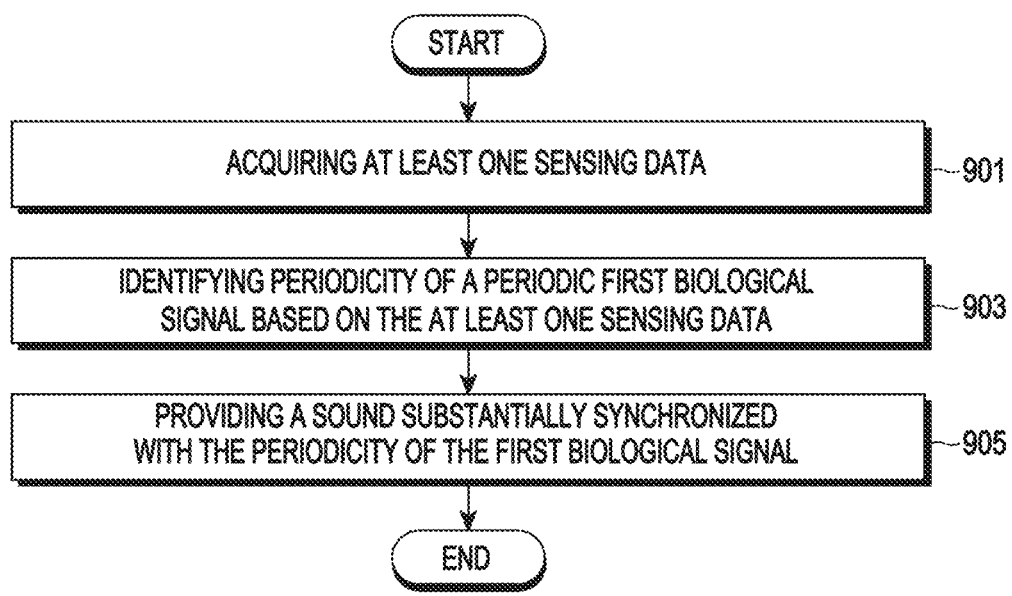
FIG. 9 is a diagram illustrating a method for providing sound according to an embodiment.

FIG. 9 illustrates a diagram explaining a method for providing sound according to an embodiment.

The electronic device 100, in operation 901, may acquire at least one sensing data. In operation 903, based on the at least one sensing data, the electronic device 100 may identify the periodicity of a first biometric signal having periodicity. The at least one sensing data may, for example, be associated with characteristics naturally (or non-intentionally) manifested by the user and related to the periodicity of the first biometric signal. For instance, if the first biometric signal is breathing, the thorax may rise during inhalation and lower during exhalation. Based on data related to the rising and lowering movements of the thorax, the periodicity of breathing (e.g., inhalation duration, exhalation duration, and/or the total breathing cycle) may be identified. Meanwhile, data associated with thoracic movement is merely an example. Various data, such as airflow data through the nose/mouth, ECG sensing data (e.g., changes in the RR interval, though not limited to this), may alternatively and/or additionally be utilized to identify the periodicity of the first biometric signal, as would be understood by one skilled in the art.

The electronic device 100, in operation 905, may provide a sound that is substantially synchronized with the periodicity of the first biometric signal. For example, the start time of a first sound may be substantially synchronized with the start time of the first portion of the first biometric signal. Similarly, the end time of the first sound may be substantially synchronized with the end time of the first portion of the first biometric signal (or possibly the start time of the second portion). For instance, the application time of an end effect (or the time associated with the end-related sound provision) for the first sound may be substantially synchronized with the end time of the first portion of the first biometric signal (or the start time of the second portion). Likewise, the start time of a second sound may be substantially synchronized with the start time of the second portion of the first biometric signal. Additionally, the end time of the second sound may be substantially synchronized with the end time of the second portion of the first biometric signal (or possibly the start time of the first portion). For instance, the application time of an end effect (or the time associated with the end-related sound provision) for the second sound may be substantially synchronized with the end time of the second portion of the first biometric signal (or the start time of the first portion). As described with reference to FIG. 9, sounds synchronized with the biometric signal may be provided based on the analysis of biometric data rather than detecting at least one user activity. One skilled in the art would understand that, in various embodiments of this disclosure, detecting at least one user activity may be replaced with identifying at least one biometric data to determine the periodicity of the biometric signal.

Figure 10A:
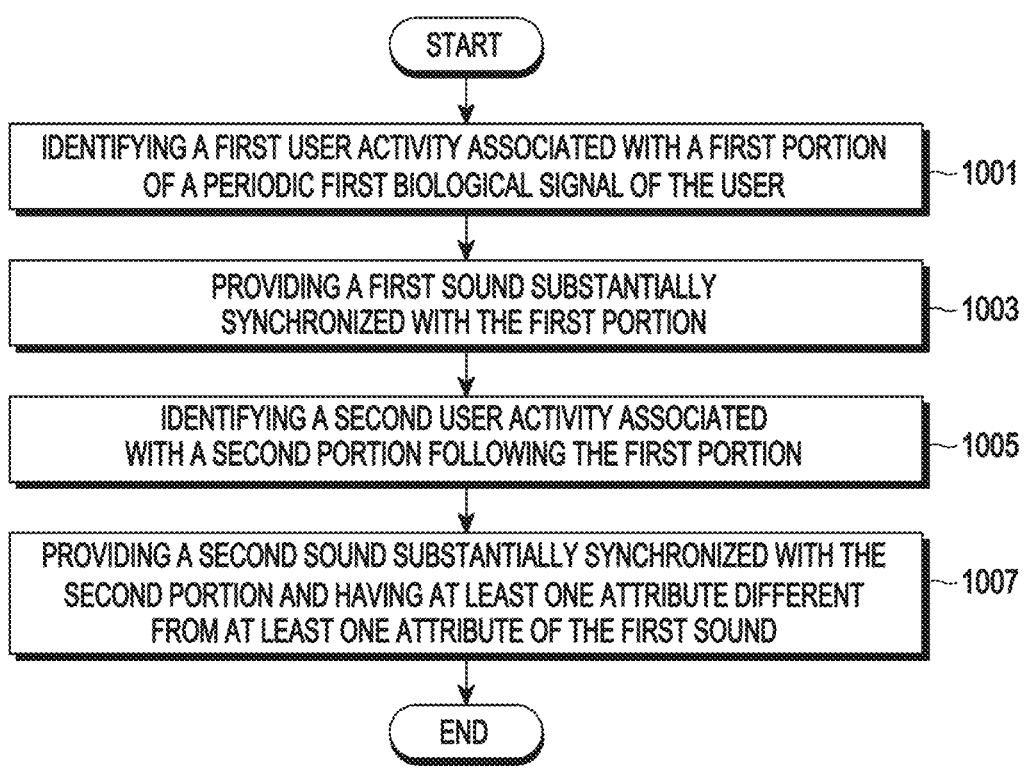
FIG. 10A is a diagram illustrating a method for providing sound according to an embodiment.
Figure 10B:
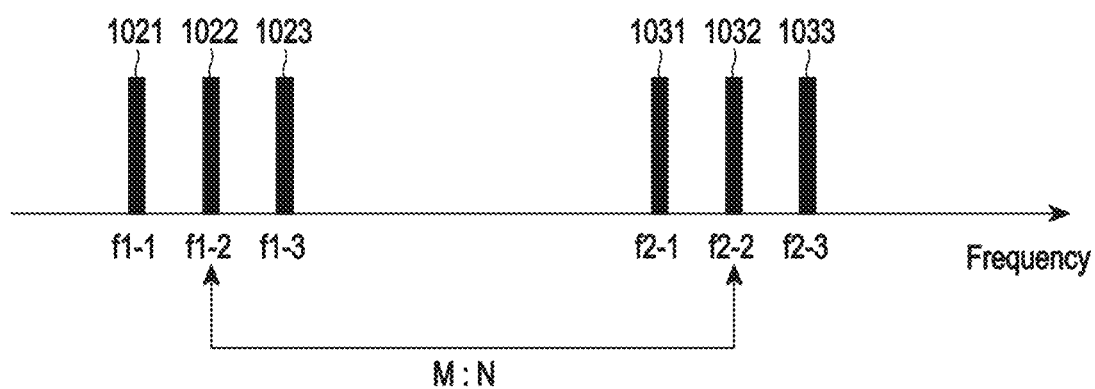
FIG. 10B is a diagram illustrating the frequency of sub-sounds provided according to an embodiment.

FIG. 10a illustrates a diagram explaining a sound provision method according to an embodiment. The embodiment of FIG. 10a is described with reference to FIG. 10b, which explains the frequency of sub-sounds provided according to the embodiment. The electronic device 100, in operation 1001, may identify a first user activity associated with the first portion of a periodic first biometric signal of the user. In operation 1003, the electronic device 100 may provide a first sound that is substantially synchronized with the first portion. For example, as shown in FIG. 10b, the first sound may include (or be the composite result of) first sub-sound 1021, second sub-sound 1022, and third sub-sound 1023. Each of these sub-sounds may have respective frequencies of f1-1, f1-2, and f1-3. For instance, the first, second, and third sub-sounds may be provided substantially simultaneously, although this is not limiting. In operation 1005, the electronic device 100 may identify a second user activity associated with a second portion that follows the first portion. In operation 1007, the electronic device 100 may provide a second sound that is substantially synchronized with the second portion and has at least one property different from that of the first sound. For instance, as shown in FIG. 10b, the second sound may include (or be the composite result of) fourth sub-sound 1031, fifth sub-sound 1032, and sixth sub-sound 1033. The fourth, fifth, and sixth sub-sounds may also be provided substantially simultaneously, but this is not limiting. Each of these sub-sounds may have respective frequencies of f2-1, f2-2, and f2-3. For example, the frequencies f1-2 and f2-2 may have an integer ratio of M:N, such as 2:3 (or 3:2) or 3:4 (or 4:3). Based on the above, if the first biometric signal corresponds to breathing, the electronic device 100 may enable the user to experience sounds based on different frequencies during inhalation and exhalation, helping the user to perceive periodicity. It should be noted that providing a sound corresponding to user activity as the composite result of multiple sub-sounds, as described in FIG. 10b, is merely illustrative. A single sound, rather than a composite result of multiple sub-sounds, may also be provided, as understood by those skilled in the art.

Figure 10C:
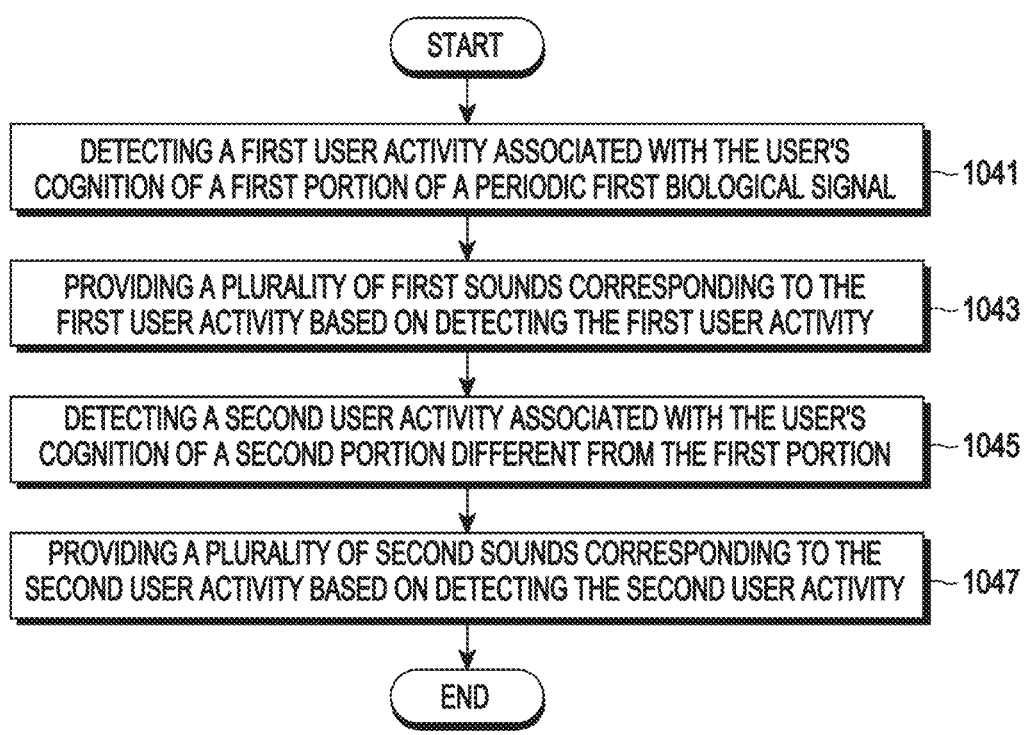
FIG. 10C is a diagram illustrating a method for providing sound according to an embodiment.

FIG. 10c illustrates a diagram explaining a sound provision method according to an embodiment. The embodiment of FIG. 10c is described with reference to FIGS. 10d and 10e, which explain sound characteristics according to various embodiments.

According to an embodiment, the electronic device 100, in operation 1041, may identify a first user activity associated with the first portion of a first biometric signal. In operation 1043, the electronic device 100 may provide a first sound with properties associated with increased tension (or tension induction). In operation 1045, the electronic device 100 may identify a second user activity associated with the second portion of the first biometric signal. In operation 1047, the electronic device 100 may provide a second sound with properties associated with tension relief (or relaxation). For instance, if the first biometric signal corresponds to breathing, a first sound intended for tension induction may be provided during the inhalation phase, while a second sound intended for tension relief may be provided during the exhalation phase. However, this is merely an illustrative example and is not limiting.

Figure 10D:
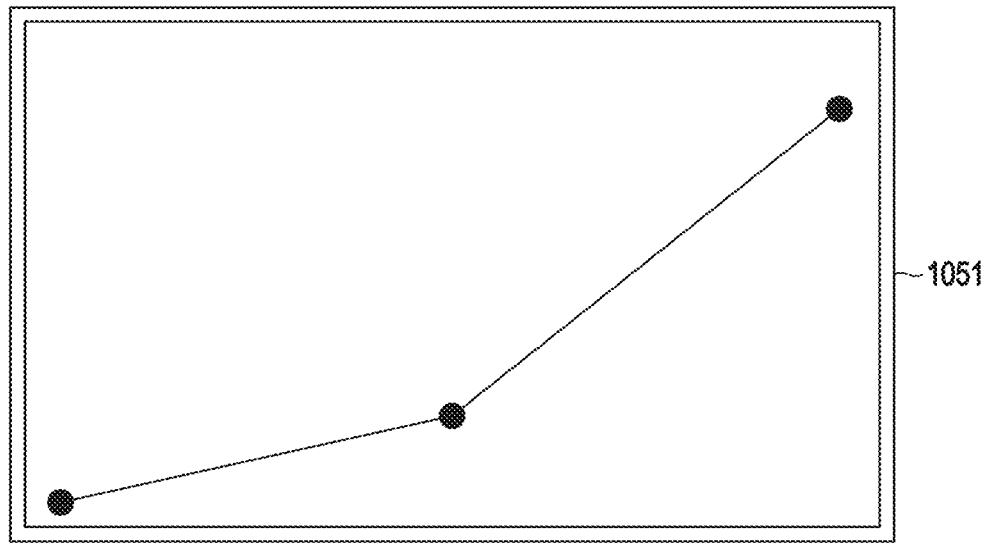
FIGS. 10D and 10E are diagrams illustrating sound characteristics according to various embodiments.
Figure 10D:
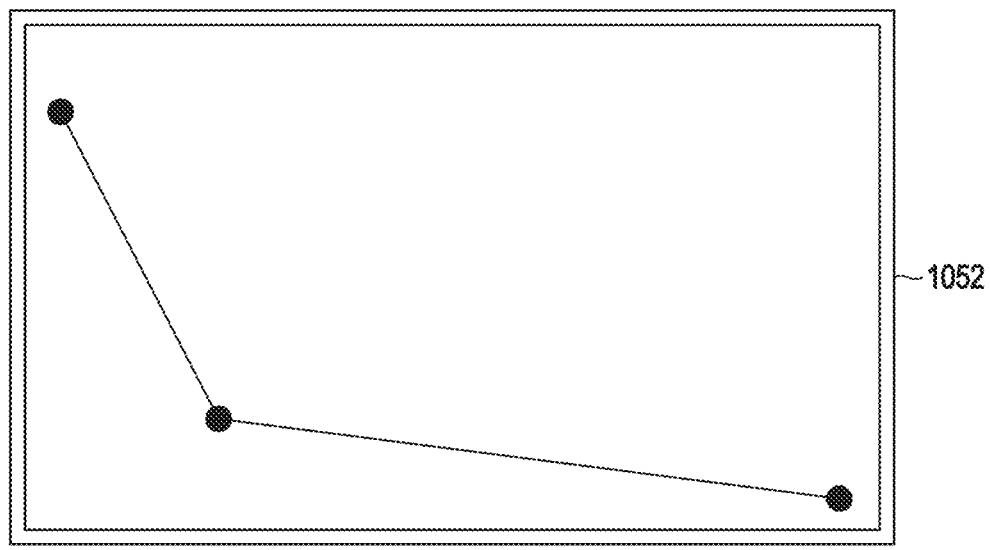
Figure 10E:
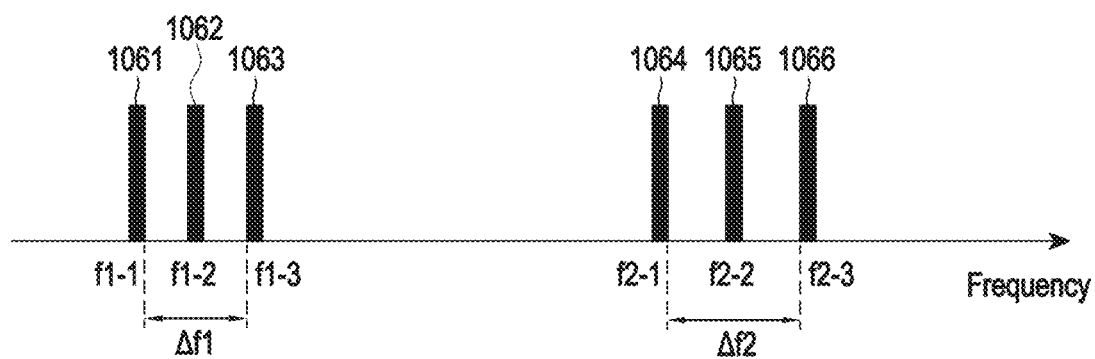

For example, referring to FIG. 10d, the modulation amount of sounds (1051, 1052) may represent one of the properties associated with tension induction and tension relief. For instance, the modulation amount (1051) of the first sound associated with tension induction may exhibit a tendency to increase over time. As the modulation amount increases, the number of frequency components may rise, which could correlate with the user's increasing (or induced) tension. Conversely, the modulation amount (1052) of the second sound associated with tension relief may exhibit a tendency to decrease over time. As the modulation amount decreases, the number of frequency components may reduce, potentially correlating with the user's relaxation (or tension relief). During inhalation, the user's ribcage rises, and certain muscles may become tense. In contrast, during exhalation, the ribcage lowers, and previously tense muscles may relax. According to various embodiments, sounds with properties associated with tension induction may be provided during inhalation, while sounds with properties associated with tension relief may be provided during exhalation. Consequently, not only is the effect of entrainment enhanced, but the user's relaxation may be effectively induced, thereby improving the onset of sleep.

On the other hand, in another example, it may be implemented such that a sound with a relatively large modulation amount is provided during the first portion (e.g., the inhalation portion), and a sound with a relatively small modulation amount is provided during the second portion (e.g., the exhalation portion). A large modulation amount can, for instance, be expressed as having a relatively high modulation index, while a small modulation amount may be expressed as having a relatively low modulation index. This variation in modulation could be used to further enhance the user's experience or achieve specific physiological effects.

For example, referring to FIG. 10D, the frequency interval ($\Delta f1$, $\Delta f2$) between sub-sounds constituting a sound may be one of the attributes associated with tension increase and tension relaxation. For instance, a first sound associated with tension increase may consist of multiple first sub-sounds (1061, 1062, 1063). The frequencies of these sub-sounds may be f1-1, f1-2, and f1-3. The difference between the lowest frequency f1-1 and the highest frequency f1-3 may represent the first frequency interval ($\Delta f1$). Similarly, a second sound associated with tension relaxation may consist of multiple second sub-sounds (1064, 1065, 1066). The frequencies of these sub-sounds may be f2-1, f2-2, and f2-3. The difference between the lowest frequency f2-1 and the highest frequency f2-3 may represent the second frequency interval ($\Delta f2$). For example, the second frequency interval ($\Delta f2$), associated with tension relaxation, may be larger than the first frequency interval ($\Delta f1$), associated with tension increase. When the frequency interval is relatively small, sound synthesis is more likely to occur, potentially leading to dissonant intervals or harmonies, which may contribute to an unstable harmony. This effect is more likely to be associated with tension increase. Conversely, when the frequency interval is relatively large, sound synthesis occurs less frequently, resulting in fewer dissonant elements arising from the overlap of harmonics. This is more likely to be associated with tension relaxation.

Figure 11A:
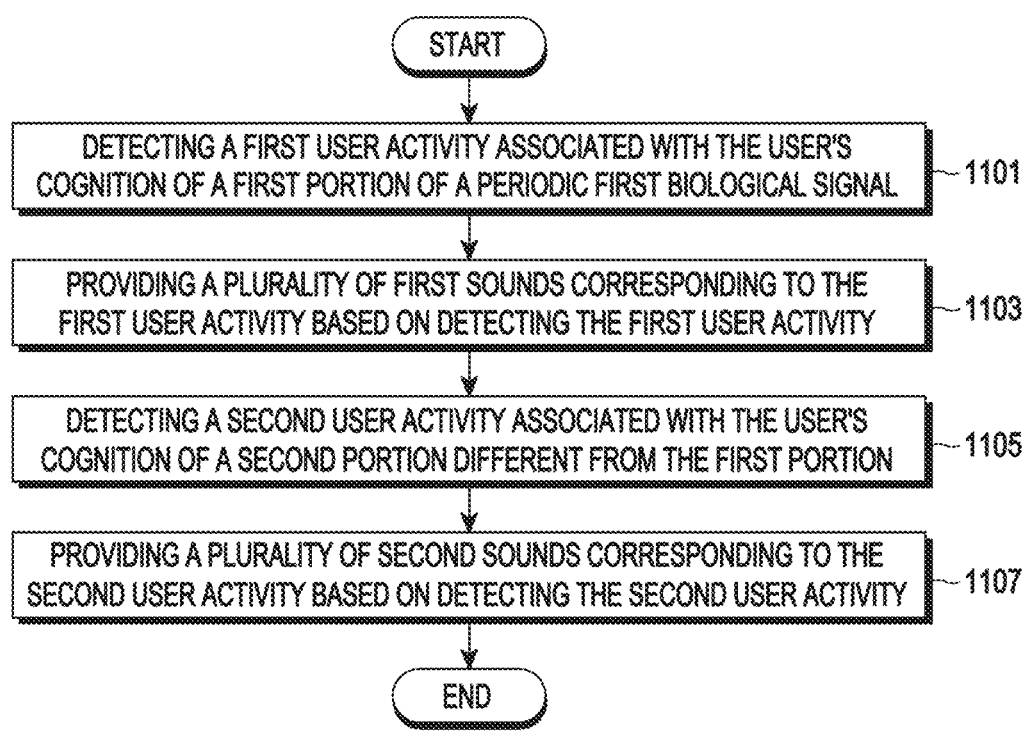
FIG. 11A is a diagram illustrating a method for providing sound according to an embodiment.
Figure 11B:
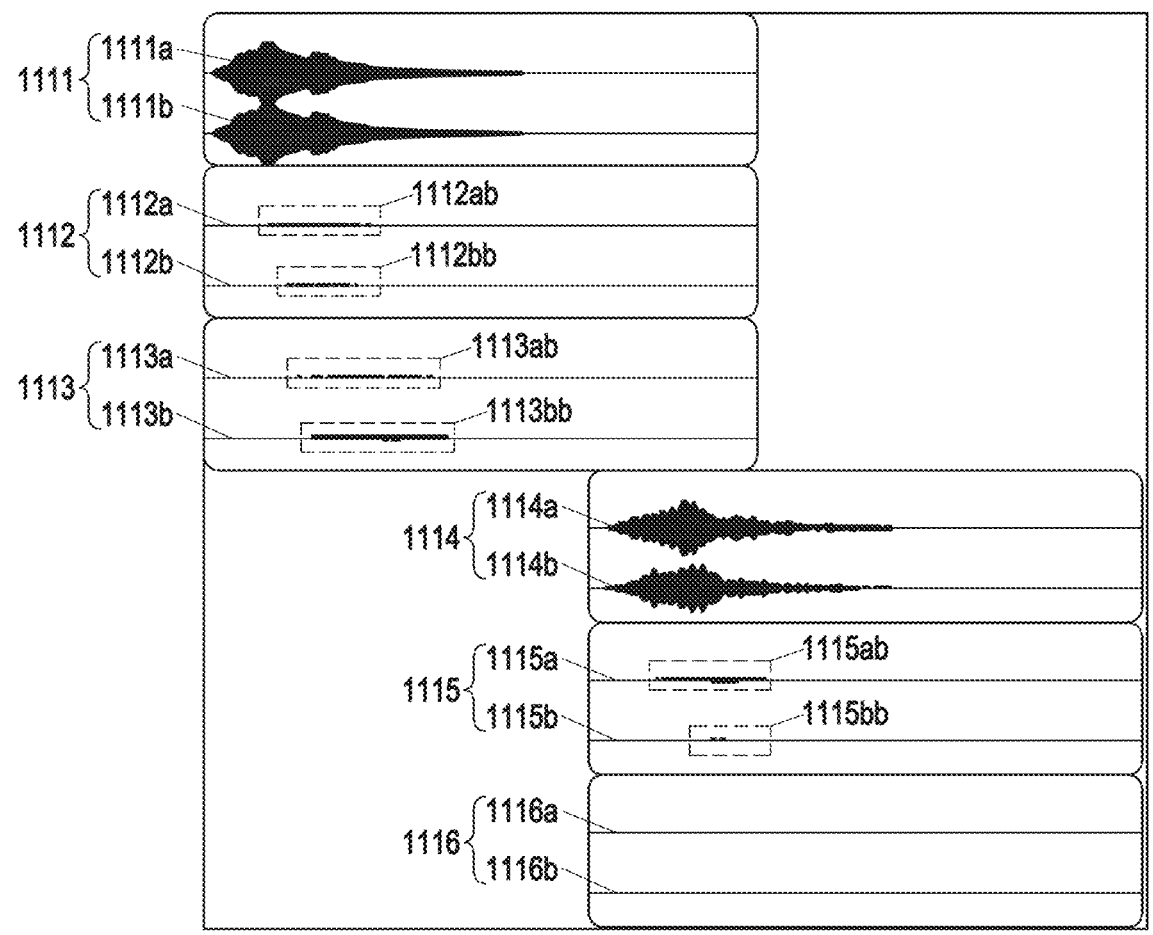
FIG. 11B is a diagram illustrating multiple sounds according to an embodiment.
Figure 11C:
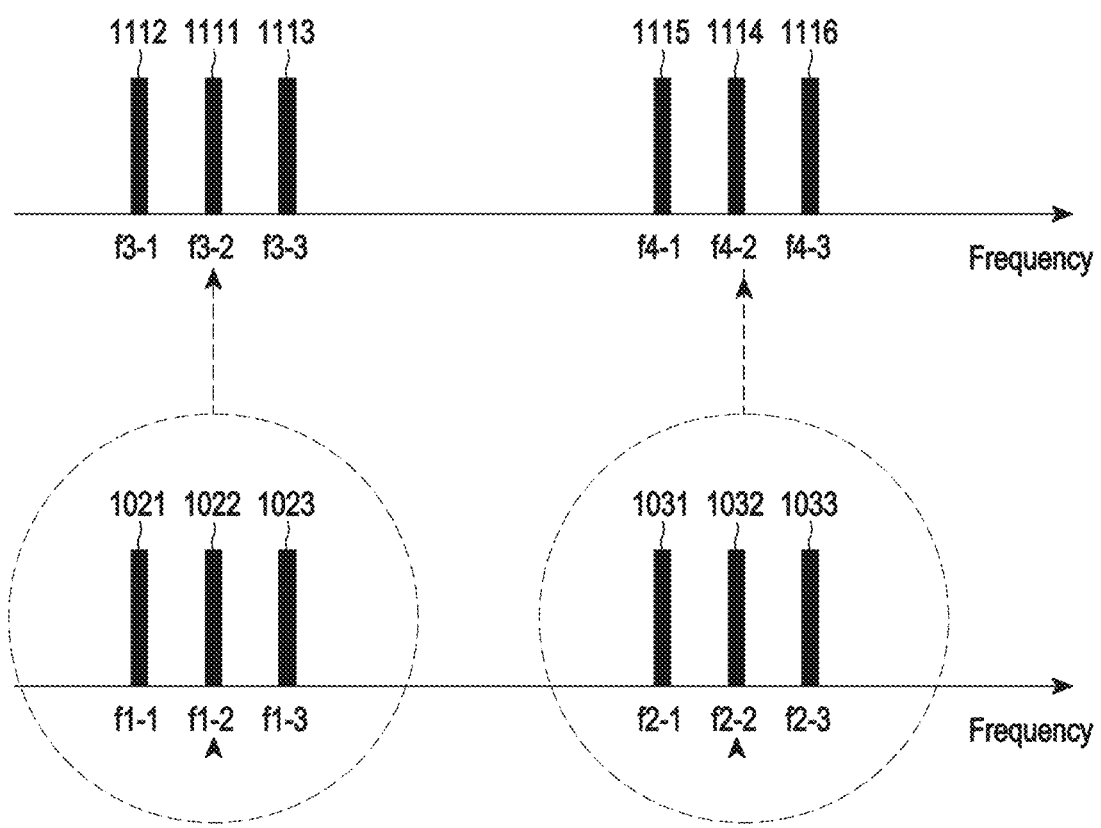
FIG. 11C is a diagram illustrating the frequencies of multiple sounds.
Figure 11D:
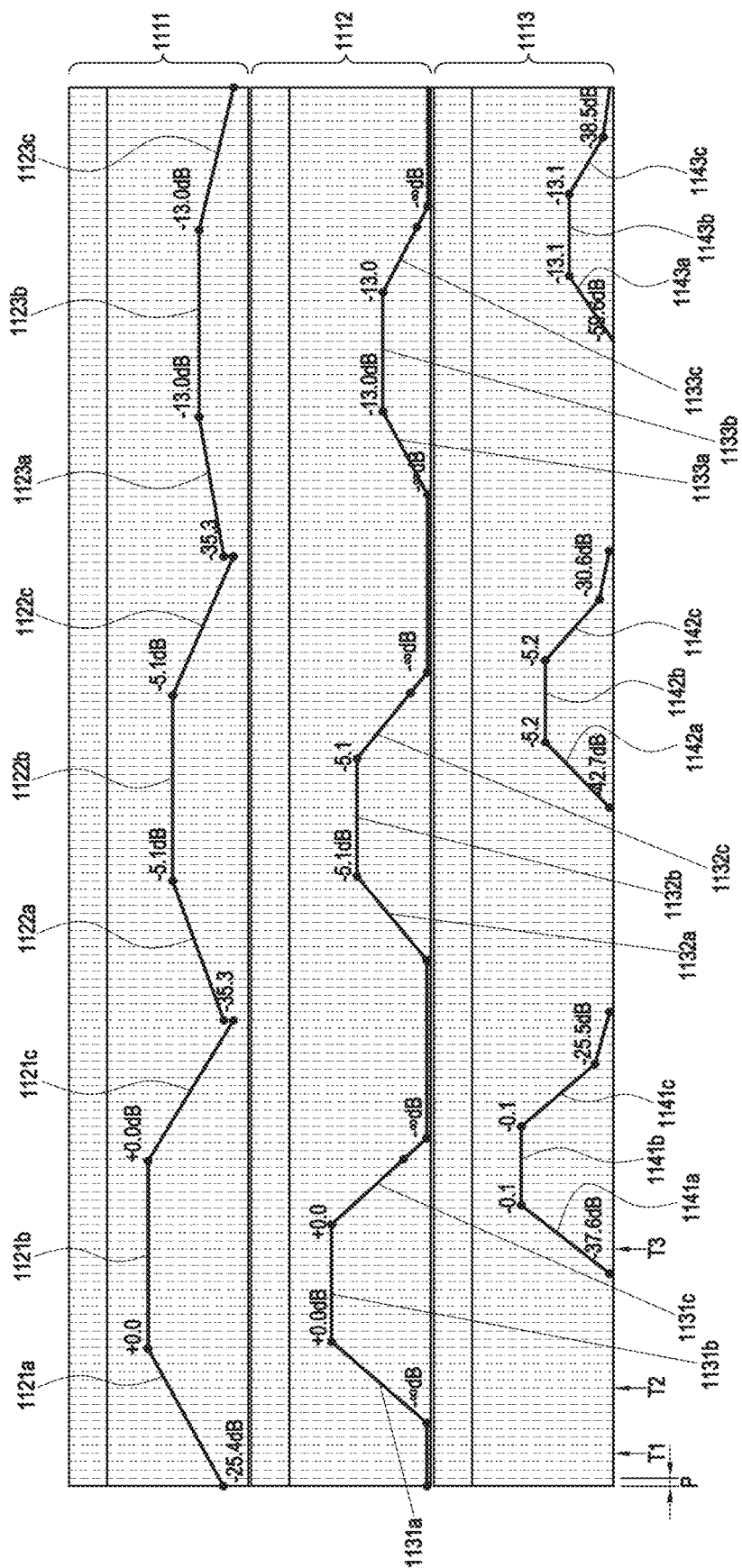
FIG. 11D is a diagram illustrating amplitude changes in multiple sounds.

FIG. 11A is a diagram illustrating a sound provision method according to an embodiment. The embodiment of FIG. 11A will be explained with reference to FIGS. 11B to 11D. FIG. 11B illustrates multiple sounds according to the embodiment. FIG. 11C describes the frequencies of the multiple sounds. FIG. 11D explains the amplitude variations of the multiple sounds.

According to an embodiment, the electronic device 100 may detect, in operation 1101, a first user activity associated with the user's cognition of a first portion of a periodic first biological signal. Based on the detection of the first user activity, the electronic device 100 may provide, in operation 1103, multiple first sounds corresponding to the first user activity, such as those shown in FIG. 11B (e.g., sounds 1111a, 1111b, 1112a, 1112b, 1113a, 1113b). For example, sounds 1111a and 1111b may be sounds intended for the left ear and right ear, respectively, in a stereo or earphone environment. In FIG. 11B, the "a" notation represents sounds for the left ear, while the "b" notation represents sounds for the right ear. For instance, as shown in FIG. 11C, sounds 1111a and 1111b may have a frequency of f3-2, sounds 1112a and 1112b may have a frequency of f3-1, and sounds 1113a and 1113b may have a frequency of f3-3.

The electronic device 100 may, in operation 1105, detect a second user activity associated with the user's cognition of a second portion of the first biological signal, which is different from the first portion. Based on the detection of the second user activity, the electronic device 100 may, in operation 1107, provide multiple second sounds corresponding to the second user activity, such as those shown in FIG. 11B (e.g., sounds 1114a, 1114b, 1115a, 1115b, 1116a, 1116b). For instance, as shown in FIG. 11C, sounds 1114a and 1114b may have a frequency of f4-2, sounds 1115a and 1115b may have a frequency of f4-1, and sounds 1116a and 1116b may have a frequency of f4-3. In one example, sound 1111 may include (or be the result of) multiple sub-sounds (e.g., 1021, 1022, 1023), and sound 1114 may include (or be the result of) multiple sub-sounds (e.g., 1031, 1032, 1033), however, this is merely illustrative and not limiting. While sounds 1112, 1113, 1115, and 1116 are depicted as having a single frequency, this is also illustrative. Additionally, as shown in FIG. 11B, at least one portion of sounds 1112a, 1112b, 1112ab, 1112bb, 1113ab, 1113bb, 1114a, 1114b, 1115ab, and 1115bb may include waveforms with special effects (e.g., noise effects or ripple effects, though not limited to these), but such implementations are not restrictive.

In FIG. 11D, the amplitude changes over accumulated counts for multiple sounds 1111, 1112, 1113 are described. As explained in FIG. 3I, the "P" period may refer to the time during which a sound is provided once in response to the detection of a user activity. The amplitude of sound 1111 may include multiple rising portions 1121a, 1122a, 1123a, multiple sustaining portions 1121b, 1122b, 1123b, and multiple declining portions 1121c, 1122c, 1123c. Similarly, the amplitude of sound 1112 may include multiple rising portions 1131a, 1132a, 1133a, multiple sustaining portions 1131b, 1132b, 1133b, and multiple declining portions 1131c, 1132c, 1133c. The amplitude of sound 1113 may also include multiple rising portions 1141a, 1142a, 1143a, multiple sustaining portions 1141b, 1142b, 1143b, and multiple declining portions 1141c, 1142c, 1143c. As shown in FIG. 11D, the timing of amplitude increases, sustains, and decreases for each sound 1111, 1112, 1113 may vary, allowing the amplitude combinations of sounds to differ per provision period. For instance, during the T1 provision period, sound 1111 may be provided, while sounds 1112 and 1113 may not be provided. During the T2 provision period, sounds 1111 and 1112 may be provided, but sound 1113 may not, resulting in a composite sound based on the amplitude combination of sounds 1111 and 1112 at the T2 time. During the T3 provision period, a composite sound based on the amplitude combination of sounds 1111, 1112, and 1113 at the T3 time may be provided. Accordingly, a different composite sound may be provided for each provision period (P), maintaining user interest. One critical metric indicating the effectiveness of digital content-based therapeutics is the user's content usage persistence. If users lose interest in the digital content, their likelihood of continued use decreases. To enhance usage persistence, changes to the content per provision period (P) and/or session may be required, rather than providing fixed sounds. The electronic device 100 according to the described embodiment may provide different composite sounds by altering the amplitude combinations of sounds 1111, 1112, and 1113 with each change in the provision period (P). Meanwhile, the amplitude changes for sounds 1111, 1112, and 1113 are illustrative, and there is no limitation on the types of sound properties that may be altered (e.g., frequency, timbre, etc.).

Figure 11E:
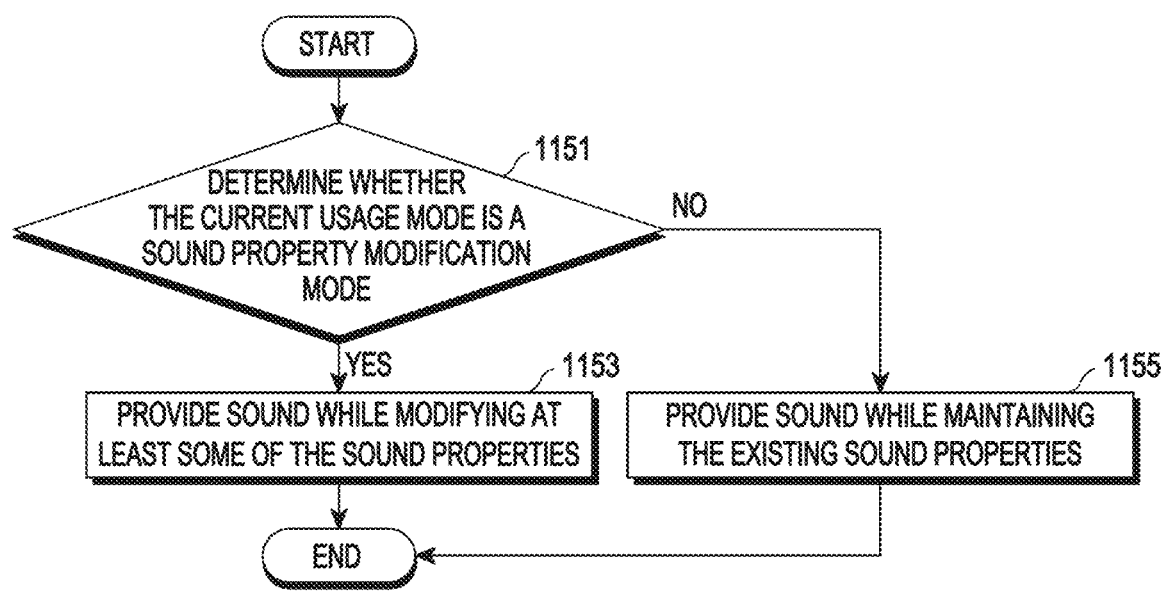
FIG. 11E is a diagram illustrating a method for providing sound according to an embodiment.

FIG. 11E describes a sound provision method according to an embodiment.

According to an embodiment, the electronic device 100, in operation 1151, may determine whether the current usage mode is a sound property modification mode. If the current usage mode is the sound property modification mode (operation 1151—Yes), the electronic device 100, in operation 1153, may provide sound while modifying at least some of the sound properties. There are no restrictions on how the sound properties are modified. If the current usage mode is not the sound property modification mode (operation 1151—No), the electronic device 100, in operation 1155, may provide sound while maintaining the existing sound properties. Modifying sound properties may enhance the user's continued use of the device. However, some users may prefer not to have sound properties modified.

The current usage mode may be manually set by the user. Alternatively, the current usage mode may be automatically set based on the user's sleep-related analysis results, as would be understood by one skilled in the art.

Figure 12A:
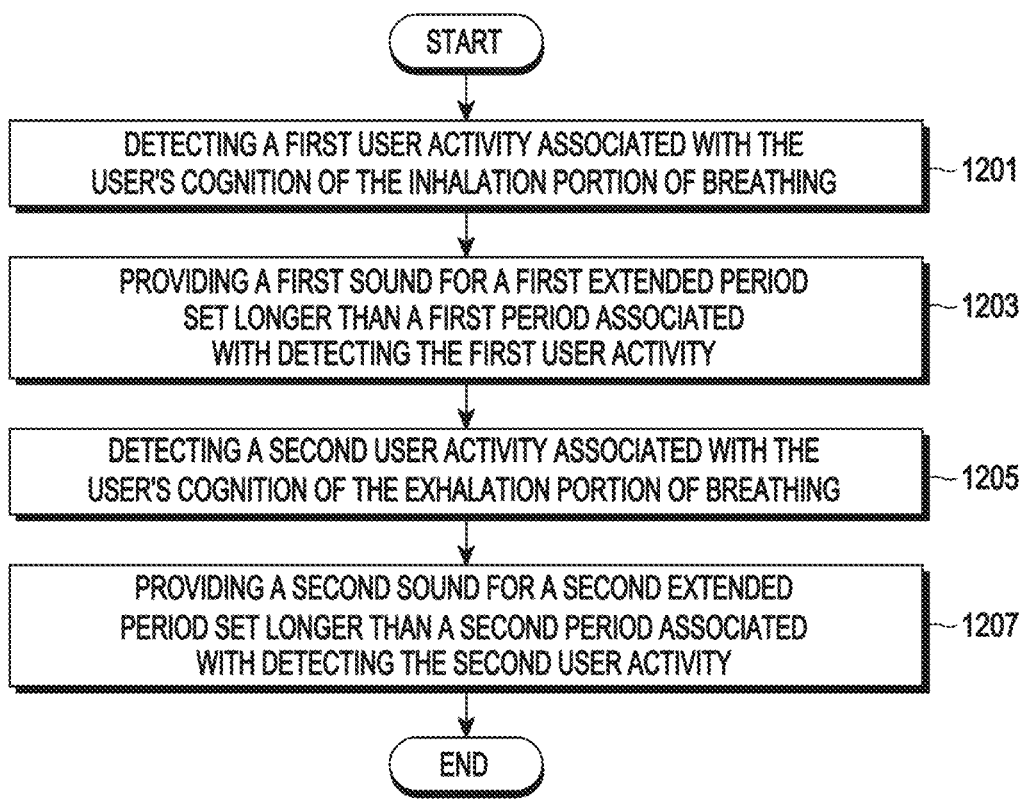
FIG. 12A is a diagram illustrating a method for providing sound according to an embodiment.
Figure 12B:
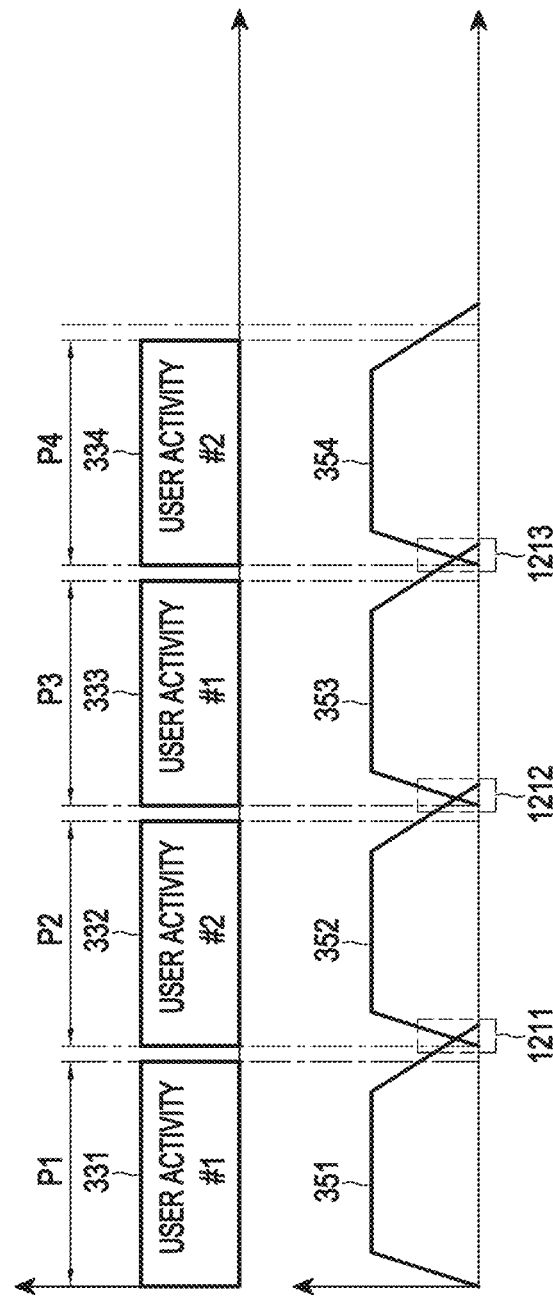
FIG. 12B is a diagram illustrating a sound according to an embodiment.

According to an embodiment, FIG. 12A illustrates a sound provision method. The embodiment of FIG. 12A will be explained with reference to FIG. 12B. FIG. 12B depicts the sound according to the embodiment. The electronic device 100 may, in operation 1201, detect a first user activity 331 associated with the user's cognition of the inhalation phase of breathing, as shown in FIG. 12B. The electronic device 100 may, in operation 1203, provide a first sound 351 for a first extended period longer than the first period P1 associated with the detection of the first user activity 331. For example, the electronic device 100 may synchronize the detection start time of the first user activity 331 with the start time of the first sound 351, while allowing the detection failure confirmation time of the first user activity 331 and the end time of the first sound 351 to remain unsynchronized. The implementation methods of such asymmetrical synchronization at start and end times have been described above and will not be repeated here. The electronic device 100 may, in operation 1205, detect a second user activity 332 associated with the user's cognition of the exhalation phase of breathing. The electronic device 100 may, in operation 1207, provide a second sound 352 for a second extended period longer than the second period P2 associated with the detection of the second user activity 332. For example, the electronic device 100 may synchronize the detection start time of the second user activity 332 with the start time of the second sound 352, while allowing the detection failure confirmation time of the second user activity 332 and the end time of the second sound 352 to remain unsynchronized. The implementation methods of such asymmetrical synchronization at start and end times have been described above and will not be repeated here. Accordingly, during the first overlapping period 1211, part of the first sound 351 and part of the second sound 352 may be provided simultaneously. For example, as described above, part of the first sound 351 and part of the second sound 352 may be provided simultaneously as independent players (or playback functions) for the first sound 351 and the second sound 352 are executed independently. However, there is no limitation on how simultaneous playback or composite sound representation is implemented. Meanwhile, if the detection period of the user activities 331 and 332 exceeds a predetermined threshold period, the electronic device 100 may be configured to provide sounds corresponding to the threshold period. The threshold period may, for example, correspond to a period determined (or set) as optimal for inducing sleep in the user, but is not limited thereto. As described above, by synchronizing the detection start times of the user activities 331 and 332 with the playback start times of the sounds 351 and 352, the user may perceive the sounds as being played based on their breathing, thereby enhancing their awareness of their breathing. Meanwhile, by not synchronizing the end times of the user activities 331 and 332 with the playback end times of the sounds 351 and 352, the user may be induced to perform longer breathing. Meanwhile, the provision of the first sound 353 based on the detection of the first user activity 333 and/or the provision of the second sound 354 based on the detection of the second user activity 334 may be substantially the same as the provision of the first sound 351 based on the detection of the first user activity 331 and/or the provision of the second sound 352 based on the detection of the second user activity 332. Accordingly, the descriptions provided above will not be repeated here.

Figure 12C:
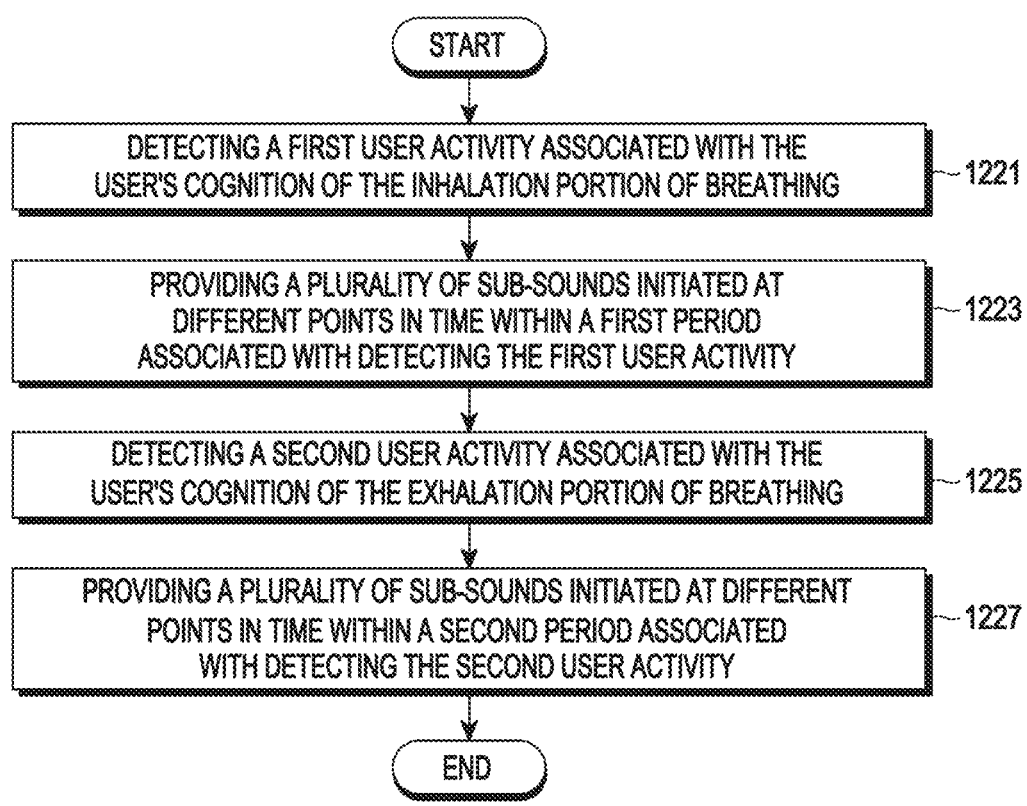
FIG. 12C is a diagram illustrating a method for providing sound according to an embodiment.

FIG. 12C illustrates a sound provision method according to an embodiment.

The electronic device 100 may, in operation 1221, detect a first user activity associated with the user's cognition of the inhalation phase of breathing.

The electronic device 100 may, in operation 1223, provide multiple sub-sounds, each initiated at different times within a first period associated with the detection of the first user activity. For example, the electronic device 100 may provide multiple sub-sounds corresponding to the first user activity, as described in FIG. 11B (e.g., the sub-sounds 1111, 1112, 1113 in FIG. 11B). The electronic device 100 may set different start times for the provision of the multiple sub-sounds (e.g., the sub-sounds 1111, 1112, 1113 in FIG. 11B). Alternatively, the electronic device 100 may set different peak times (or maximum amplitude times) for the multiple sub-sounds (e.g., the sub-sounds 1111, 1112, 1113 in FIG. 11B). Accordingly, the electronic device 100 may induce the user to perform a longer inhalation in response to the sub-sounds.

The electronic device 100 may, in operation 1225, detect a second user activity associated with the user's cognition of the exhalation phase of breathing. The electronic device 100 may, in operation 1227, provide multiple sub-sounds, each initiated at different times within a second period associated with the detection of the second user activity. For example, the electronic device 100 may provide multiple sub-sounds corresponding to the second user activity, as described in FIG. 11B (e.g., the sub-sounds 1114, 1115, 1116 in FIG. 11B). The electronic device 100 may set different start times for the provision of the multiple sub-sounds (e.g., the sub-sounds 1114, 1115, 1116 in FIG. 11B. Alternatively, the electronic device 100 may set different peak times (or maximum amplitude times) for the multiple sub-sounds (e.g., the sub-sounds 1114, 1115, 1116 in FIG. 11B). Accordingly, the electronic device 100 may induce the user to perform a longer exhalation in response to the sub-sounds.

Figure 12D:
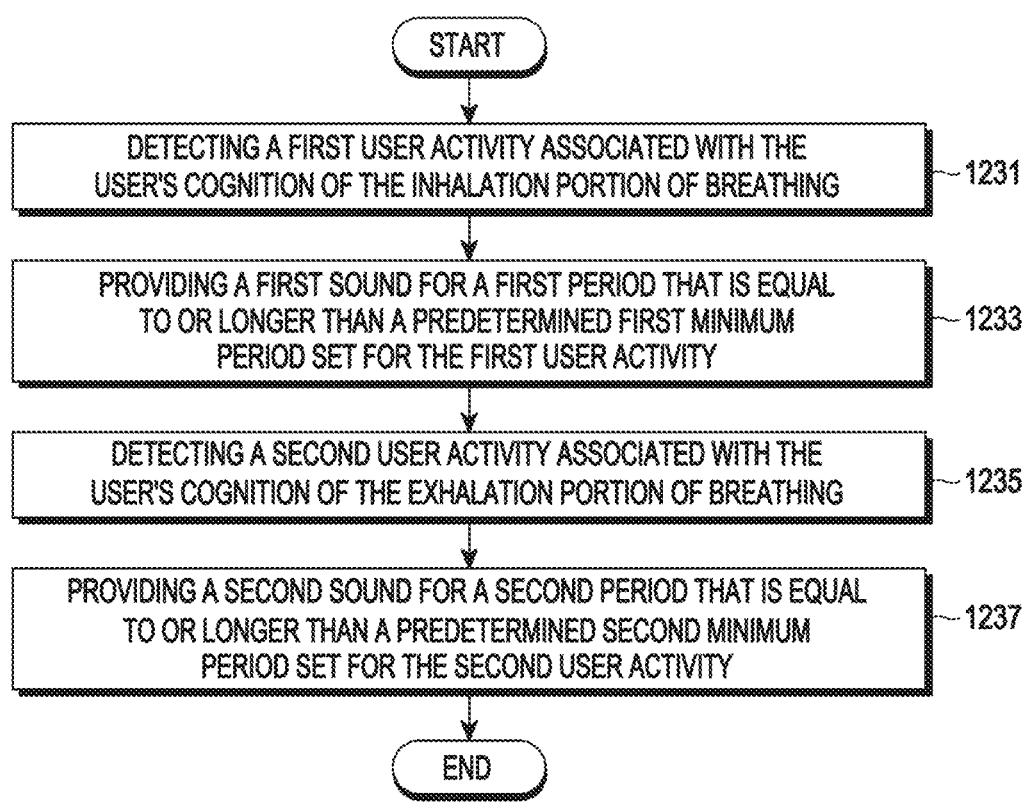
FIG. 12D is a diagram illustrating a method for providing sound according to an embodiment.

FIG. 12D illustrates a method for providing sound according to an embodiment.

Figure 12E:
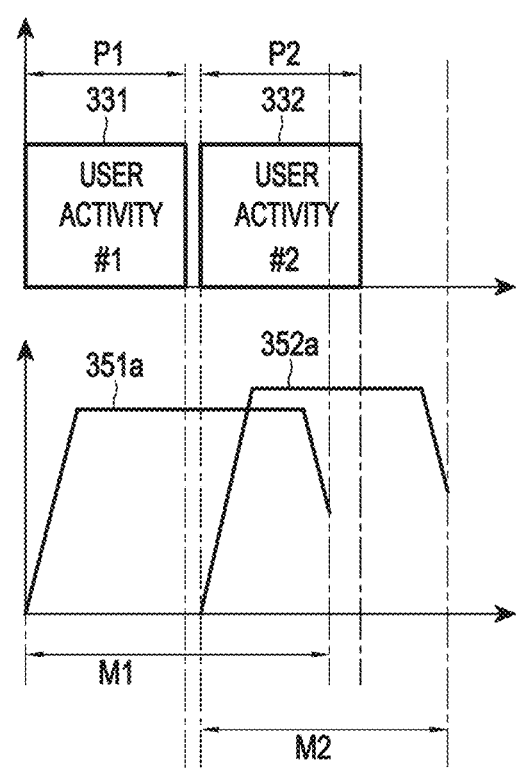
FIG. 12E is a diagram illustrating a sound according to an embodiment.
Figure 12F:
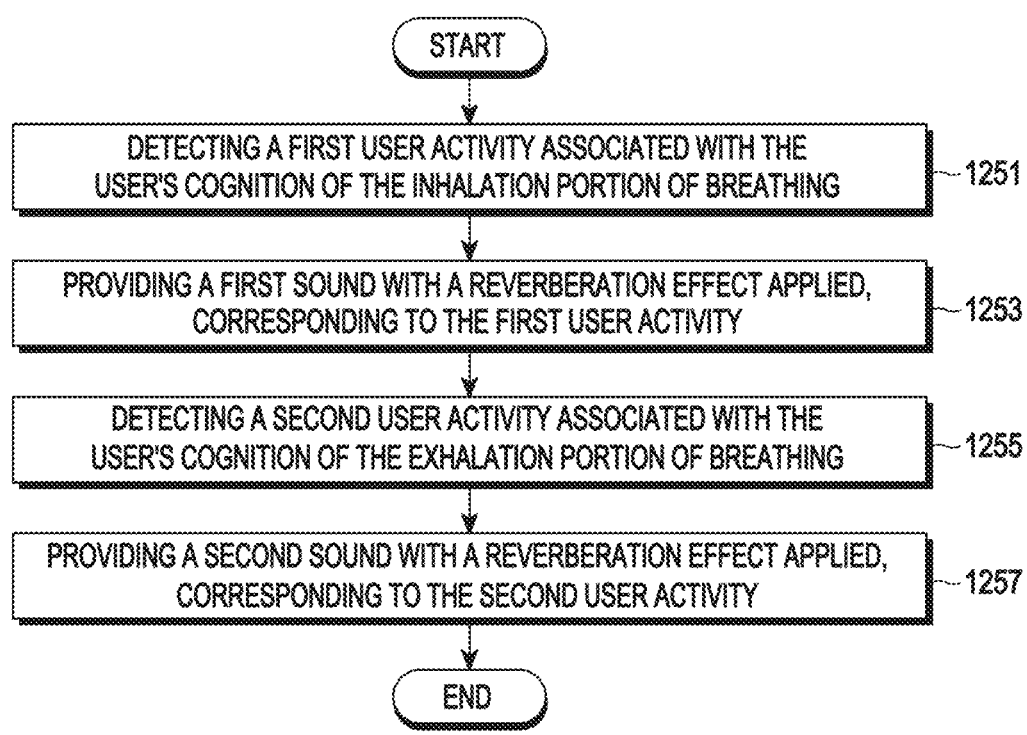
FIG. 12F is a diagram illustrating a method for providing sound according to an embodiment.

The embodiment of FIG. 12D will be explained with reference to FIG. 12E. FIG. 12E depicts a sound according to an embodiment.

The electronic device 100, in operation 1231, may detect a first user activity 331 associated with the user's perception of the inhalation phase of breathing, as illustrated in FIG. 12E. The electronic device 100, in operation 1233, may provide a first sound 351a for a first duration that is at least a first minimum duration M1 set for the first user activity 331. For example, as shown in FIG. 12E, even when the detection period (or maintenance period) P1 of the first user activity 331 is relatively short, the electronic device 100 may be implemented to provide the first sound 351a for at least the first minimum duration M1. Accordingly, even if the user performs an excessively short inhalation, providing the first sound 351a for at least the first minimum duration M1 may prompt the user to perform a longer inhalation. The electronic device 100, in operation 1235, may detect a second user activity 332 associated with the user's perception of the exhalation phase of breathing. The electronic device 100, in operation 1237, may provide a second sound 352a for a duration that is at least a second minimum duration M2 set for the second user activity 332. For example, as shown in FIG. 12E, even when the detection period (or maintenance period) P2 of the second user activity 332 is relatively short, the electronic device 100 may be implemented to provide the second sound 352a for at least the second minimum duration M2. Accordingly, even if the user performs an excessively short exhalation, providing the second sound 352a for at least the second minimum duration M2 may prompt the user to perform a longer exhalation.

The electronic device 100, in operation 1251, may detect a first user activity associated with the user's perception of the inhalation phase of breathing. The electronic device 100, in operation 1253, may provide a first sound with a reverberation effect applied corresponding to the first user activity. The first sound with the reverberation effect may, for example, be provided for a duration longer than the detection period (or maintenance period) of the first user activity, thereby prompting the user to perform a longer inhalation. The electronic device 100, in operation 1255, may detect a second user activity associated with the user's perception of the exhalation phase of breathing. The electronic device 100, in operation 1257, may provide a second sound with a reverberation effect applied corresponding to the second user activity. The second sound with the reverberation effect may, for example, be provided for a duration longer than the detection period (or maintenance period) of the second user activity, thereby prompting the user to perform a longer exhalation. Meanwhile, the reverberation effect is merely illustrative, and the effects for providing a sound replayed later (lagging) compared to the original sound are not limited, as would be understood by those skilled in the art.

Figure 13:
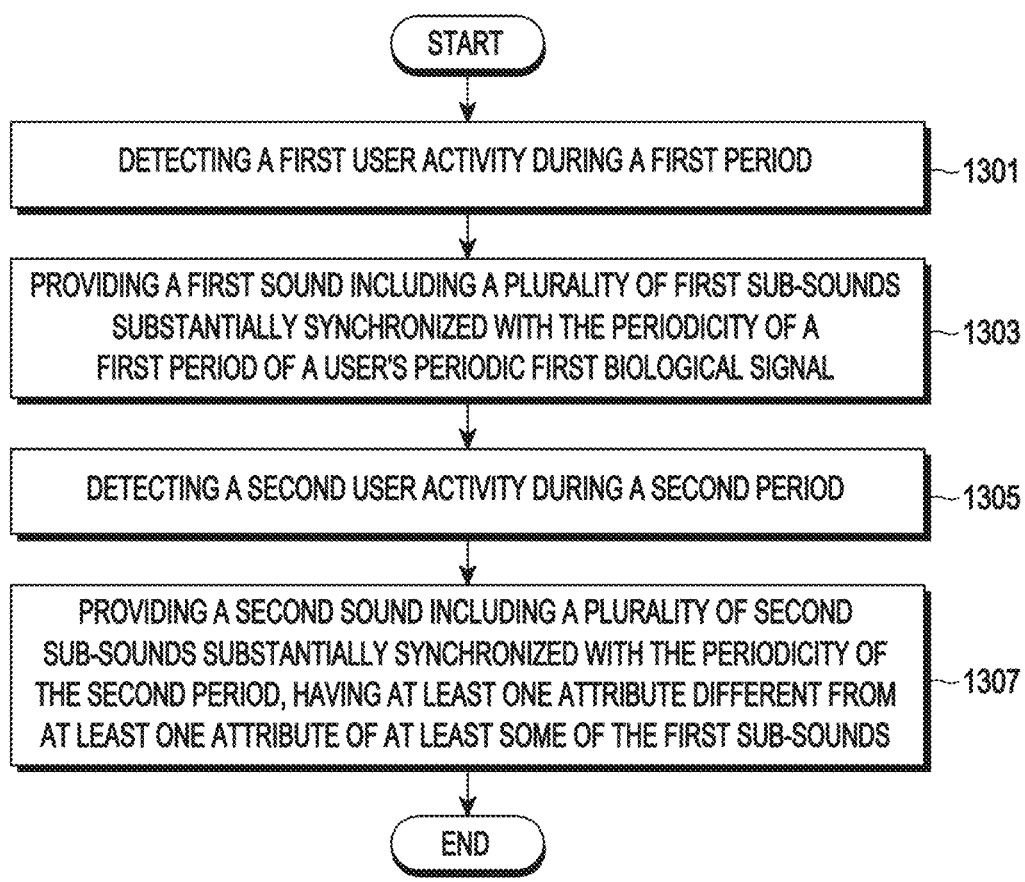
FIG. 13 is a diagram illustrating a method for providing sound according to an embodiment.

FIG. 13 is a diagram illustrating a sound provision method according to an embodiment.

The electronic device 100, in operation 1301, may detect a first user activity associated with the user's cognition of the inhalation phase of breathing during a first period. The electronic device 100, in operation 1303, may provide a first sound including a plurality of first sub-sounds substantially synchronized with the periodicity during the first period of the user's first biometric signal with periodicity. For example, the start time of at least some of the plurality of first sub-sounds may be synchronized with the detection time of the first user activity, although the synchronization method is not limited. For instance, as illustrated in FIG. 11B, the electronic device 100 may provide a plurality of first sub-sounds. The electronic device 100, in operation 1305, may detect a second user activity during a second period. The electronic device 100, in operation 1307, may provide a second sound including a plurality of second sub-sounds substantially synchronized with the periodicity during the second period and having at least some properties differing from at least some properties of the plurality of first sub-sounds. For example, the start time of at least some of the plurality of second sub-sounds may be synchronized with the detection time of the second user activity, although the synchronization method is not limited. For instance, as illustrated in FIG. 11B, the electronic device 100 may provide a plurality of second sub-sounds. For example, at least some properties of each of the plurality of first sub-sounds may differ from at least some properties of each of the plurality of second sub-sounds. Additionally, at least some properties of certain first sub-sounds may differ from at least some properties of certain second sub-sounds. Properties may include, for instance, frequency, amplitude, start time, duration, and/or timbre, but are not limited thereto.

Figure 14A:
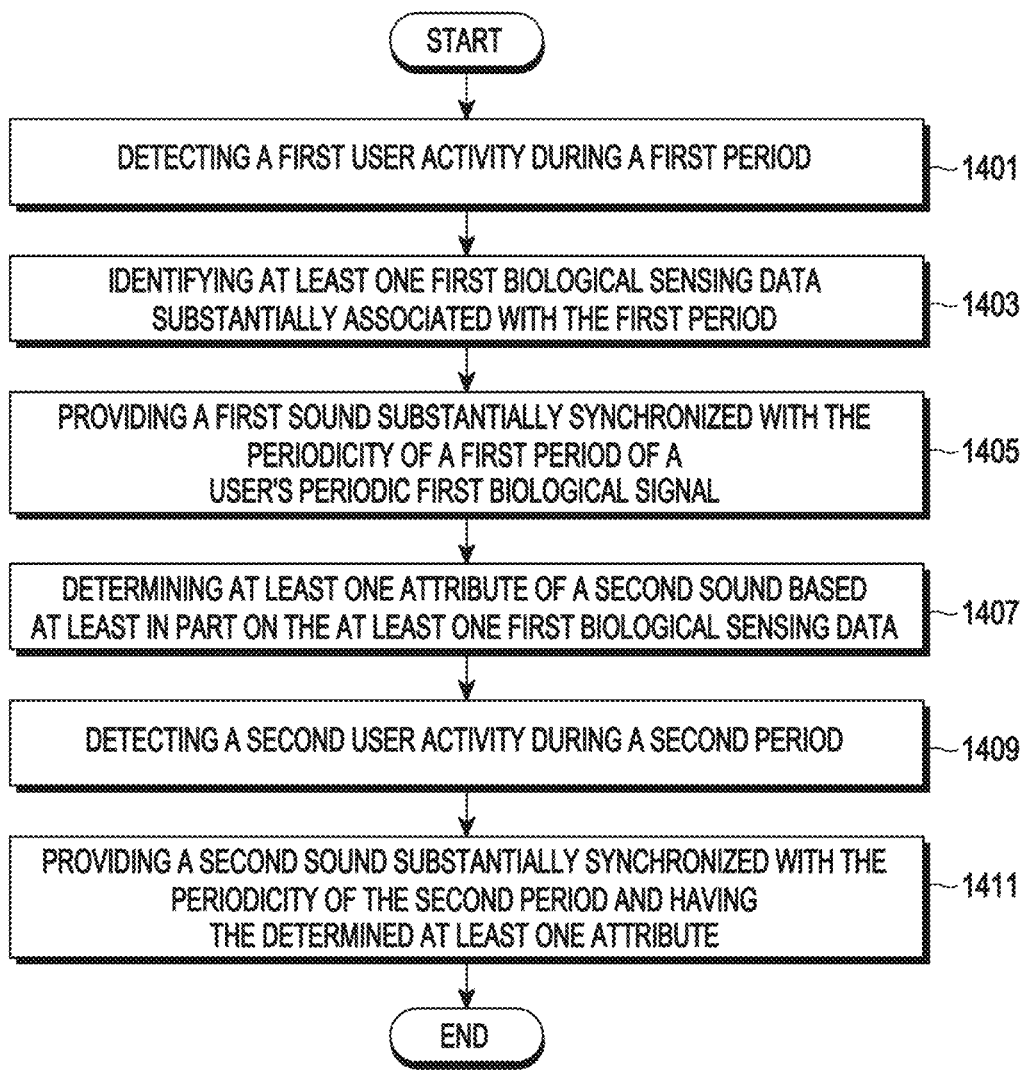
FIG. 14A is a diagram illustrating a method for providing sound according to an embodiment.

FIG. 14A is a diagram illustrating a sound provision method according to an embodiment.

The electronic device 100 may detect, in operation 1401, a first user activity associated with the user's cognition of the first part of the first biometric signal during a first period. The electronic device 100 may identify, in operation 1403, at least one first biometric sensing data substantially associated with the first period. The first biometric sensing data may include, for example, RR (respiratory rate), HR (heart rate), HRV, brain waves, stress level, sounds corresponding to breathing, and/or muscle tension, but the types are not limited thereto as understood by those skilled in the art.

The electronic device 100 may provide, in operation 1405, a first sound substantially synchronized with the periodicity during the first period of the user's periodic first biometric signal. The electronic device 100 may determine, in operation 1407, at least one attribute of a second sound based on at least one first biometric sensing data. The electronic device 100 may detect, in operation 1409, a second user activity during a second period.

The electronic device 100 may provide, in operation 1411, a second sound substantially synchronized with the periodicity during the second period and having the determined at least one attribute. Meanwhile, although not illustrated, the electronic device 100 may acquire at least one second biometric sensing data during the second period. The electronic device 100 may determine the attributes of the subsequent first sound based on at least one second biometric sensing data. The determination of sound attributes based on biometric sensing data acquired during the immediately preceding sound provision period is merely exemplary. The electronic device 100 may determine sound attributes based on biometric sensing data identified over a certain period, and this period is not limited. Accordingly, the electronic device 100 may modify the attributes of the provided sound based on the biometric sensing data. The determination (or modification) of sound attributes based on biometric sensing data may be performed based on at least one rule base and/or at least one inference result of an artificial intelligence model.

Figure 14B:
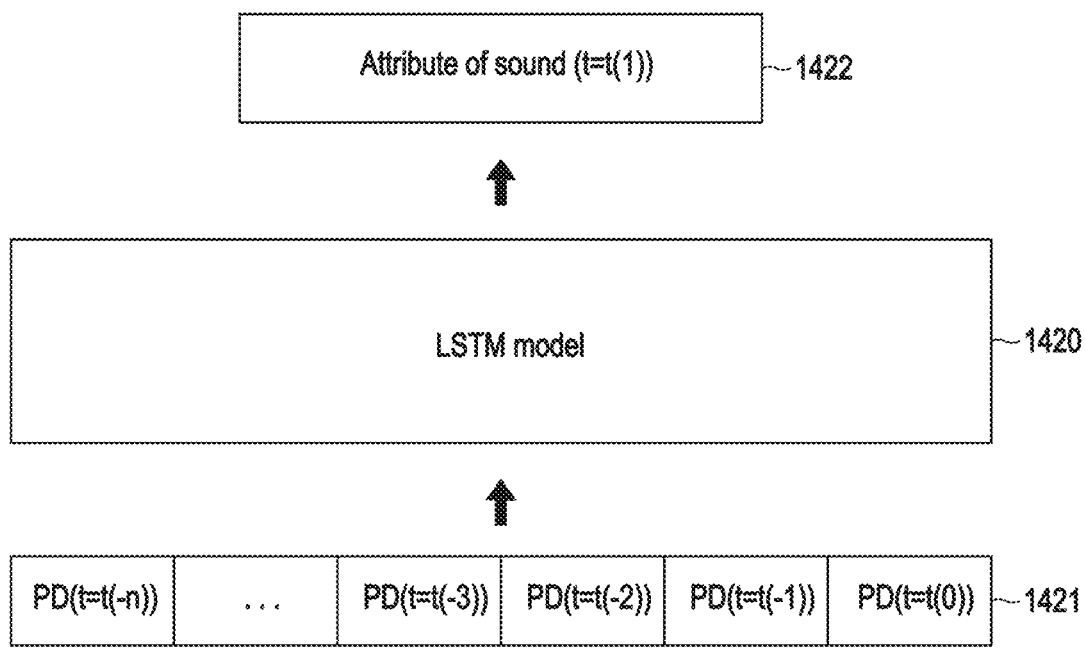
FIG. 14B is a diagram illustrating sound attribute determination according to an embodiment.

FIG. 14B is a diagram illustrating sound attribute determination according to an embodiment.

The electronic device 100 may execute an LSTM model 1420, for example. The LSTM model 1420 may be stored on-device within the electronic device 100, or the electronic device 100 may be configured to request inference results from the LSTM model 1420 on an external server. The LSTM model 1420 may be trained, for example, to receive at least one biometric sensing data (PD(t=t(0)), PD(t=t(-1)), PD(t=t(-2)), . . . , PD(t=t(t-n))) at at least one time point (t(0), t(-1), t(-2), . . . , t(-n)) as input and provide, as output, the attribute (or degree of attribute change) of the sound at time t(1).

The electronic device 100 may input at least one biometric sensing data (PD(t=t(0)), PD(t=t(-1)), PD(t-t(-2)), . . . , PD(t=t(t-n))) 1421 into the LSTM model 1420 as input. The electronic device 100 may identify the attribute (or degree of attribute change) 1422 of the sound, provided as an inference result from the LSTM model 1420. The electronic device 100 may provide a sound with the identified attribute or may modify the sound's attribute based on the identified degree of attribute change. Meanwhile, the LSTM model 1420 is merely exemplary, and there are no limitations on the types of artificial intelligence models. Although FIG. 14B describes the input of at least one biometric sensing data (PD(t=t(0)), PD(t=t(−1)), PD(t=t(t−2)), . . . , PD(t=t(t−n))) at multiple time points (t(0), t(−1), t(t−2), . . . , t(t−n)) into the LSTM model 1420 (or another model), this is illustrative. Those skilled in the art will understand that the artificial intelligence model for inferring sound attributes (or degree of attribute change) may also receive biometric sensing data from a single time point as input.

Figure 14C:
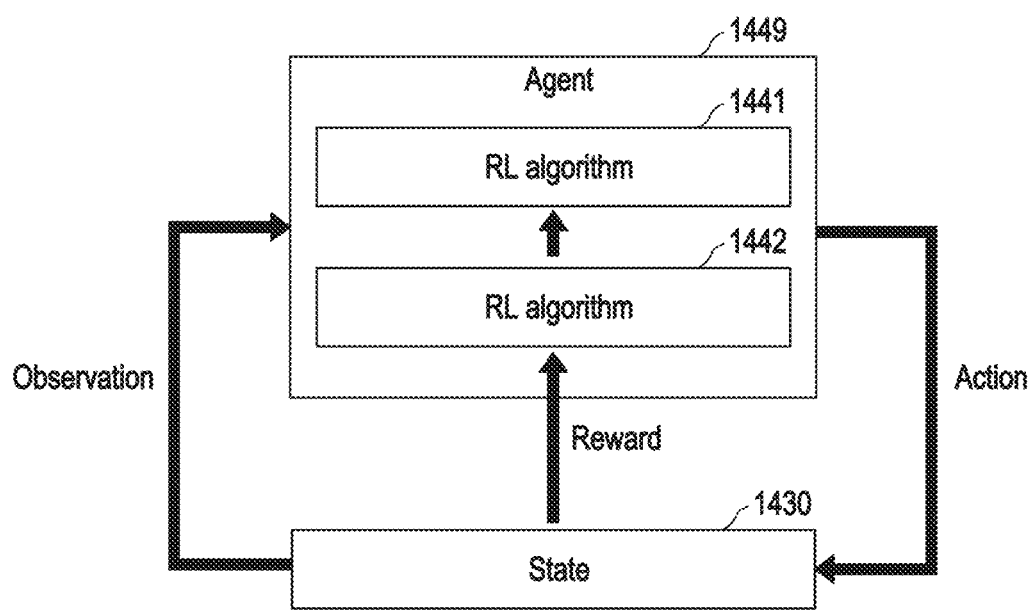
FIG. 14C is a diagram illustrating sound attribute determination according to an embodiment.

FIG. 14C is a diagram illustrating sound attribute determination according to an embodiment.

The electronic device 100 may execute an agent 1440 associated with reinforcement learning. The agent 1440 may be stored on-device within the electronic device 100, or the electronic device 100 may be configured to request inference results from the agent 1440 on an external server. The electronic device 100 may identify a state 1430 at a first time point (which may include one or more time points). For example, the state 1430 may include parameters such as RR (respiratory rate), HR (heart rate), HRV, brainwaves, stress level, and/or muscle tension. However, the number and type of parameters constituting the state are not limited. The state 1430 may be observed by the agent 1440. The agent 1440 may identify an action corresponding to the state 1430 at the first time point based on a policy 1441. The action may include, for example, sound attributes (or the degree of attribute change). The electronic device 100 may determine (or modify) the sound attributes provided at one or more time points after the first time point based on the identified action as an inference result. The agent 1440 may adjust (or modify) the policy 1441 based on a reinforcement learning algorithm 1442. For example, the reinforcement learning algorithm 1442 may adjust (or modify) the policy 1441 based on the state 1430 at the first time point and/or a reward. The reward may be set, for instance, based on a reference suitable for inducing sleep and the state 1430 at the first time point. However, the method of setting the reward is not limited.

Meanwhile, it will be understood by those skilled in the art that determining the attributes of the sound in automatic mode and/or manual mode is merely exemplary and, for example, the attributes may be determined based on the user account.

Figure 15A:
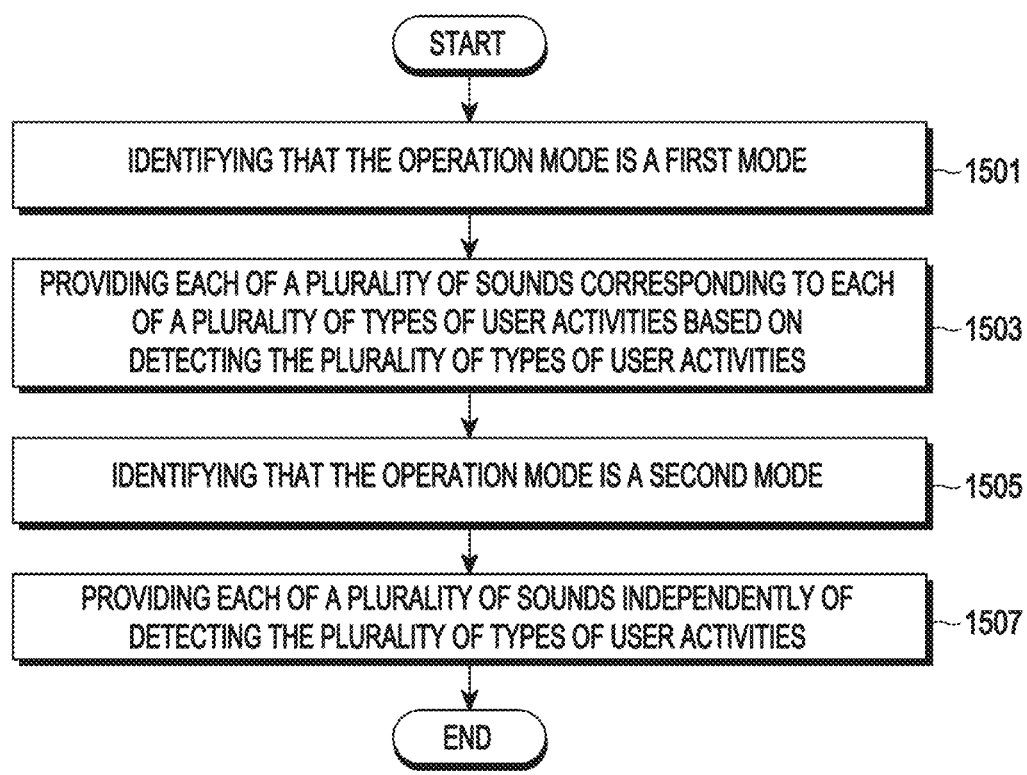
FIGS. 15A, 15B, 15C, and 15D are diagrams illustrating a method for providing sound according to an embodiment.

FIG. 15A illustrates a flowchart of a sound provision method according to an embodiment.

According to one embodiment, the electronic device 100 may, in operation 1501, identify that the usage mode is the first mode. For example, the first mode may be a default mode provided at the start of the service but is not limited thereto. Alternatively, the electronic device 100 may determine the usage mode as the first mode based on confirming satisfaction of conditions for transitioning from the second mode to the first mode. In operation 1503, the electronic device 100 may provide multiple sounds corresponding to multiple types of user activities based on detecting each of the multiple types of user activities. For example, in the first mode, each sound may be provided substantially synchronized with the detection of the respective type of user activity triggered by detecting the multiple types of user activities. Since performing user activities is required for sound provision, the first mode may be referred to as a manual mode. The electronic device 100 may, in operation 1505, identify that the usage mode is the second mode. For example, the electronic device 100 may determine the usage mode as the second mode based on confirming satisfaction of conditions for transitioning from the first mode to the second mode. Alternatively, in another implementation, the second mode may be set as the default mode. For example, the conditions for transitioning to the second mode may include the absence of detection of at least some of the multiple types of user activities. Alternatively, the conditions for transitioning to the second mode may include confirmation of failure in alternating detections of the multiple types of user activities. For instance, the conditions for transitioning to the second mode may involve detecting at least one user activity specified for the transition to the second mode, such as a long press, double tap, drag gesture, flick, or touch on a designated graphic object, but such conditions are merely exemplary and not restrictive. The conditions for transitioning to the second mode may also include detecting at least one user activity and analyzing its results. For example, the conditions may involve determining that at least one inhalation or exhalation length associated with the user activity exceeds a threshold length. The threshold length may be set as a value deemed effective for inducing sleep or based on such a length (e.g., by multiplying it by a constant A), but it is not limited to these criteria. Additionally, the conditions for transitioning to the second mode may involve confirming that the difference in the lengths of consecutive breaths is within a first threshold difference or exceeds a second threshold difference. The conditions may also be based on at least one piece of biometric sensing data. Alternatively, the conditions may involve a specified period elapsing after entering the first mode. The electronic device 100 may provide content (e.g., visual, auditory, or haptic content) associated with the mode change based on transitioning from the first mode to the second mode. However, this is merely exemplary, and content provision may not be implemented. In operation 1507, the electronic device 100 may provide multiple sounds independently of detecting the multiple types of user activities. For example, in the second mode, multiple sounds may be automatically provided without requiring detection of the multiple types of user activities. Since user activities are not required for sound provision, the second mode may be referred to as an automatic mode. Accordingly, after implementing the extension or entrainment effects of the user's breath length in the first mode, the sounds may continue to be provided based on the second mode independently of detecting user activities. Even after the user falls asleep in the first mode, sounds for guiding breathing may continuously be provided in the second mode. If the user ceases performing user activities just before falling asleep in the first mode and sound provision stops, the user may notice the sudden cessation of sounds, leading to increased arousal. By confirming the cessation of alternating user activities as a condition for transitioning to the second mode, the electronic device 100 may continuously provide sounds. This prevents an increase in user arousal caused by sound interruption.

Figure 15B:
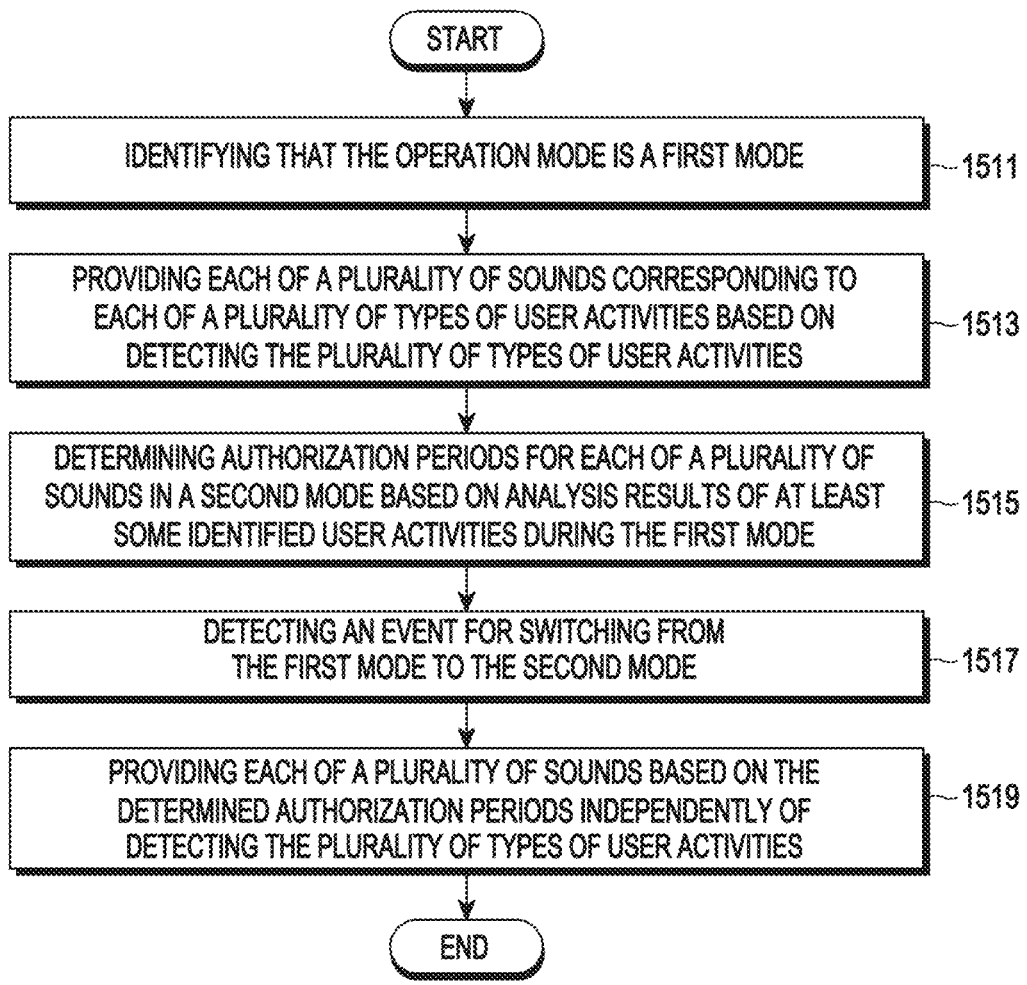

FIG. 15B illustrates a sound provision method according to an embodiment.

According to one embodiment, the electronic device 100 may, in operation 1511, identify that the usage mode is the first mode. In operation 1513, the electronic device 100 may provide multiple sounds corresponding to multiple types of user activities based on detecting each of the multiple types of user activities. As described above, in the first mode, detecting multiple types of user activities may be required for the provision of sounds.

FIG. 15B illustrates a sound provision method according to an embodiment.

In operation 1515, the electronic device 100 may determine the respective application durations of multiple sounds in the second mode based on the analysis results of at least some of the user activities identified in the first mode. In operation 1517, the electronic device 100 may detect an event for switching from the first mode to the second mode. For example, before detecting an event for switching to the second mode, the electronic device 100 may determine the respective application durations of multiple sounds in the second mode based on at least some of the detection durations of the multiple types of user activities (or the provision durations of multiple sounds) identified in the first mode. For instance, before detecting an event for switching to the second mode, the electronic device 100 may determine the respective application durations of multiple sounds in the second mode based on the detection durations of the multiple types of user activities over N instances (where N is a natural number greater than or equal to 1). Here, N instances may refer to, for example, the N instances immediately preceding the event detection, but are not limited thereto. For instance, N instances may refer to the initial N instances, intermediate N instances, or the entirety of the first mode session. The electronic device 100 may determine the respective averages of the detection durations of the multiple types of user activities over N instances as the respective application durations of the multiple sounds in the second mode. However, this is merely exemplary and not restrictive. The electronic device 100 may determine the respective application durations of multiple sounds in the second mode by applying at least some of the detection durations of the multiple types of user activities identified in the first mode to a designated rule, though this is also exemplary and not restrictive. In the second mode, in operation 1519, the electronic device 100 may provide each of the multiple sounds independently of the detection of the multiple types of user activities, based on the determined application durations.

Figure 15C:
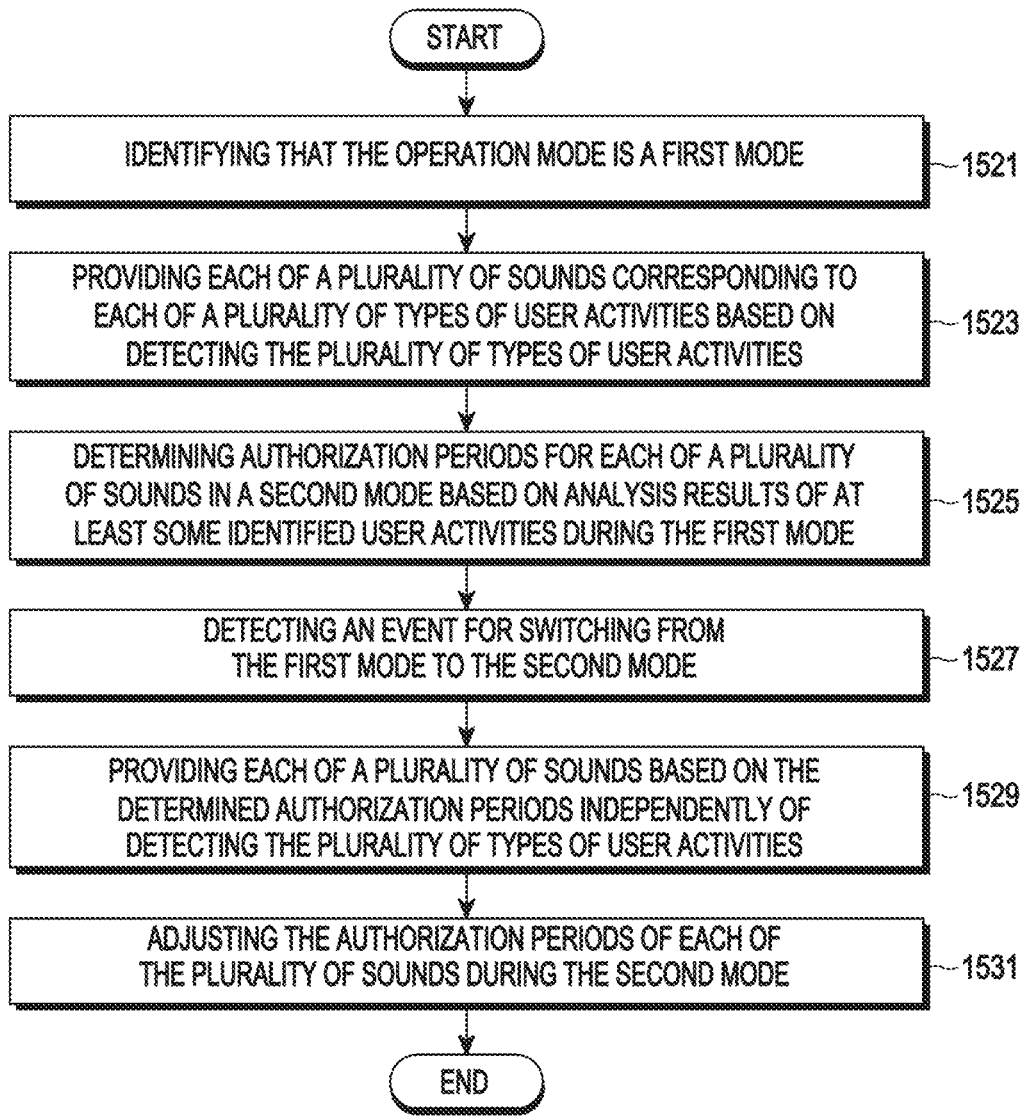

FIG. 15C illustrates a sound provision method according to an embodiment.

According to an embodiment, the electronic device 100, in operation 1521, may determine that the usage mode is the first mode. In operation 1523, the electronic device 100 may provide each of multiple sounds corresponding to each of multiple types of user activities based on the detection of the multiple types of user activities. In operation 1525, the electronic device 100 may determine the respective application durations of multiple audio sounds in the second mode based on the analysis results of at least some of the user activities identified during the first mode. In operation 1527, the electronic device 100 may detect an event for switching from the first mode to the second mode. Based on the usage mode being switched to the second mode following the detection of the event, the electronic device 100, in operation 1529, may provide each of the multiple sounds independently of the detection of the multiple types of user activities, based on the determined application durations.

The electronic device 100, in operation 1531, may adjust the application durations of each of the multiple sounds during the second mode. For example, since user activities may not be detected in the second mode, the electronic device 100 may adjust the application durations of each of the multiple sounds based on specified adjustment rules. For instance, the electronic device 100 may gradually (or incrementally) adjust the application durations of each of the sounds to transfer to an optimal duration suitable for inducing sleep. The electronic device 100 may also adjust the application durations of each sound based on specified computation rules applied to the respective application durations of the immediately preceding sounds; however, this is merely exemplary. For example, the electronic device 100 may determine the application duration of the N+1-th sound by multiplying or adding a constant to the application duration of the N-th sound in the second mode. The electronic device 100 may increase the application durations of the sounds until they reach a specified threshold duration by multiplying or adding a constant, but this is not limited to such an approach. Additionally, the electronic device 100 may determine the application duration of the N+1-th sound by multiplying the application duration of the N-th sound by a value based on the relationship between the N-th sound's application duration and the threshold duration (e.g., the value may be the ratio of the N-th sound's application duration to the threshold duration or another derived value based on further operations). The electronic device 100 may increase the application durations of the sounds according to computational results until the application durations reach the specified threshold duration, without limitation.

For example, the electronic device 100 may adjust the sound application duration based on the accumulation of sound delivery occurrences in the second mode. Specifically, in the N-th instance of the second mode, the electronic device 100 may set the sound delivery duration to a first duration, and in the N+1-th instance, the sound delivery duration may be set to a second duration determined based on a computation for adjusting the first duration. In this case, the increase in the cumulative number of occurrences may serve as the trigger for the sound delivery duration adjustment event. Alternatively, the electronic device 100 may be configured to adjust the sound delivery duration not based on the increase in cumulative occurrences but instead based on satisfying conditions for sound delivery duration adjustment. Such conditions may include, for instance, determining whether the user's breathing has stabilized, although the scope of these conditions is not limited to this example.

Alternatively, the electronic device 100 may adjust the application duration of each sound based on at least one biometric sensing data. For example, the electronic device 100 may adjust the application duration of each sound based on the inference results of an artificial intelligence model applied to at least one biometric sensing data. However, this is merely an example, as the application duration (or the degree of adjustment) for each sound corresponding to at least one biometric sensing data may also be determined using a rule-based approach.

Figure 15D:
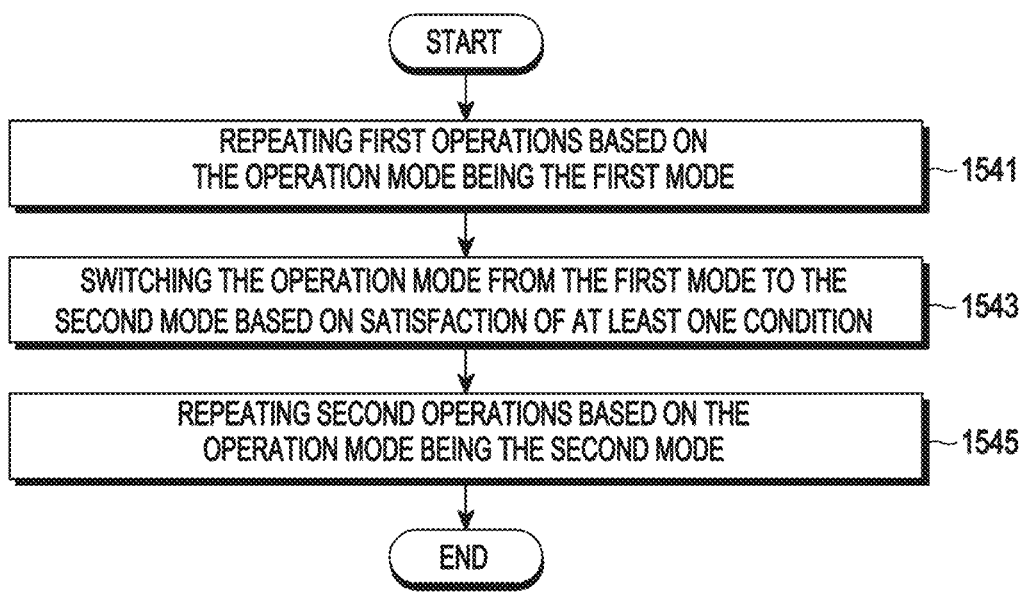

FIG. 15D illustrates a sound provision method according to an embodiment. According to the embodiment, the electronic device 100 may repeat first operations based on the user mode being the first mode in operation 1541. The first operations may include providing a first sound corresponding to the first user activity and substantially synchronized with the detection timing of the first user activity. This operation is based on the detection of a first user activity associated with the user's cognition of a period corresponding to the first portion of the biometric indicator, such as the inhalation phase of the user's breathing. The first operations may further include providing a second sound corresponding to the second user activity (or the confirmation of the failure to detect the first user activity) and substantially synchronized with the detection timing of the second user activity (or the confirmation timing of the failure to detect the first user activity). This operation is based on the detection of a second user activity associated with the user's cognition of a period corresponding to the second portion of the biometric indicator, such as the exhalation phase of the user's breathing.

The electronic device 100, in operation 1543, may transition the user mode from the first mode to the second mode based on confirming that at least one condition for changing the mode is satisfied. Since the conditions have been described above, their explanation is not repeated here. In operation 1545, the electronic device 100 may, based on the user mode being the second mode, repeatedly perform second operations independently of (or automatically, without being related to) the detection of the first and second user activities. The second operations may include providing the first sound corresponding to the first user activity. Additionally, the second operations may include providing the second sound corresponding to the second user activity (or the identification of the failure to detect the first user activity).

Figure 16A:
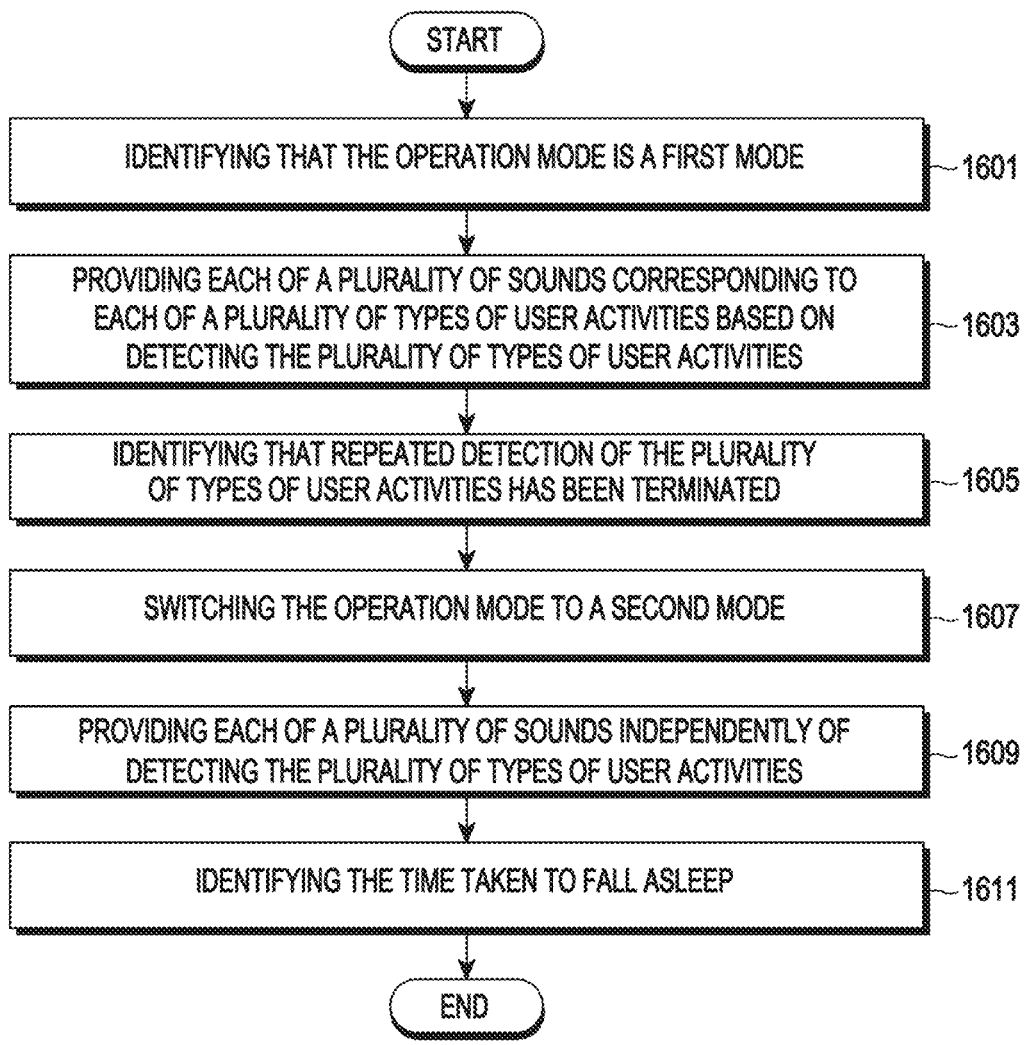
FIG. 16A is a diagram illustrating a method for providing sound according to an embodiment.

FIG. 16*a* illustrates a sound provision method according to an embodiment, explained with reference to FIG. 16*b*, which describes the time required for sleep induction in the embodiment.

According to one embodiment, the electronic device 100, in operation 1601, may confirm that the user mode is the first mode. In operation 1603, the electronic device 100 may provide respective audio feedback corresponding to multiple types of user activities based on detecting the activities. As described above, the electronic device 100 may repeatedly provide multiple sounds based on the repetitive detection of various types of user activities. In operation 1605, the electronic device 100 may confirm that the repetitive detection of multiple types of user activities has ceased. For example, the user may repeatedly perform multiple types of user activities and then fall asleep or enter a pre-sleep state, leading to the cessation of repetitive user activities. Alternatively, the user may intentionally stop the repetitive performance of user activities and prefer transitioning to the second mode, which is the automatic mode. In operation 1607, the electronic device 100 may transition the user mode to the second mode based on the failure to detect the repetitive performance of multiple types of user activities.

The electronic device 100, in operation 1609, may provide multiple sounds independently of the detection of various types of user activities upon transitioning to the second mode. In operation 1611, the electronic device 100 may determine the time required for sleep induction.

Figure 16B:
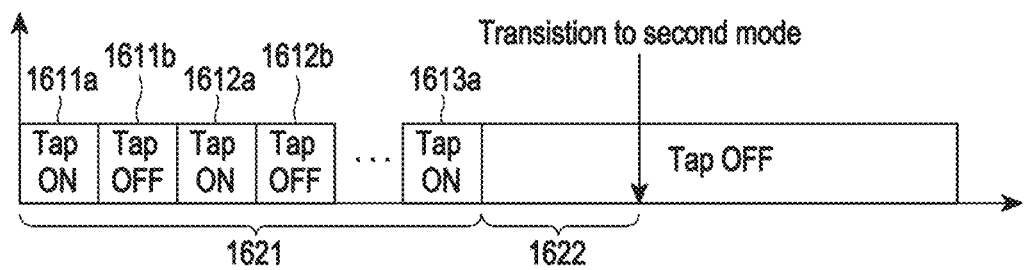
FIG. 16B is a diagram illustrating the time required for sleep onset according to an embodiment.

For example, referring to FIG. 16*b*, the electronic device 100 may identify alternating occurrences of a tap-on event (1611*a*, 1612*a*, 1613*a*) as one type of user activity and a tap-off event (1611*b*, 1612*b*) as another type of user activity. Meanwhile, the electronic device 100 may observe that tap-off events persist following the tap-on event (1613*a*). Based on failing to detect any additional tap-on events within a specified period (1622), the electronic device 100 may transition the usage mode from the first mode to the second mode. For example, the electronic device 100 may determine the period (1621), during which alternating user activities were performed, as the sleep induction duration. If the user continuously performed alternating user activities until the point of falling asleep, the period (1621) may be identified as the sleep induction duration. Alternatively, the electronic device 100 may determine the sleep induction time by applying a predefined rule to the identified period (1621), with no limitation on the method of determination.

Figure 16C:
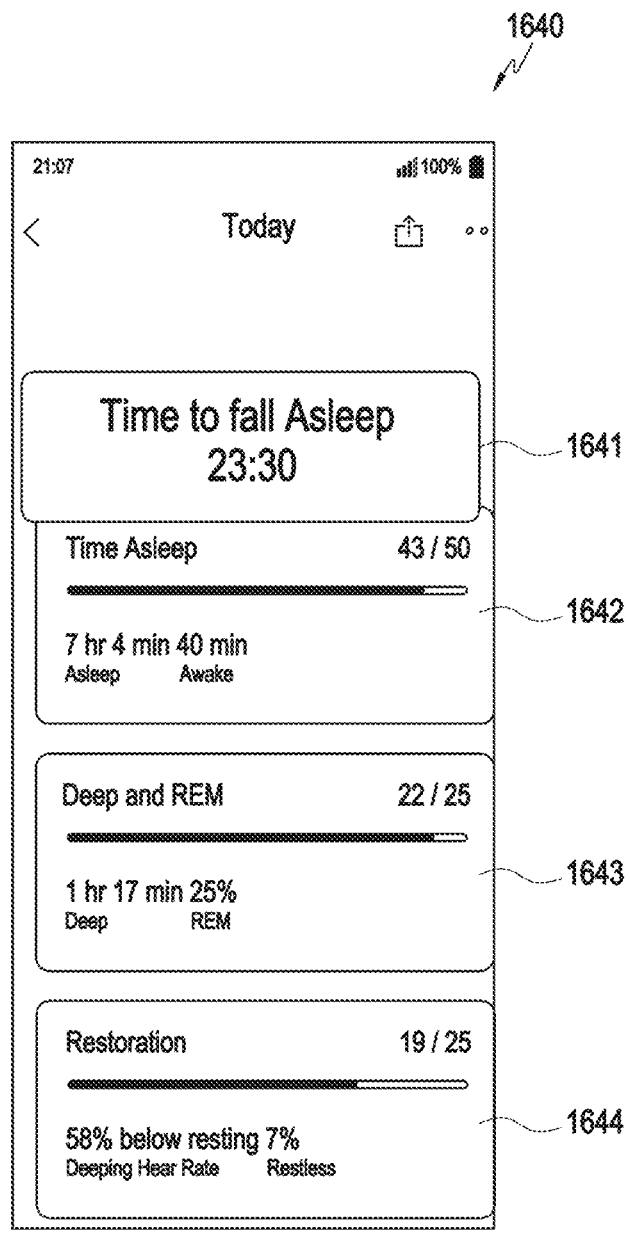
FIG. 16C is an example of a sleep analysis result provided according to an embodiment.

FIG. 16*c* is an example of sleep analysis results provided according to an embodiment.

According to an embodiment, the electronic device 100 may provide a screen 1640 for sleep analysis results. The screen 1640 may include information 1641 regarding the time taken to fall asleep. For example, the electronic device 100 may determine the time taken to fall asleep as described with reference to FIG. 16*b* and provide information 1641 regarding the time taken to fall asleep. The screen 1640 may also include information 1642 regarding total sleep time, information 1643 regarding deep sleep and REM (rapid eye movement) sleep, and/or information 1644 regarding recovery. However, these are merely examples and are not limiting. The screen 1640 may also include objects related to the user's current status information and/or progress information, such as a breathing score and session information.

For example, the electronic device 100 may transform EEG signals collected from the user (USER) into the frequency domain (e.g., using FFT (fast Fourier transform)) to recognize deep sleep, light sleep, REM sleep, and assess sleep disorders. The electronic device 100 may infer that the user is relaxed through an increase in alpha frequencies within the collected EEG signals. The electronic device 100 may attempt to extend the inhalation phase and/or the exhalation phase if the EEG signals of the user (USER) meet a predefined state (during the provision of the first or second sound) when the user is transitioning into sleep, or before the user is transitioning into sleep. In this case, the electronic device 100 may evaluate whether extending the inhalation and exhalation phases has a positive or negative impact on sleep based on the user's EEG signals. The electronic device 100 may first attempt to extend only the inhalation phase, evaluate the sleep state after a predetermined period based on the EEG signals, and then attempt to extend only the exhalation phase, followed by an evaluation of the sleep state after another predetermined period based on the EEG signals.

Figure 17:
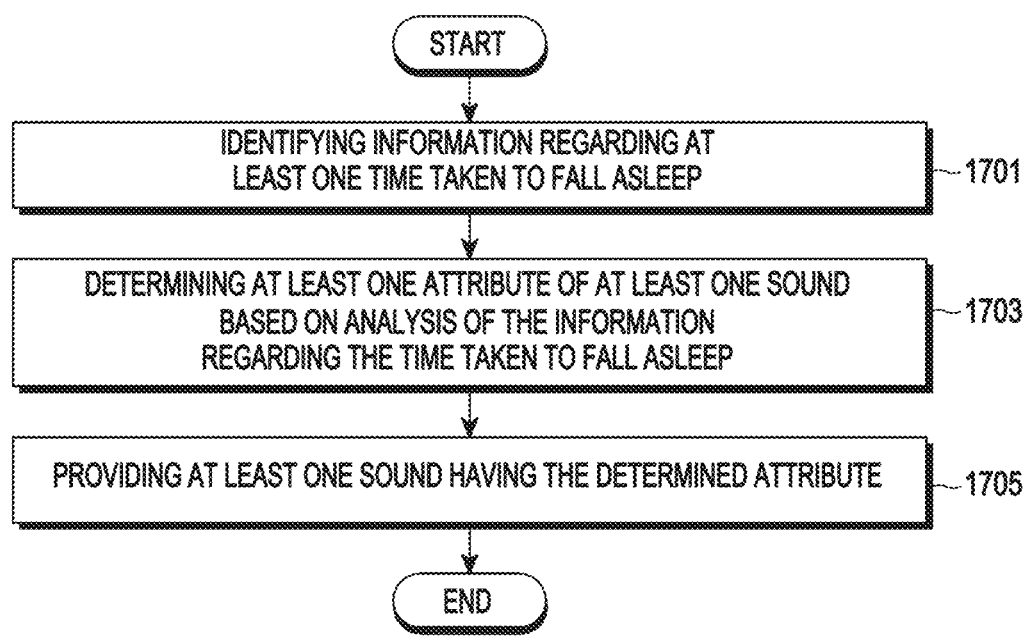
FIG. 17 is a diagram illustrating a method for providing sound according to an embodiment.

FIG. 17 illustrates a diagram explaining a sound providing method according to an embodiment.

According to an embodiment, the electronic device 100 may, in operation 1701, identify information regarding at least one time taken to fall asleep. For example, the information regarding at least one time taken to fall asleep may include information about the time taken to fall asleep for at least one session, and the explanation of the identification method is not repeated here. In operation 1703, the electronic device 100 may determine at least a part of the property of at least one sound to be applied in the current session, based on the analysis of the information regarding at least one time taken to fall asleep. In operation 1705, the electronic device 100 may provide at least one sound with the determined property. For example, the electronic device 100 may use the property of the sound employed in sessions where the time taken to fall asleep was relatively short as the property of at least one sound to be applied in the current session. However, there are no limitations in this regard. Although not illustrated, the electronic device 100 may also determine the property of at least one sound to be applied in the current session based additionally or alternatively on other sleep-related information (e.g., total sleep time, deep sleep and REM sleep durations, or sleep quality, though not limited thereto) in addition to the time taken to fall asleep. As described above, by providing sounds with properties corresponding to relatively shorter times taken to fall asleep and/or higher sleep quality, it may be possible to offer user-specified sounds tailored to the user.

Figure 18A:
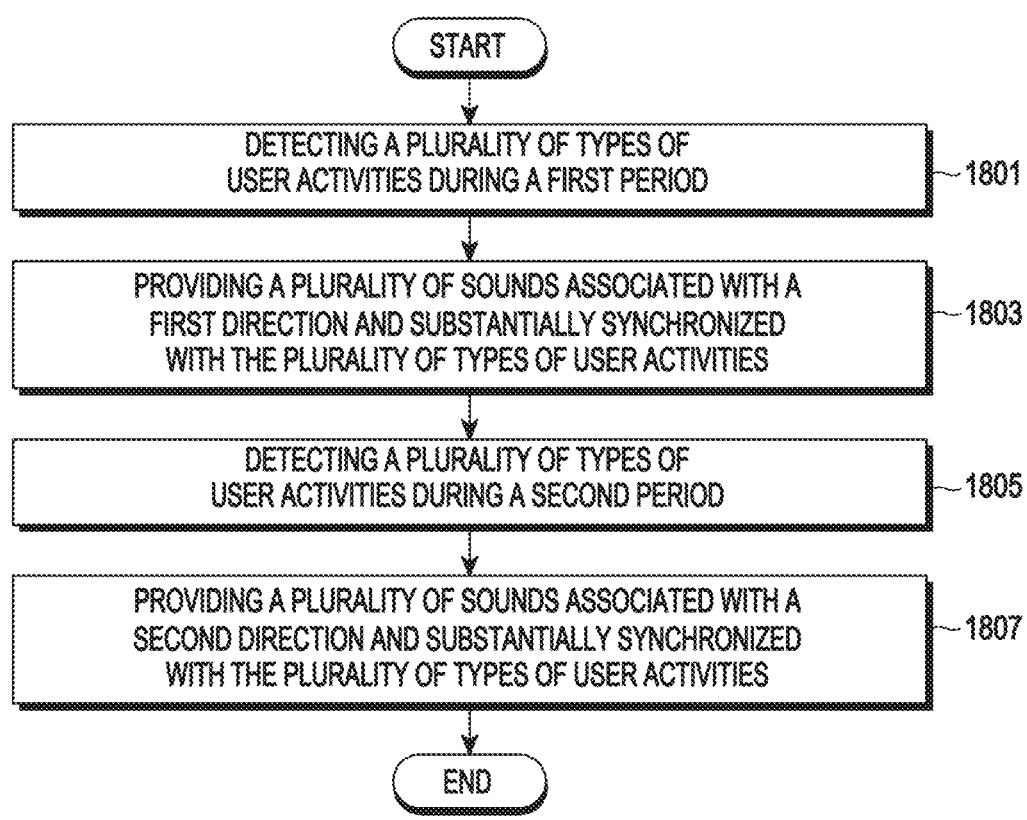
FIG. 18A is a diagram illustrating a method for providing sound according to an embodiment.
Figure 18B:
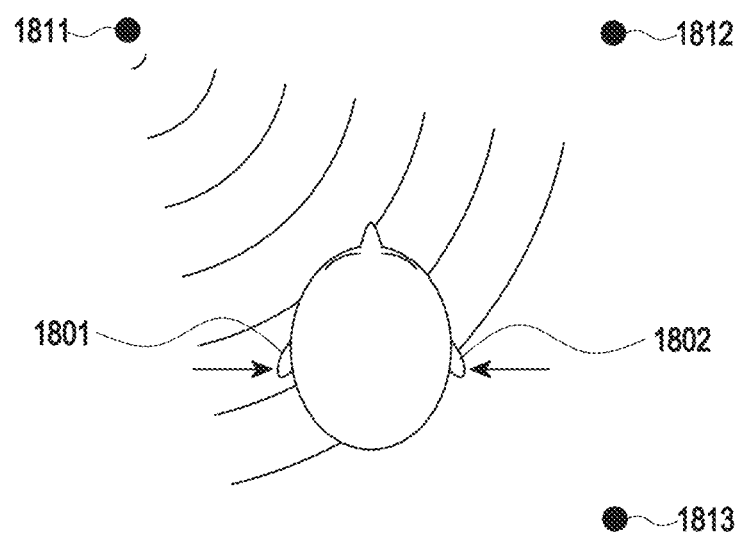
FIG. 18B is a diagram illustrating sound delivery directions according to an embodiment.

FIG. 18A is a diagram explaining a sound providing method according to an embodiment. FIG. 18A is described with reference to FIG. 18B. FIG. 18B is a diagram explaining the sound providing direction according to an embodiment.

According to an embodiment, the electronic device 100 may detect a plurality of types of user activities during a first period in operation 1801. For example, in operation 1803, the electronic device 100 may provide a plurality of sounds associated with a first direction substantially synchronized with the plurality of types of user activities. For instance, as shown in FIG. 18B, sound providing devices 1801 and 1802 may be inserted into the user's ears. By controlling the phases of the sounds output by each of the sound providing devices 1801 and 1802, the direction of virtual sound sources 1811, 1812, 1813, and 1814 perceived by the user may be controlled. For example, the electronic device 100 may control the phases of the sounds provided by each of the sound providing devices 1801 and 1802, enabling the user to perceive that the sounds provided during the first period originate from a virtual sound source, such as the first virtual sound source 1811. At least some of the above operations may be referred to as providing sounds associated with the first direction.

The electronic device 100 may, in operation 1805, detect user activities of multiple types during a second period. The electronic device 100 may, in operation 1807, provide multiple sounds associated with a second direction substantially synchronized with the user activities of multiple types. For example, the electronic device 100 may control the phases of sounds provided by each of the sound output devices 1801 and 1802, allowing the user to perceive that the sounds provided during the second period originate from a second virtual sound source 1812. At least part of the aforementioned operations may be referred to as the provision of sounds associated with the second direction.

As described above, the electronic device 100 may change the direction from which the user perceives the sound to be provided. Accordingly, the user may perceive that the location of the sound source changes among the first virtual sound source 1811, the second virtual sound source 1812, and the third virtual sound source 1813. As mentioned above, complexity in sound provision may be required for the continuous use of content. As described, changing the perceived direction of the sound may enhance complexity, thereby improving the sustainability of content usage.

Meanwhile, the direction from which the user perceives the sound to be provided may change randomly or in a manner exhibiting a certain tendency. For example, effects such as the virtual sound source appearing to move closer to the user, the virtual sound source appearing to move farther away from the user, or the virtual sound source appearing to move in a first direction may be implemented, with no limitations.

Figure 18C:
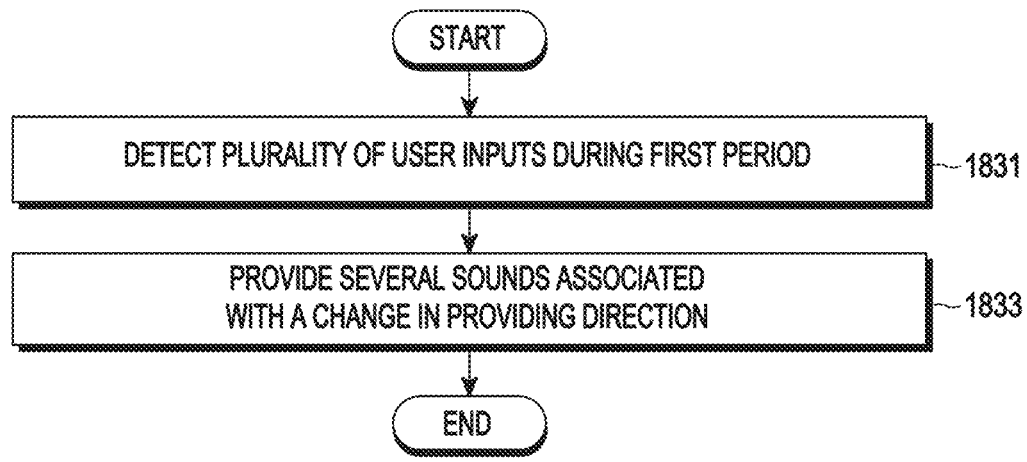
FIG. 18C is a diagram illustrating a method for providing sound according to an embodiment.
Figure 18D:
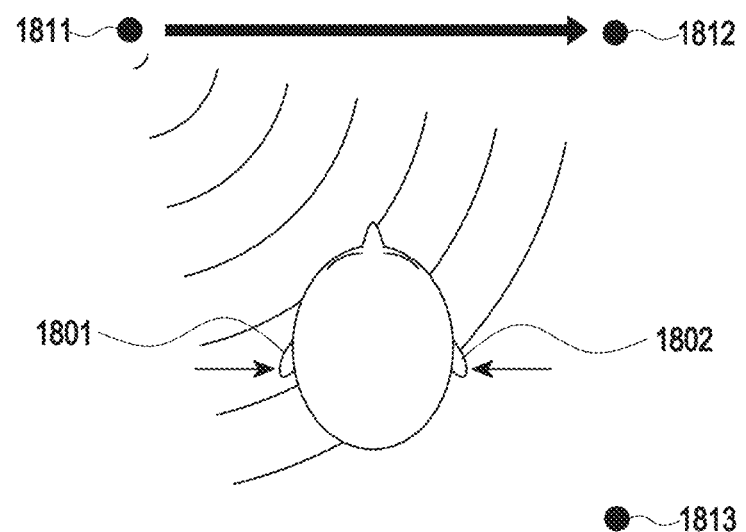
FIG. 18D is a diagram illustrating sound delivery directions according to an embodiment.

FIG. 18C is a diagram illustrating a sound providing method according to an embodiment. FIG. 18C is described with reference to FIG. 18D. FIG. 18D is a diagram illustrating the sound providing direction according to an embodiment.

According to an embodiment, the electronic device 100 may, in operation 1831, detect multiple types of user activities during a first period. For example, in operation 1833, the electronic device 100 may provide several sounds associated with a change in the providing direction, substantially synchronized with the multiple types of user activities. For instance, as illustrated in FIG. 18D, the electronic device 100 may control the respective phases of the sounds so that the user perceives the position of the virtual sound source shifting from the position of the first virtual sound source 1811 to the position of the second virtual sound source 1812 during the first period. Accordingly, the user may perceive the position of the virtual sound source changing (i.e., the sound providing direction changing) within a single cycle. Meanwhile, the changing direction of the virtual sound source's position (e.g., the rightward direction in FIG. 18D) may be fixed for each cycle or may vary depending on the cycle.

Figure 19A:
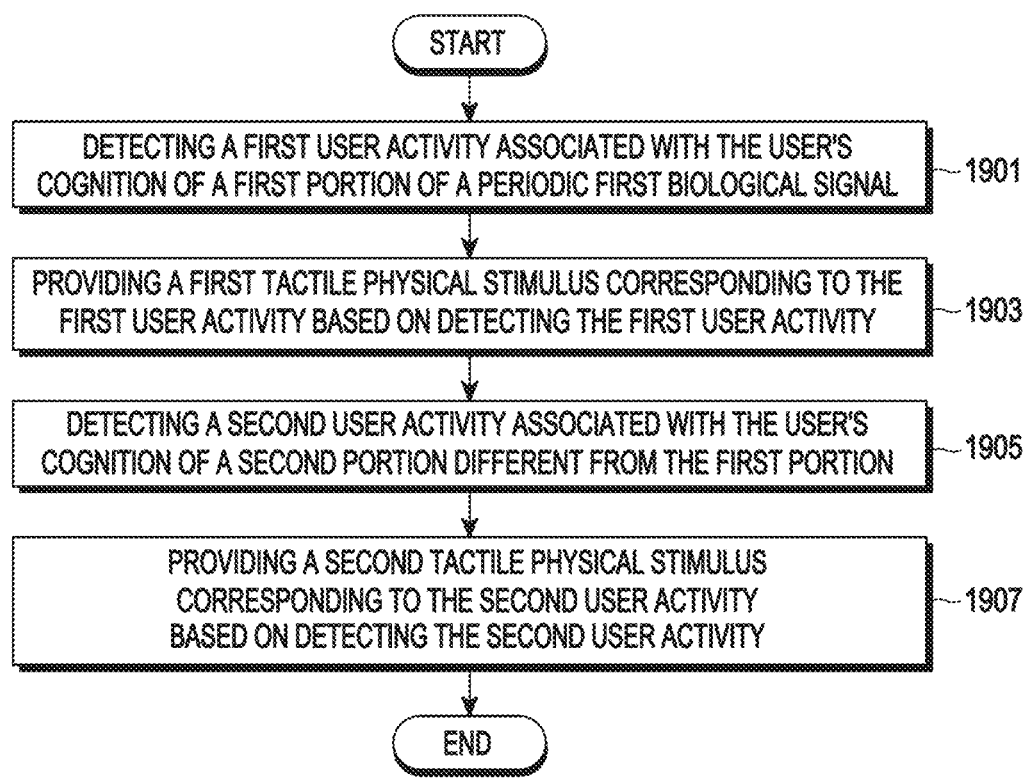
FIG. 19A is a diagram illustrating a method for providing physical contact stimuli according to an embodiment.
Figure 19B:
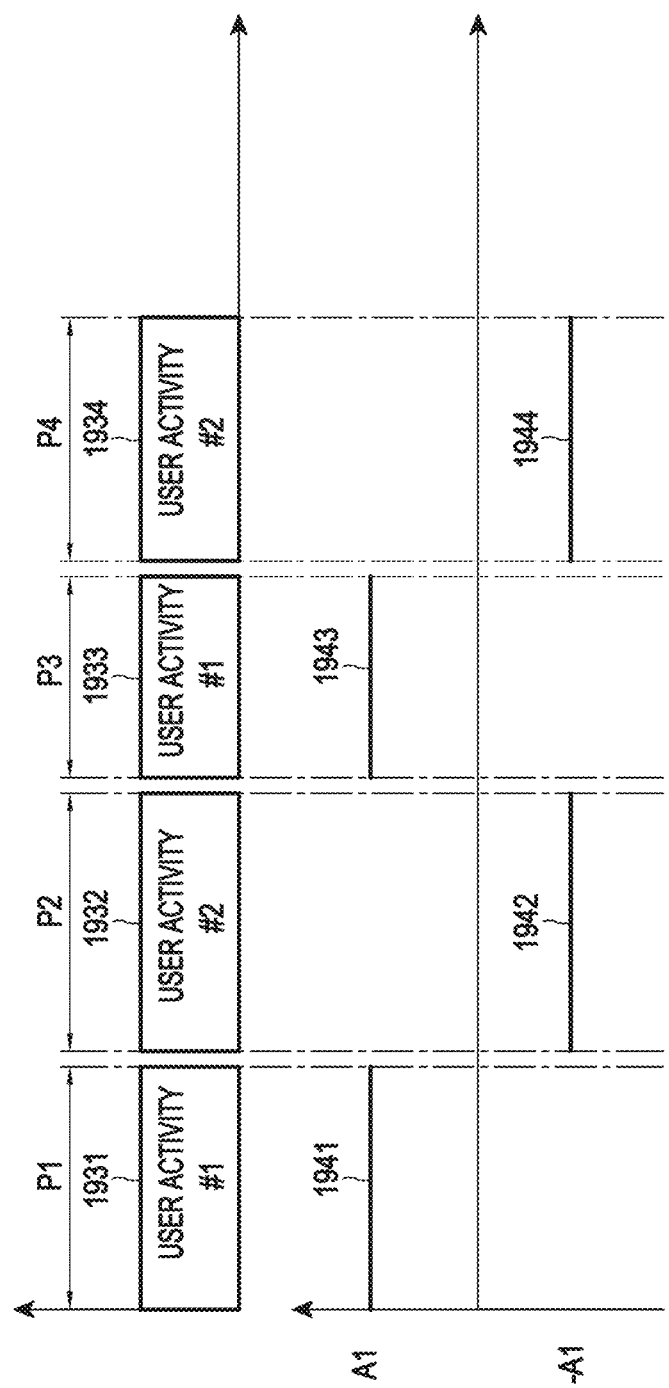
FIG. 19B is a diagram illustrating physical contact stimuli provided according to an embodiment.

FIG. 19A illustrates a diagram explaining a method for providing physical contact stimulation according to an embodiment. FIG. 19A is described with reference to FIG. 19B. FIG. 19B illustrates a diagram explaining the provision of physical contact stimulation according to an embodiment.

According to an embodiment, the electronic device 100 may, at operation 1901, detect a first user activity associated with the user's cognition of the first part of a first biological signal exhibiting periodicity. The electronic device 100 may provide a first contact physical stimulus corresponding to the detected first user activity. For example, the electronic device 100 may include a driving device capable of providing contact physical stimuli, such as at least one motor and/or at least one actuator, and may be implemented as, for instance, a massage chair or a massage eye mask. Alternatively, the electronic device 100 may be operatively connected to a driving device (e.g., at least one motor and/or at least one actuator) via wired or wireless means. It will be understood by those skilled in the art that the provision of contact physical stimuli by the electronic device 100 may include controlling the motion of a driving device included in the electronic device 100 and/or supplying data to a driving device operatively connected to the electronic device 100 to induce motion. For example, as shown in FIG. 19B, the electronic device 100 may detect the occurrence of the first user activity 1931 during the first period P1. The electronic device 100 may, in response, provide a first driving signal 1941. Based on the first driving signal 1941, the driving device may perform a first motion, such as rotation in a first direction, though this is not limiting.

Referring to FIG. 19A, the electronic device 100 may, at operation 1905, detect a second user activity associated with the user's cognition of a second part different from the first part. The electronic device 100 may, at operation 1907, provide a second contact physical stimulus corresponding to the detected second user activity. For example, as shown in FIG. 19B, the electronic device 100 may detect the occurrence of the second user activity 1932 during the second period P2. The electronic device 100 may, in response, provide a second driving signal 1942. Based on the second driving signal 1942, the driving device may perform a second motion, such as rotation in a second direction, though this is not limiting. Subsequently, during the third period P3 and the fourth period P4, the electronic device 100 may detect the first user activity 1933 and the second user activity 1934. The electronic device 100 may perform at least one operation for providing contact physical stimuli 1933 and 1934, which are substantially synchronized with the user activities 1933 and 1934. As described above, the electronic device 100 may provide contact physical stimuli substantially synchronized with user activities (or substantially synchronized with the user's biological signals). Contact physical stimuli substantially synchronized with user activities may be provided either simultaneously with sounds substantially synchronized with user activities or as standalone physical stimuli without accompanying sound.

Figure 20:
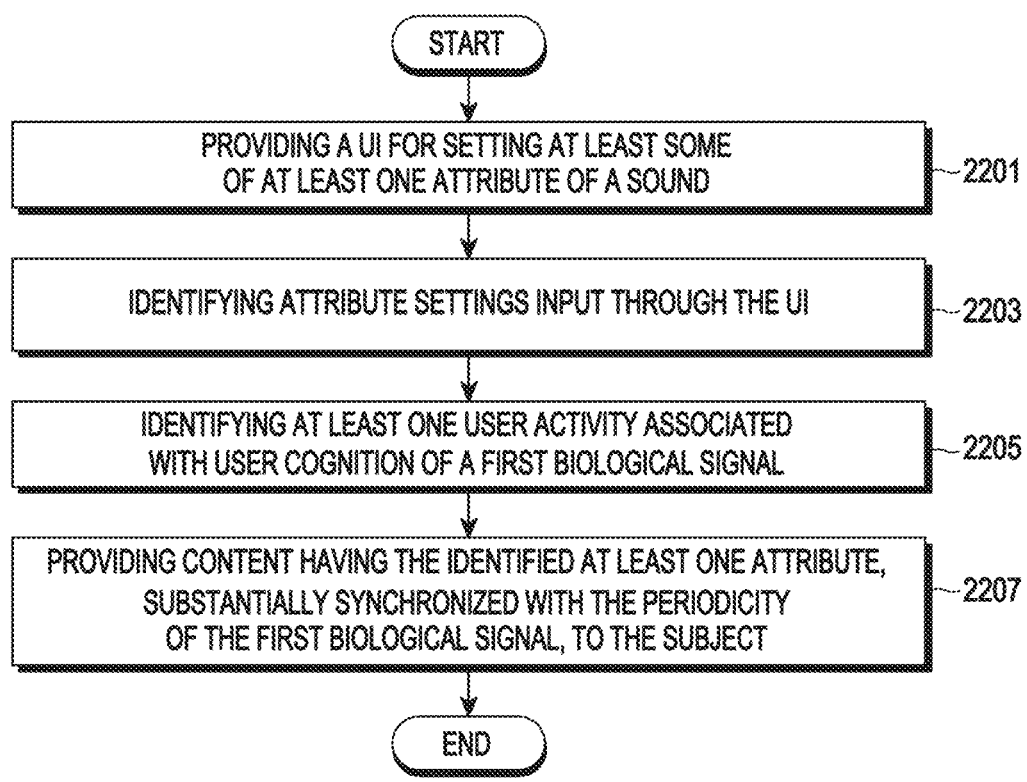
FIG. 20 is a diagram illustrating a method for providing content according to an embodiment.

FIG. 20 illustrates a diagram explaining a method for providing content according to an embodiment.

According to an embodiment, the electronic device 100 may, in operation 2201, provide a user interface (UI) for setting at least a portion of at least one property of a sound. For example, the UI may include an object that causes the setting of at least a portion of at least one property of the sound, but is not limited thereto. The electronic device 100 may, in operation 2203, identify the property setting input via the UI. For example, at least a portion of at least one property of the sound may be set by a user manipulating an object that causes the setting of at least a portion of the property. For instance, a sound having at least a portion of at least one property set (or changed) may be provided substantially in real-time in response to user input regarding at least a portion of at least one property of the sound, allowing the user to set a preferred property. However, this is merely exemplary and is not limiting. The electronic device 100 may, in operation 2205, identify at least one user activity associated with the user's cognition of the first biometric signal. The electronic device 100 may, in operation 2207, provide content having the identified at least one property synchronized substantially with the periodicity of the first biometric signal to the subject. Meanwhile, it should be understood that the property setting may be performed either before the session begins or during the sound provision after the session starts.

Figure 21A:
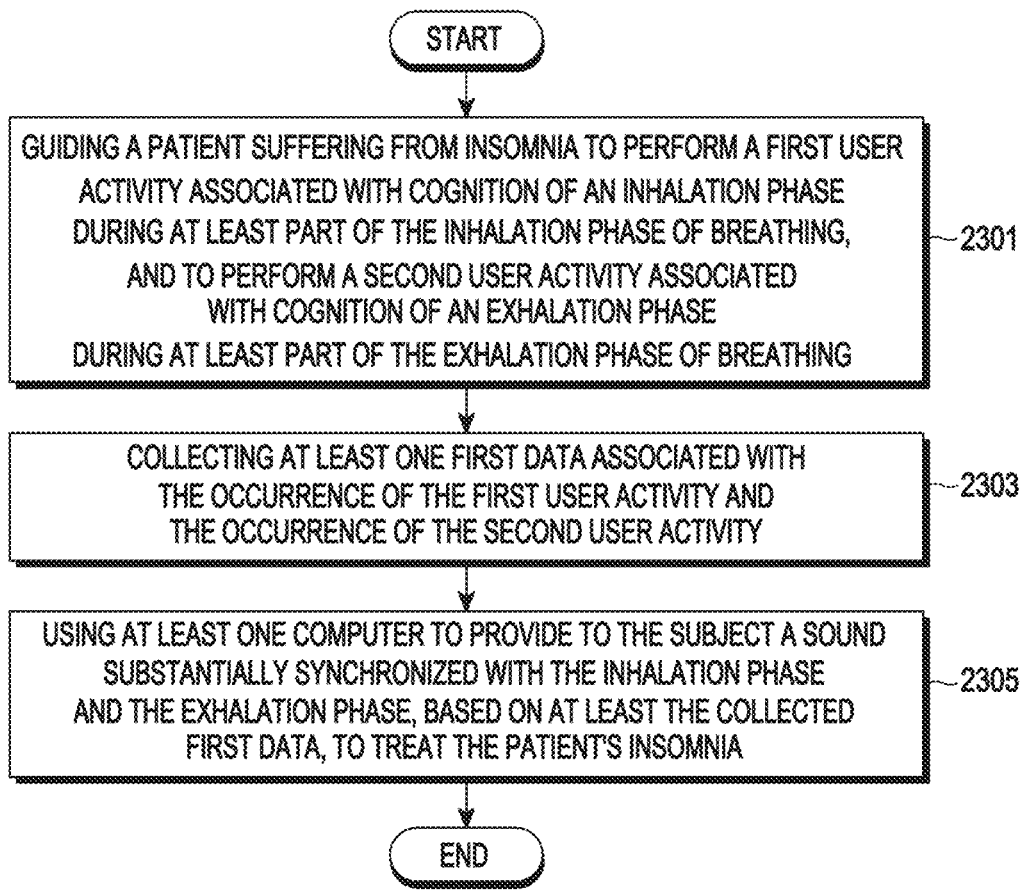
FIGS. 21A and 21B are diagrams illustrating methods for treating insomnia according to various embodiments.

FIG. 21A illustrates a diagram explaining a method for treating insomnia according to an embodiment.

According to an embodiment, the treatment method may include an operation 2301 of guiding a patient suffering from insomnia to perform, using the electronic device 100, a first user activity associated with the cognition of the inhalation period for at least a portion of the inhalation period and a second user activity associated with the cognition of the exhalation period for at least a portion of the exhalation period. The treatment method may include an operation 2303 of collecting, by the electronic device 100, at least one first data associated with the occurrence of the first user activity and the occurrence of the second user activity. According to an embodiment, the treatment method may include an operation 2305 of providing, to the subject, sounds synchronized substantially with the inhalation and exhalation periods for treating the patient's insomnia based on at least one first data using one or more computers.

Figure 21B:
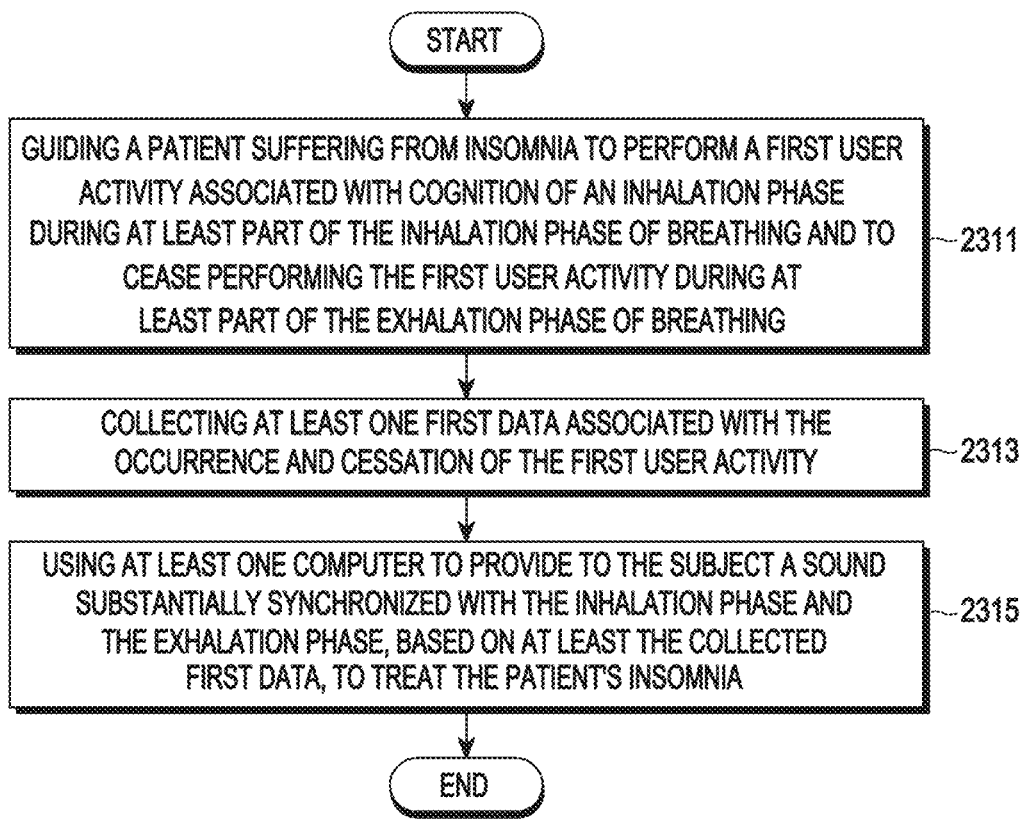

FIG. 21B illustrates a diagram explaining a method for treating insomnia according to an embodiment.

According to an embodiment, the treatment method may include an operation 2311 of guiding a patient suffering from insomnia to perform, using the electronic device 100, a first user activity associated with the cognition of the inhalation period for at least a portion of the inhalation period and to stop the first user activity for at least a portion of the exhalation period. The treatment method may include an operation 2313 of collecting, by the electronic device 100, at least one first data associated with the occurrence and cessation of the first user activity. According to an embodiment, the treatment method may include an operation 2315 of providing, to the subject, sounds synchronized substantially with the inhalation and exhalation periods for treating the patient's insomnia based on at least one first data using one or more computers.

Figure 22A:
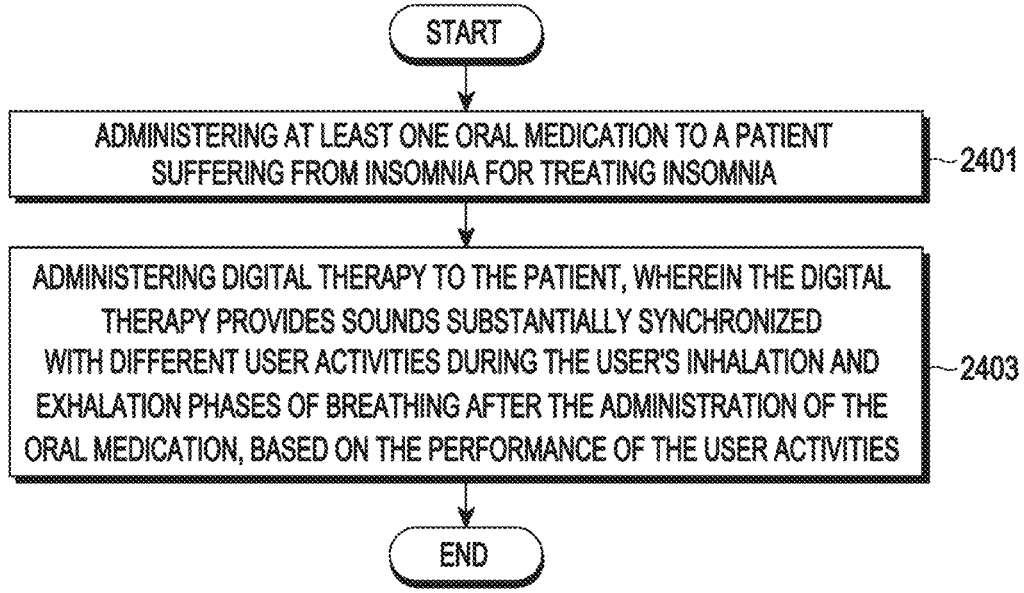
FIGS. 22A, 22B, 22C, 22D, 22E, and 22F are diagrams illustrating methods for treating insomnia according to various embodiments.

FIG. 22A illustrates a diagram explaining a method for treating insomnia according to an embodiment.

According to an embodiment, the treatment method may include an operation 2401 of administering at least one oral medication to a patient suffering from insomnia. The treatment method may include an operation 2403 of administering digital therapy to the patient by delivering sounds substantially synchronized with different user activities performed during the inhalation and exhalation periods of the user's breathing after taking the at least one oral medication.

Figure 22B:
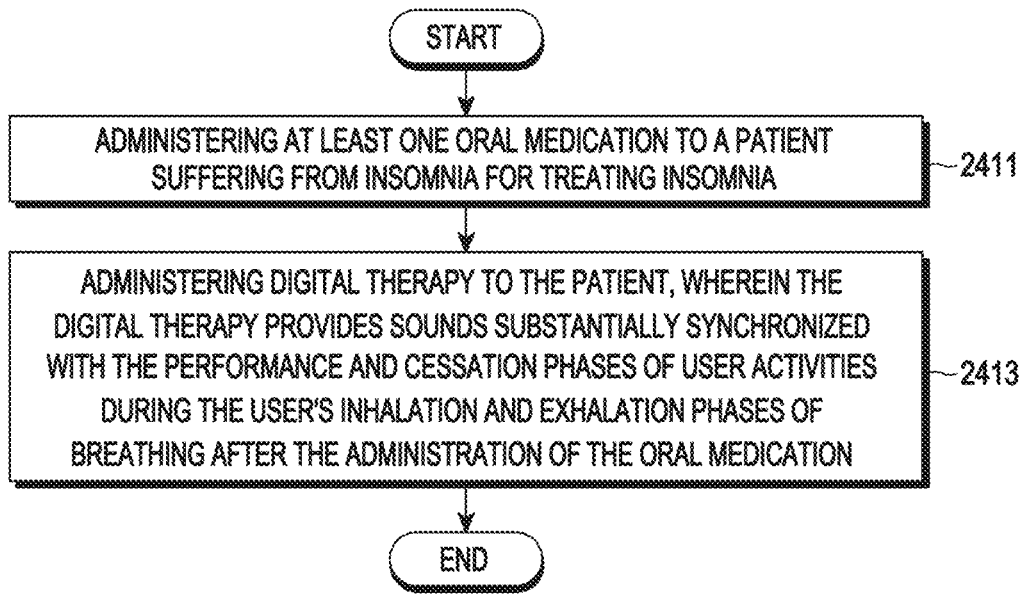

FIG. 22B illustrates a diagram explaining a method for treating insomnia according to an embodiment.

According to an embodiment, the treatment method may include an operation 2411 of administering at least one oral medication to a patient suffering from insomnia. The treatment method may include an operation 2413 of administering digital therapy to the patient by delivering sounds substantially synchronized with the execution and cessation of user activities performed during the inhalation and exhalation periods of the user's breathing after taking the at least one oral medication.

Figure 22C:
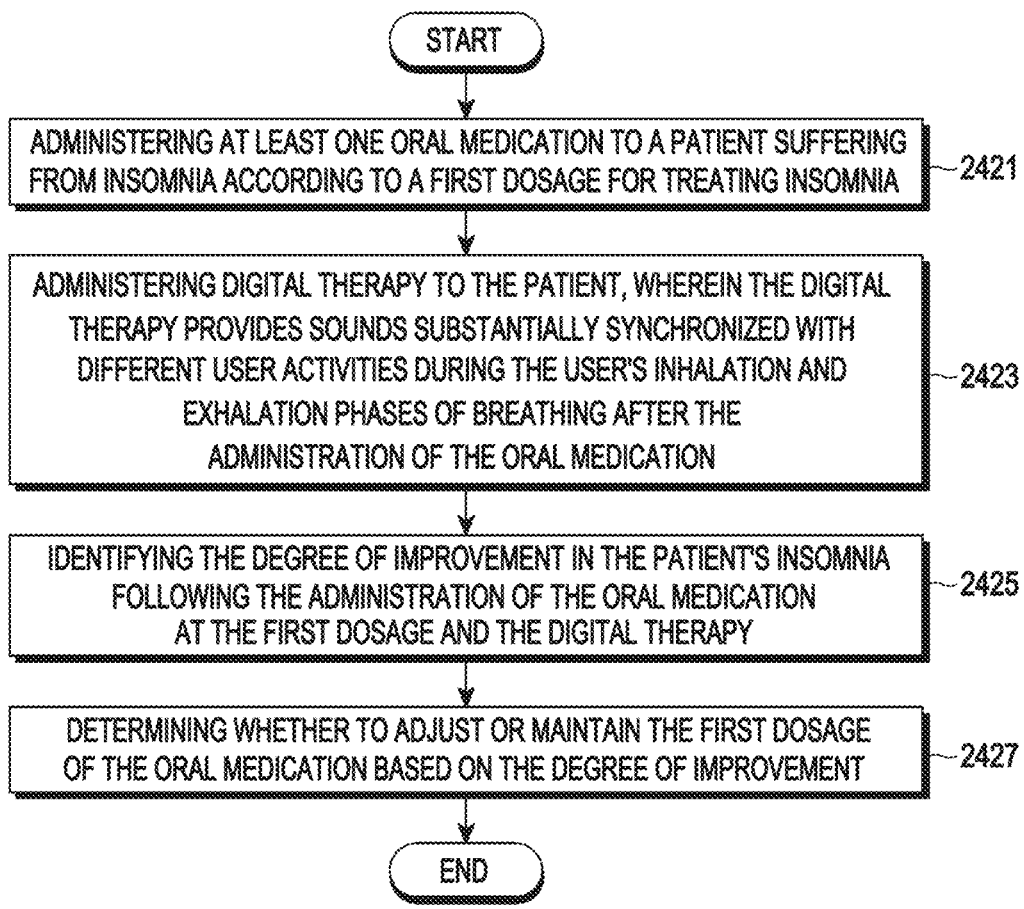

FIG. 22C illustrates a diagram explaining a method for treating insomnia according to an embodiment.

According to an embodiment, the treatment method may include an operation 2421 of administering at least one oral medication to a patient suffering from insomnia in a first dosage. The treatment method may include an operation 2423 of administering digital therapy to the patient by delivering sounds substantially synchronized with different user activities performed during the inhalation and exhalation periods of the user's breathing after taking the at least one oral medication. The treatment method may include an operation 2425 of assessing the improvement in the patient's insomnia following the administration of the first dosage of the oral medication and digital therapy. The treatment method may include an operation 2427 of determining whether to adjust or maintain the first dosage of the at least one oral medication based on the degree of improvement.

Figure 22D:
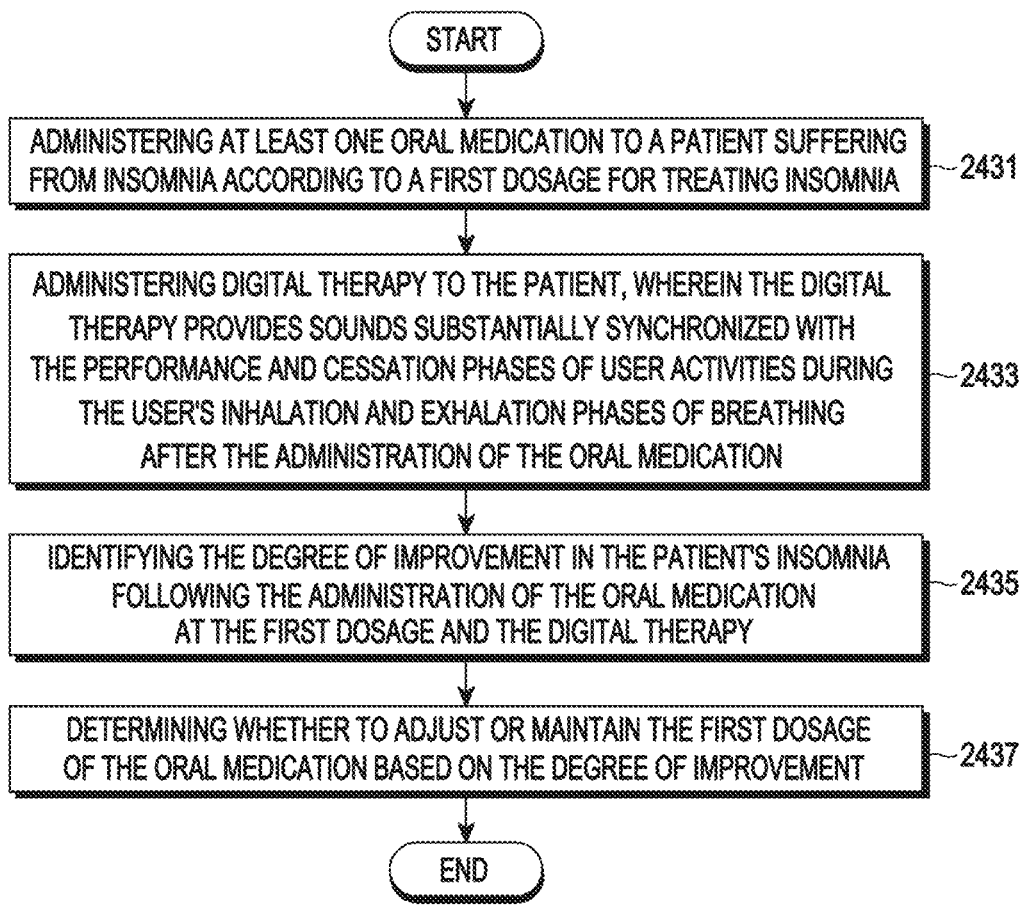

FIG. 22D illustrates a diagram explaining a method for treating insomnia according to an embodiment.

According to an embodiment, the treatment method may include administering (2431) at least one oral medication for treating insomnia to an insomnia patient according to a first dosage. The treatment method may include administering (2433) digital therapy, where digital therapy involves providing sounds substantially synchronized with the performance and cessation of user activities during the inhalation and exhalation phases of the user's breathing after taking the at least one oral medication. The treatment method may include identifying (2435) the degree of improvement in the patient's insomnia based on the administration of the first dosage of oral medication and digital therapy. The treatment method may include determining (2437) whether to adjust or maintain the first dosage of the at least one oral medication based on the degree of improvement.

Figure 22E:
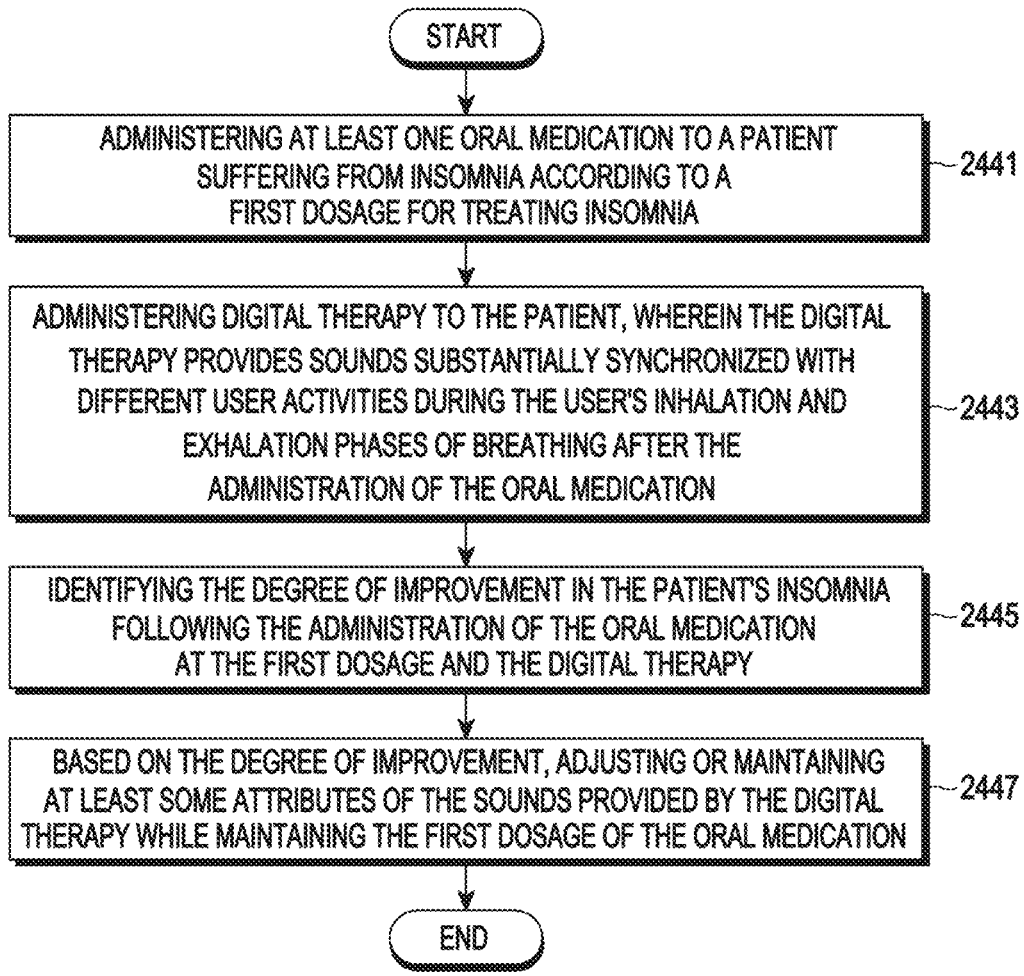

FIG. 22E illustrates a diagram explaining a method for treating insomnia according to an embodiment.

According to an embodiment, the treatment method may include administering (2441) at least one oral medication for treating insomnia to an insomnia patient according to a first dosage. The treatment method may include administering (2443) digital therapy, where digital therapy involves providing sounds substantially synchronized with the performance of distinct user activities during the inhalation and exhalation phases of the user's breathing after taking the at least one oral medication. The treatment method may include identifying (2445) the degree of improvement in the patient's insomnia based on the administration of the first dosage of oral medication and digital therapy. The treatment method may include adjusting or maintaining (2447) at least some of the properties of the sounds in the digital therapy while maintaining the first dosage of the at least one oral medication, based on the degree of improvement.

Figure 22F:
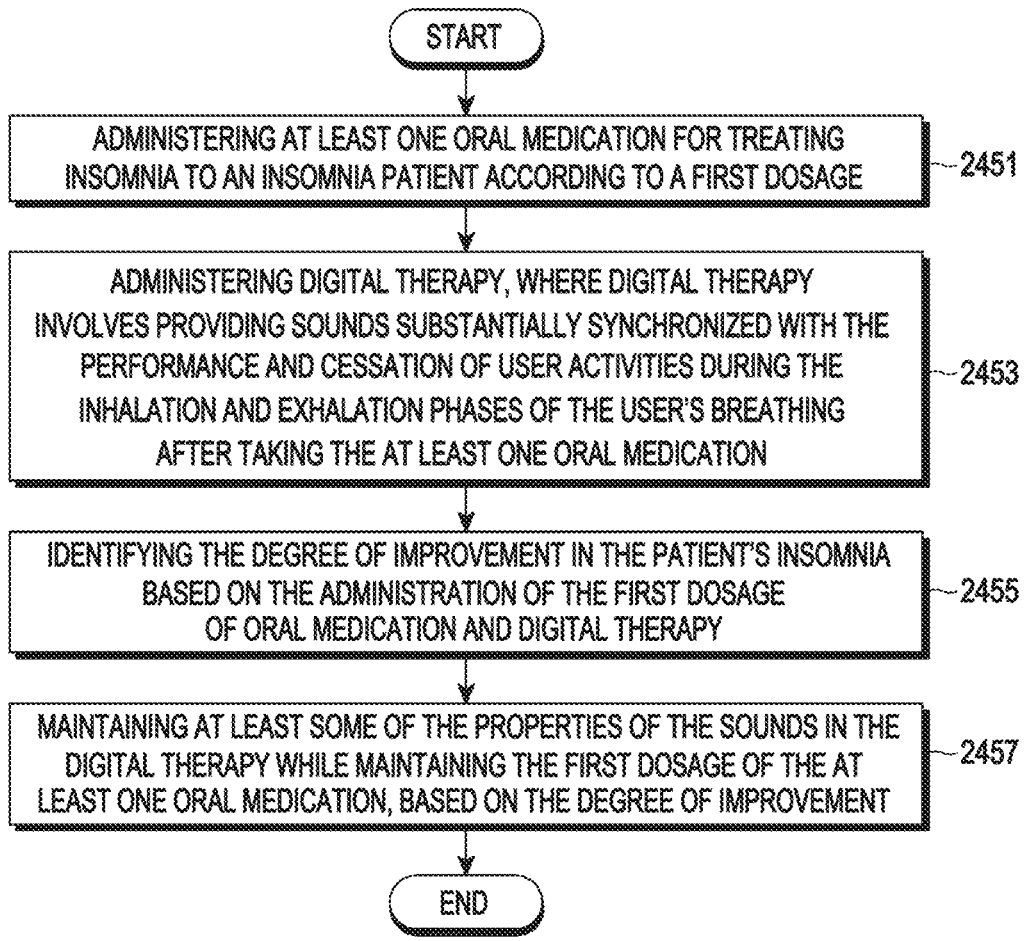

FIG. 22F illustrates a diagram explaining a method for treating insomnia according to an embodiment.

According to an embodiment, the treatment method may include administering (2451) at least one oral medication for treating insomnia to an insomnia patient according to a first dosage. The treatment method may include administering (2453) digital therapy, where digital therapy involves providing sounds substantially synchronized with the performance and cessation of user activities during the inhalation and exhalation phases of the user's breathing after taking the at least one oral medication. The treatment method may include identifying (2455) the degree of improvement in the patient's insomnia based on the administration of the first dosage of oral medication and digital therapy. The treatment method may include adjusting or maintaining (2457) at least some of the properties of the sounds in the digital therapy while maintaining the first dosage of the at least one oral medication, based on the degree of improvement.

Figure 23:
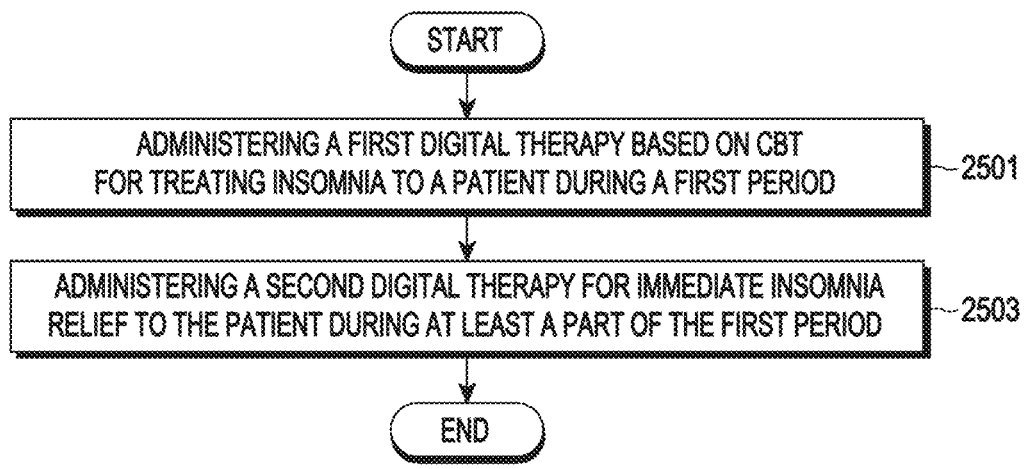
FIG. 23 is a diagram illustrating a method for treating insomnia according to an embodiment.

FIG. 23 illustrates a diagram explaining a method for treating insomnia according to an embodiment.

According to an embodiment, the treatment method may include administering (2501) a first digital therapy based on CBT (Cognitive Behavioral Therapy) for treating insomnia to an insomnia patient over a first period (e.g., one month, though not limited to this duration). The first digital therapy may, for example, be referred to as CBT-I (Cognitive Behavioral Therapy for Insomnia), which is a form of cognitive behavioral therapy designed to treat insomnia by focusing on modifying negative thoughts and behaviors that contribute to insomnia, though not limited to these approaches. For instance, the first digital therapy may include sleep education. For instance, the first digital therapy may include keeping a sleep diary (e.g., bedtime, wake-up time, sleep quality, number of awakenings during the night, etc.). For instance, the first digital therapy may include stimulus control (e.g., managing environmental factors such as noise or lighting). For instance, the first digital therapy may include sleep restriction (e.g., limiting daytime naps). For instance, the first digital therapy may include cognitive restructuring. For instance, the first digital therapy may include improving sleep hygiene. Meanwhile, the aforementioned measures are illustrative, and there are no limitations on the types and/or number of CBT-based digital therapies.

The treatment method may include administering (2503) a second digital therapy for immediate treatment of insomnia to an insomnia patient during at least a portion of the first period. For example, the second digital therapy may include the alternating provision of a first sound substantially synchronized with the detection of a first user activity indicating cognition of the first portion of the user's biological rhythm, and a second sound substantially synchronized with the detection of a second user activity indicating cognition of the second portion of the user's biological rhythm, as described above, though not limited to this. For instance, if the CBT-based first digital therapy requires execution over a one-month period, the second digital therapy may be administered before sleep onset within that one-month period; however, there are no specific limitations regarding the timing of administration. The following describes the user-specific effects when providing sleep-inducing content according to an embodiment.

1. Experimental Design

Under the first condition, subjects were instructed to sleep without using the sleep-inducing content described in the embodiment. Under the second condition, the subjects used the sleep-inducing content described in the embodiment while sleeping. The subjects participated in experiments for both conditions on different days, and the effects of the sequence of participation in the two conditions were offset through counterbalancing. The impact of using or not using the content on the subjects' sleep was evaluated by comparing the results of polysomnography and the sleep quality survey assessment (K-RCSQ).

The independent variable: Whether the sleep-inducing content described in the embodiment is used or not The dependent variable: Results of the polysomnography test (four items: sleep latency, sleep efficiency, wake time during sleep, and the ratio of light sleep to deep sleep) and results of the sleep quality questionnaire evaluation (five items: depth of sleep, time taken to fall asleep, awakenings during sleep, waking up during sleep, and overall sleep quality)

The participants were selected among individuals experiencing insomnia symptoms based on the criteria referenced in the DSM-V insomnia section, with a total of 10 participants included. Participants were provided with explanations regarding the experimental procedures and content and were given time to adapt to the sleep experiment. To eliminate factors that could disrupt sleep, such as sleepwear and environmental conditions (temperature, humidity, and lighting), the experiment was conducted under controlled conditions for sleepwear and the environment. Participants conducted the experiment over two days, spending one day each under the independent variable conditions of "system use/non-use." To eliminate order effects, the experimental conditions were randomized. After completing the first session, participants were given a rest period of at least one day before proceeding with the second condition. The laboratory environment was maintained at a temperature of $20.0\pm2.0°$ C. and a humidity level of $65.0\pm5.0\%$.

The participants consisted of 10 individuals (5 males and 5 females) aged between 20 and 40, with no other medical conditions besides insomnia. All participants self-reported typically taking more than 30 minutes to fall asleep and experiencing subjective difficulty with sleep onset. The details of the participants are summarized in Table 1 (e.g., mean and standard deviation). Additionally, Table 2 presents the K-PSQI scores, which provide an overview of the participants' usual sleep quality.

TABLE 1

| age(yrs) | weight(kg) | height(cm) | BMI(kg/m2) | K-PSQI |
|---|---|---|---|---|
| 32.2(2.9) | 75.3(11.11) | 176.20(6.77) | 24.47(3.75) | 9.5(2.15) |

The K-Pittsburgh Sleep Quality Index (K-PSQI) is a standardized self-report questionnaire designed to measure an individual's sleep quality over the past month. It consists of seven components: Sleep Quality, Sleep Latency, Sleep Duration, Habitual Sleep Efficiency, Sleep Disturbances, Use of Sleeping Medication, and Daytime Dysfunction. Each component is scored on a scale of up to 3 points, with a maximum total score of 21 points. Higher scores indicate a greater likelihood of experiencing sleep disturbances. The score ranges are categorized as follows: 0-4 points indicate a normal sleep state, 5-10 points indicate suboptimal sleep where the quality and quantity of sleep are compromised, and 11-21 points indicate a sleep disorder that significantly interferes with daily life and requires proactive treatment.

Participants lay on the bed and used the sleep-inducing content according to the embodiment for approximately 10 to 30 minutes. The sleep-inducing sound was delivered through a Bluetooth speaker and was set to automatically stop 30 minutes after the start, even if the participants fell asleep during use. To minimize placebo effects, product brochures or introductory materials provided by the manufacturer were not used in the experiment. Instead, the experiment was conducted with objective instructions on the usage method provided by a researcher affiliated with the Korea Research Institute of Standards and Science.

2. Evaluation Method 2.1. Objective Evaluation: Polysomnography

The effect of using the content for sleep induction according to the embodiment on sleep was evaluated by analyzing four key parameters using polysomnography. The four key parameters are as follows:

Sleep latency (min): The time taken to fall asleep. Normal sleep latency for a healthy individual ranges between 10 to 20 minutes.

Sleep efficiency (%): The ratio of actual sleep time to the time spent in bed intending to sleep, including actual sleep. A value of 80% or above is considered normal, and healthy young adults typically achieve 90% or higher.

Wake time after sleep onset (WASO, min): The total time the individual is awake during the sleep period.

Ratio of sleep stages ((S1+S2)/(S3+S4)): The ratio of light sleep (Stage 1 [S1; Slow eye movement]+Stage 2 [S2; K-Complex]) to deep sleep (Stage 3,4 [S3, S4; Deep Sleep]).

For the measurements, electroencephalogram (EEG) sensors were placed at C3, C4, and O1 channels, with positions calculated using the 10-20 system. Electromyography (EMG) sensors were used to measure eye movement (PNG1+, PNG1−, PNG2+, PNG2−) and muscle activity around the mouth (EMG2+, EMG2−). To measure cardiac potential, electrocardiogram (ECG) sensors were placed at ECG2+ and ECG2− channels, with G1 and G2 as ground channels. The measurement system was based on the SysPlus Evolution equipment from Micromed.

2.2 Subjective Evaluation: Richards-Campbell Sleep Questionnaire (RCSQ)

Two sleep surveys, the Korean version of the Pittsburgh Sleep Quality Index (K-PSQI) and the Korean version of the Richards-Campbell Sleep Questionnaire (K-RCSQ), were performed during the study. The K-PSQI was utilized to assess the participants' baseline sleep quality and served as a secondary screening tool to determine eligibility for the experiment. The K-PSQI was conducted once for each participant. The K-RCSQ was conducted twice for each participant: once under the device usage condition and once under the non-usage condition. The K-RCSQ is a tool designed to evaluate sleep quality in clinical or other healthcare settings. This self-reported questionnaire allows participants to evaluate their sleep experience based on five key components: depth of sleep, time taken to fall asleep, frequency of awakenings during sleep, ease of returning to sleep after waking, and overall sleep quality. Each component is rated on a scale from 0 to 100, with higher scores indicating better sleep quality. The K-RCSQ provides a subjective assessment of sleep quality, complementing the objective measurements and offering a comprehensive understanding of the participants' sleep experiences under different conditions.

2.3 Statistical Analysis Method

The changes in measurements under the usage condition compared to the non-usage condition were tested for statistical significance using a paired t-test. If the assumption of normality was not met, the Wilcoxon signed-rank test, a non-parametric alternative, was used. The significance level was set at 0.05. Sleep stages were analyzed through polysomnography, and the four derived metrics were compared based on the usage condition of the sleep-inducing content to evaluate its objective impact on sleep. Additionally, the overall results of the K-RCSQ survey and its five specific items were compared by usage condition to assess the subjective impact of the content on sleep quality.

3. Results 3.1. Objective Evaluation-Polysomnography

Based on the sleep stage information analyzed through polysomnography, four sleep quality indicators were calculated, and the changes in each indicator between the non-use and use conditions of the sleep-inducing app were statistically tested. Table 2 presents the mean values and standard deviations for the four sleep quality indicators under the non-use and use conditions, along with the test statistics and p-values.

TABLE 2

| Measurement Item | Non-user | Use | Statistic | p-value |
|---|---|---|---|---|
| sleep latency (min) | 38.8(8.67) | 27.6(8.06) | $t(9) = 3.79$ | .004** |
| sleep efficiency (%) | 86.7(8.96) | 95.2(2.76) | $t(9) = -3.27$ | .009** |
| wake time after sleep onset (min) | 43.8(38.47) | 15.8(11.97) | $t(9) = 2.89$ | .18* |
| ratio of sleep stage | 5.1(3.1) | 4.7(8.4) | $Z(9) = -1.62$ | .106 |

Moreover, FIGS. 24A to 24D are graphs visualizing the results of content usage/non-usage according to the embodiment.

As a result, the content according to the embodiment statistically significantly reduced the time required for sleep onset ($t(9)=3.79$, $p=0.004$**). The sleep latency, which was an average of 38.8 minutes in the non-use condition, was reduced to an average of 27.6 minutes in the use condition, showing a reduction of 11.2 minutes on average. In other words, the sleep latency was reduced by 28.8% compared to the non-use condition.

The content according to the embodiment statistically significantly improved sleep efficiency ($t(9)=-3.27$, $p=0.009$**). Sleep efficiency, an indicator representing the ratio of actual sleep time to the time spent lying in bed for sleep, is considered within the normal range if it is above 80% and is generally reported as over 90% in healthy young adults. The sleep efficiency, which averaged 86.7% in the non-use condition, improved to an average of 95.2% in the use condition, showing an average increase of 8.5%.

The content according to the embodiment statistically significantly reduced wake time after sleep onset (WASO) ($t(9)=2.89$, $p=0.018$*). The wake time after sleep onset, which was reported as an average of 43.8 minutes in the non-use condition, was reduced to an average of 15.8 minutes in the use condition, shortening the wake time after sleep onset by an average of 28 minutes. In other words, the wake time after sleep onset was reduced by 63.9% compared to the non-use condition.

Figure 24A:
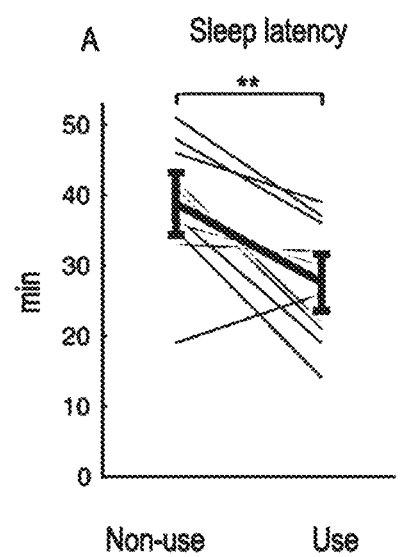
FIGS. 24A, 24B, 24C, and 24D are graphs visualizing the results of using/not using content according to an embodiment.
Figure 24B:
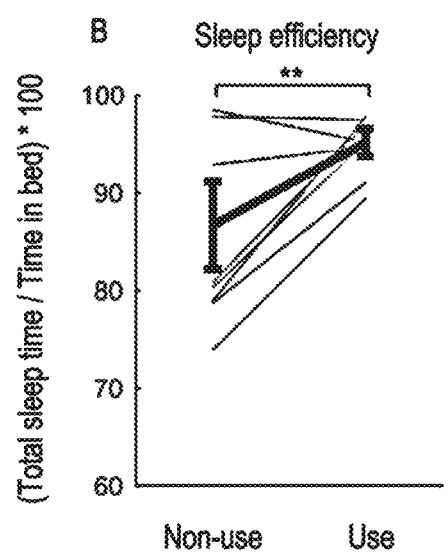
Figure 24C:
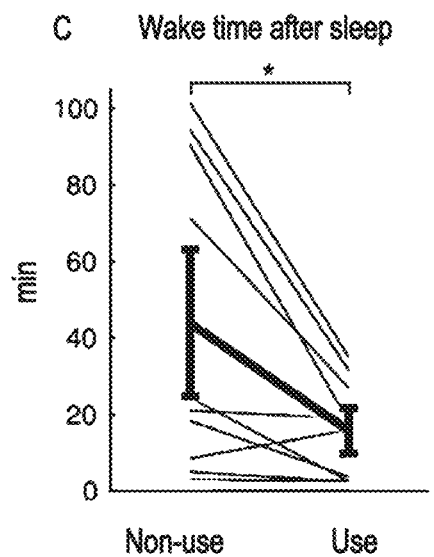
Figure 24D:
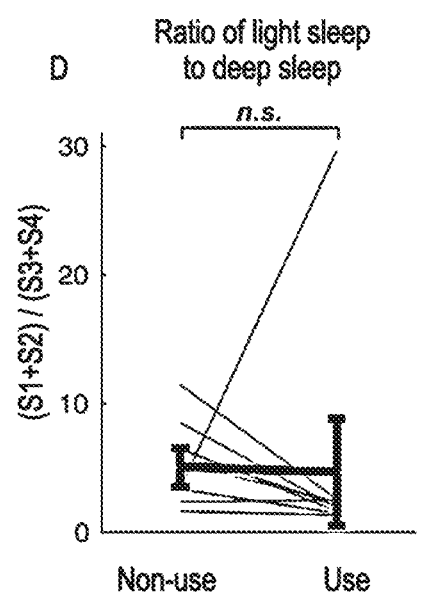
Figure 25A:
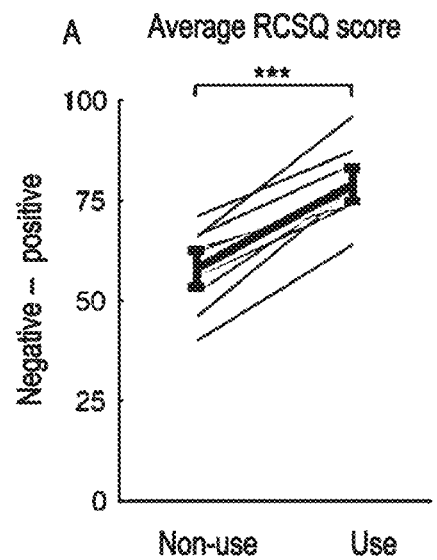
FIGS. 25A, 25B, 25C, 25D, 25E, and 25F are graphs visualizing the results of using/not using content according to an embodiment.
Figure 25B:
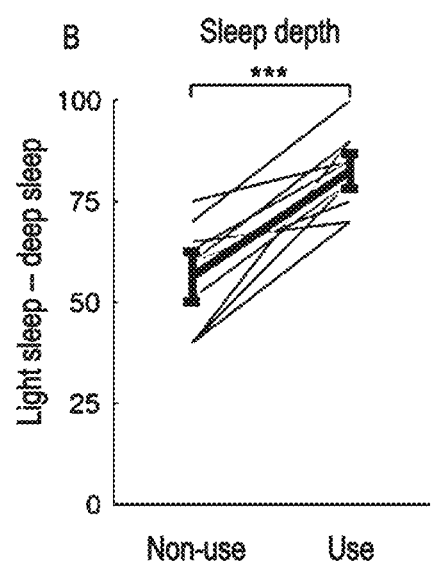
Figure 25C:
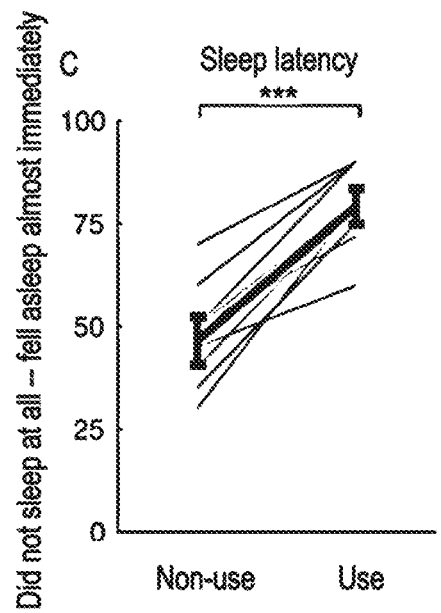
Figure 25D:
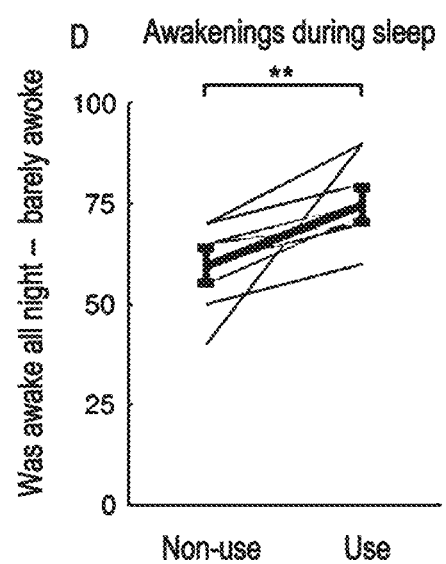
Figures 25E, 25F:
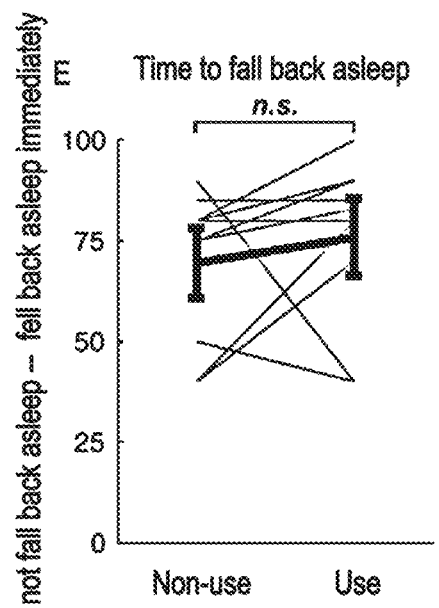

The content according to the embodiment did not statistically significantly improve the ratio of light sleep to deep sleep ($Z(9)=-1.62$, $p=0.106$). However, as shown in FIG. 24d, it is possible that one participant skewed the average. Therefore, in addition to the average values reported in Table 2, the median values are also provided. The median ratio of light sleep to deep sleep in the non-use condition was 4.38, while the median value in the use condition was 1.96.

3.2. Subjective Evaluation-Richards-Campbell Sleep Questionnaire

The K-RCSQ is a survey tool designed to subjectively evaluate the quality of sleep from the previous night, consisting of an average score and detailed scores for five sub-items. In this study, the statistical significance of changes in the average RCSQ score was tested between the conditions of using and not using the content according to the embodiment. Subsequently, tests were conducted on the five sub-items comprising the questionnaire. Table 3 summarizes the average values and standard deviations for both the non-use and use conditions of the content for the average score and the five sub-items, along with the test statistics and p-values. FIGS. 25a through 25f visualize the results of using or not using the content according to the embodiment.

TABLE 3

| Measurement Item | Non-user | Use | Statistic | p-value |
|---|---|---|---|---|
| average RCSQ | 58.1(9.22) | 79.0(8.16) | t(9) = −9.76 | .000*** |
| sleep depth | 56.4(12.29) | 82.5(9.01) | t(9) = −6.07 | .000*** |
| falling asleep | 46.5(11.63) | 79.2(8.99) | t(9) = −9.29 | .000*** |
| Awakening | 59.5(8.79) | 74.7(8.99) | Z(9) = −2.82 | .005** |
| returning to sleep | 69.5(17.81) | 75.8(19.38) | t(9) = −0.81 | .441 |
| overall sleep quality | 58.5(15.34) | 79.0(8.16) | t(9) = −6.39 | .000*** |

Participants responded with a score between 0 and 100, where scores closer to 0 indicate negative responses, and scores closer to 100 indicate positive responses.

The use of the content according to the embodiment significantly improved the average RCSQ score (t(9)=−9.76, p<0.000***). The average RCSQ score, reported as 58.1 under the non-use condition, improved to 79.0 under the use condition.

The analysis of specific items revealed that the content according to the embodiment was effective in improving the subjectively reported depth of sleep (t(9)=−6.07, p<0.000*). The average sleep depth score, which was 56.4 when the content was not used, significantly increased to 82.5 when the app was used. Additionally, the evaluation of sleep latency, or the time taken to fall asleep, also improved due to the use of the sleep-inducing app (t(9)=−9.29, p<0.000*). The average sleep latency score was 46.5 under the non-use condition but improved to 79.2 with the use of the content according to the embodiment.

Table 4 shows the K-PSQI scores for each participant.

Each component has a maximum score of 3 points, and the total maximum score is 21 points. Higher scores indicate a higher likelihood of experiencing sleep disturbances. (0-4 points: normal state, 5-10 points: a state where sleep quality and quantity are disrupted, preventing restful sleep, 11-21 points: a state of sleep disorder interfering with daily life, requiring active treatment.)

As described above, it may be confirmed that the use of the content according to the embodiment is effective in inducing sleep.

Figure 26:
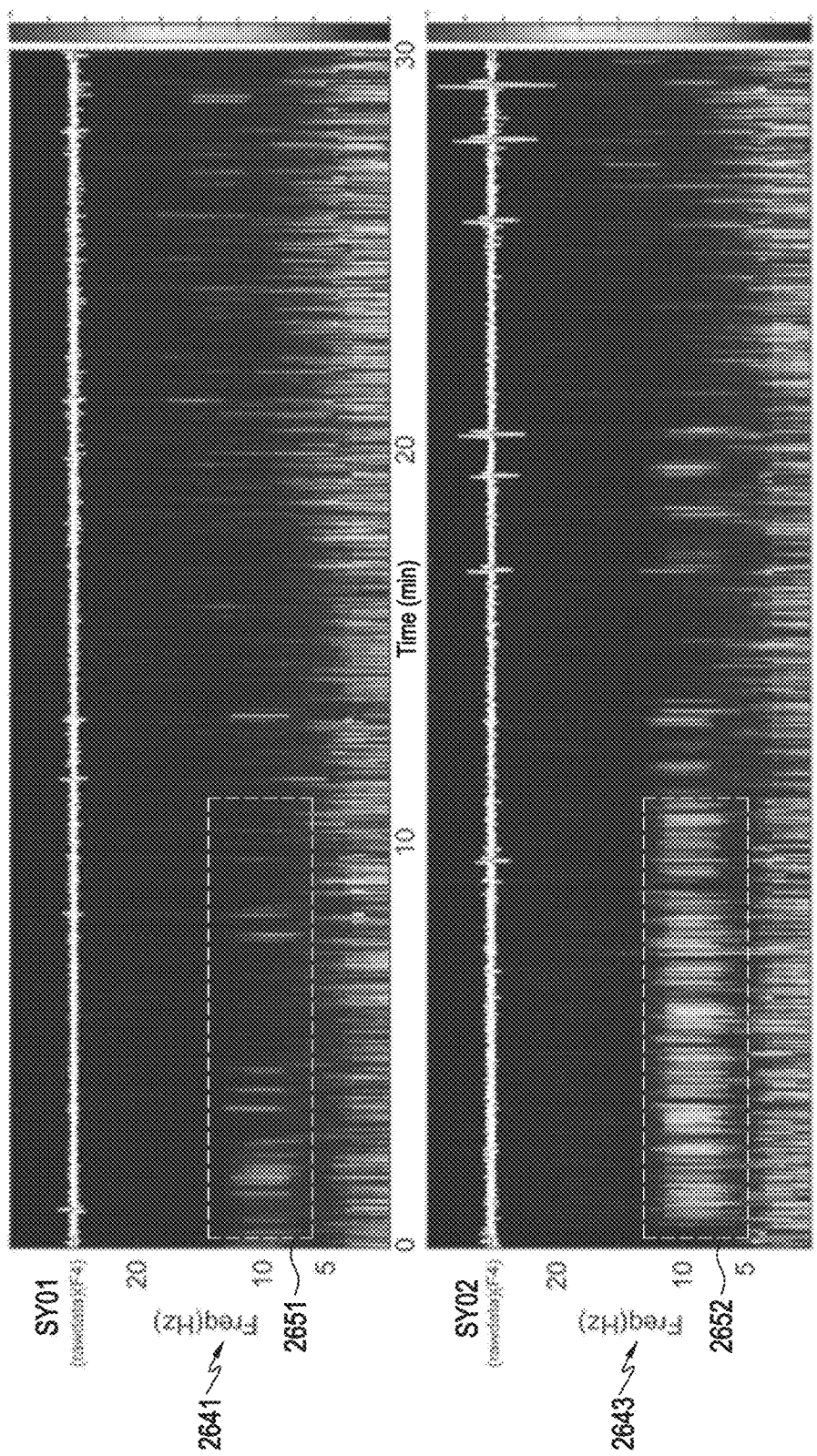
FIG. 26 is a graph visualizing brainwave activity during content usage and sleep medication usage according to an embodiment.

FIG. 26 presents graphs visualizing brainwave activity during the use of the content according to the embodiment and during the administration of a sleep aid.

Referring to FIG. 26, brainwave activity over time under the condition of taking a sleep-inducing agent (first-generation antihistamine) is shown in 2641, and brainwave activity over time during the use of the content according to the embodiment is shown in 2643.

The amplitude of the alpha wave band 2652 during the 0 to 10-minute interval after the start of content provision according to the embodiment is greater than that of the alpha wave band 2651 during the 0 to 10-minute interval after sleep aid administration. Alpha waves are brainwaves associated with bodily relaxation and sleep induction, confirming the sleep-inducing effect of the content experience according to the embodiment.

Figure 27:
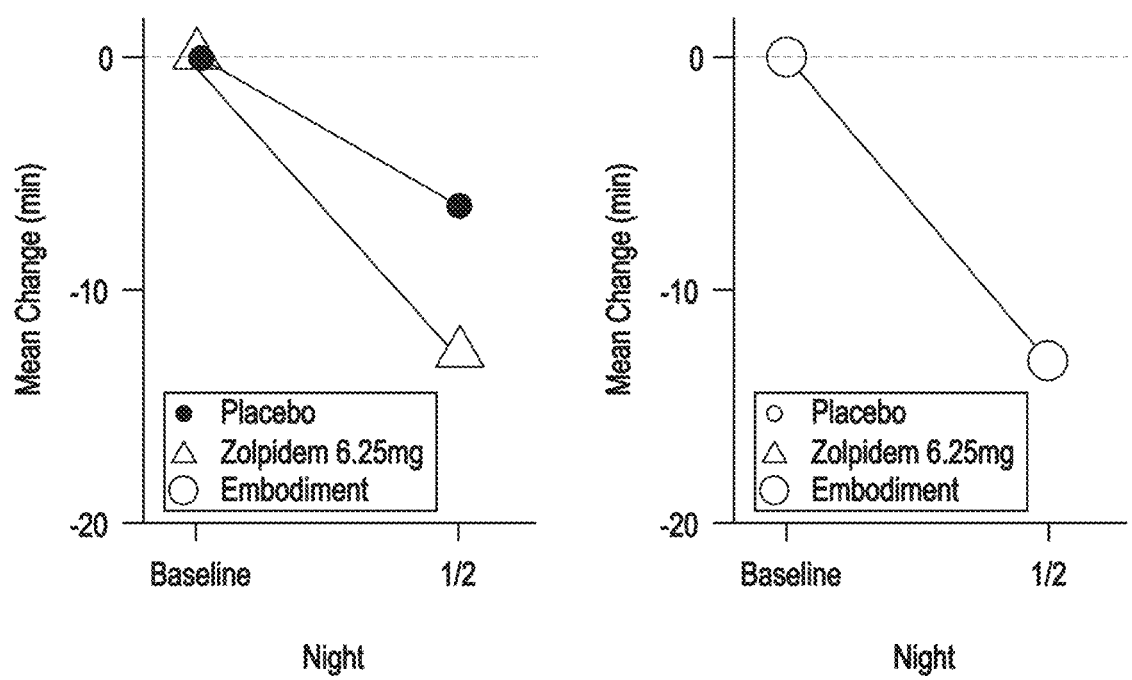
FIG. 27 is a graph illustrating average changes in brainwave activity during content usage and sleep medication usage according to an embodiment.

FIG. 27 illustrates graphs explaining the average changes in brainwaves during the use of content according to the embodiment and after the administration of sleep aids.

Referring to FIG. 27, it may be observed that the average change in latency to persistent sleep during sleep aid administration and the use of content according to the embodiment is relatively greater compared to the average change corresponding to the placebo. Furthermore, the average change during content use is found to be similar to the average change observed during sleep aid administration. In the experiment, the sleep aid used was Zolpidem, with a dosage of 6.25 mg.

The invention claimed is:

1. A method performed by an electronic device for providing sound, the method comprising:
repeatedly performing, by the electronic device, first operations based on a usage mode of the electronic device being a first mode, the first operations comprising:
providing, by the electronic device, a first sound corresponding to a first user activity, the first user activity being associated with user cognition regarding a period for inhalation of a user's breathing, and

TABLE 4

| participant | sleep quality | sleep latency | sleep duration | habitual sleep efficiency | sleep disturbances | use of sleeping medication | daytime dysfunction | SUM |
|---|---|---|---|---|---|---|---|---|
| A | 2 | 3 | 1 | 0 | 1 | 0 | 2 | 9 |
| B | 2 | 3 | 2 | 0 | 1 | 0 | 2 | 10 |
| C | 1 | 2 | 1 | 0 | 2 | 0 | 1 | 7 |
| D | 2 | 2 | 1 | 0 | 2 | 0 | 3 | 10 |
| E | 2 | 3 | 2 | 1 | 1 | 0 | 3 | 12 |
| F | 2 | 2 | 3 | 0 | 2 | 1 | 3 | 13 |
| G | 2 | 2 | 2 | 1 | 1 | 0 | 2 | 10 |
| H | 1 | 2 | 0 | 0 | 2 | 0 | 2 | 7 |
| I | 1 | 2 | 0 | 0 | 1 | 0 | 2 | 6 |
| J | 2 | 3 | 2 | 0 | 1 | 0 | 3 | 11 | the first sound being substantially synchronized with a detection time point of the first user activity, and providing, by the electronic device, a second sound corresponding to a second user activity different from the first user activity, the second user activity being associated with user cognition regarding a period for exhalation of the user's breathing, and the second sound being substantially synchronized with a detection time point of the second user activity;

changing, by the electronic device, the usage mode from the first mode to a second mode based on identifying satisfaction of at least one condition among a plurality of conditions for changing the usage mode from the first mode to the second mode; and repeatedly performing, by the electronic device, second operations independently of detection of the first user activity and the second user activity based on the usage mode being the second mode, wherein the second operations comprise:
providing, by the electronic device, the first sound corresponding to the first user activity; and
providing, by the electronic device, the second sound corresponding to the second user activity, wherein durations for at least part of the first sound and the second sound which are provided as the second operations are determined based on durations for at least part of the first sound and the second sound which are provided as the first operations, wherein the plurality of conditions for changing the usage mode from the first mode to the second mode include a first condition, a second condition, a third condition, a fourth condition, and a fifth condition, wherein the first condition is a condition in which detection of at least one of the first user activity and the second user activity fails while the usage mode is the first mode, wherein the second condition is a condition in which at least one user activity specified for entering the second mode is detected while the usage mode is the first mode, wherein the third condition is a condition in which at least a portion of a length of a period corresponding to the inhalation or a period corresponding to the exhalation is identified as being equal to or greater than a threshold length while the usage mode is the first mode, wherein the fourth condition is a condition in which a difference between consecutive breathing intervals is identified as being less than a threshold difference while the usage mode is the first mode, and wherein the fifth condition is a condition in which a specified time period has elapsed after the first mode is initiated while the usage mode is the first mode.

2. The method of claim 1,
wherein an end time point of providing the first sound during the first mode is after an end time point of detecting the first user activity, and
wherein an end time point of providing the second sound during the first mode is after an end time point of detecting the second user activity.

3. The method of claim 2,
wherein the providing of the first sound included in the first operations comprises:
providing, by the electronic device, a first portion of the first sound after detecting the first user activity and before detecting the second user activity; and
providing, by the electronic device, at least a portion of a remaining part of the first sound, other than the first portion, with a termination effect after detecting the second user activity, and wherein the providing of the second sound included in the first operations comprises:
providing, by the electronic device, a first portion of the second sound after detecting the second user activity and before detecting another first user activity; and
providing, by the electronic device, at least a portion of a remaining part of the second sound, other than the first portion, with a termination effect after detecting the other first user activity.

4. The method of claim 1,
wherein an end time point of providing the first sound during the first mode is substantially synchronized with an end time point of detecting the first user activity, and
wherein an end time point of providing the second sound during the first mode is substantially synchronized with an end time point of detecting the second user activity.

5. The method of claim 1, further comprising:
providing, by the electronic device, first content that requests a user to perform the first user activity and/or to recognize the inhalation during the first mode and/or the second mode; and
providing, by the electronic device, second content that requests the user to perform the second user activity and/or to recognize the exhalation during the first mode and/or the second mode.

6. The method of claim 5, further comprising:
providing, by the electronic device, third content based on detecting the first user activity, wherein at least one attribute of the third content is changed based on the detection of the first user activity being maintained; and
providing, by the electronic device, fourth content based on detecting the second user activity, wherein at least one attribute of the fourth content is changed based on the detection of the second user activity being maintained.

7. The method of claim 1, further comprising:
determining, by the electronic device, durations corresponding to the first sound and the second sound in the second mode during the first mode and/or the second mode.

8. The method of claim 1, wherein at least one attribute of the first sound and/or at least one attribute of the second sound is changed during at least a portion of the repeatedly providing of the first sound and the second sound in the first mode.

9. The method of claim 1, wherein at least one attribute of the first sound and/or at least one attribute of the second sound is maintained during at least a portion of the repeatedly providing of the first sound and the second sound in the first mode.

10. The method of claim 1, wherein at least one attribute of the first sound and/or at least one attribute of the second sound is changed during at least a portion of the repeatedly providing of the first sound and the second sound in the second mode.

11. The method of claim 1, wherein at least one attribute of the first sound and/or at least one attribute of the second sound is maintained during at least a portion of the repeatedly providing of the first sound and the second sound in the second mode.

12. The method of claim 1,
wherein the first sound comprises a plurality of first sub-sounds, and wherein the second sound comprises a plurality of second sub-sounds.

13. A system for providing sound for sleep induction, the system comprising:
a server; and
an electronic device including at least one processor,
wherein the server is configured to provide instructions to the electronic device based on a connection of the electronic device to the server and/or based on a request to the server from the electronic device,
wherein the instructions, when executed based on at least a part of the at least one processor of the electronic device, cause the electronic device to perform at least one operation,
wherein the at least one operation comprises:
repeatedly performing first operations based on a usage mode of the electronic device being a first mode, the first operations comprising
providing a first sound corresponding to a first user activity, the first user activity being associated with user cognition regarding a period for inhalation of a user's breathing, the first sound being substantially synchronized with a detection time point of the first user activity, and
providing a second sound corresponding to a second user activity different from the first user activity, the second user activity being associated with user cognition regarding a period for exhalation of the user's breathing, and the second sound being substantially synchronized with a detection time point of the second user activity,
wherein the at least one operation further comprises:
changing the usage mode from the first mode to a second mode based on identifying satisfaction of at least one condition among a plurality of conditions for changing the usage mode from the first mode to the second mode; and
repeatedly performing second operations independently of detection of the first user activity and the second user activity based on the usage mode being the second mode,
wherein the second operations comprise:
providing the first sound corresponding to the first user activity; and
providing the second sound corresponding to the second user activity,
wherein durations for at least part of the first sound and the second sound which are provided as the second operations are determined based on durations for at least part of the first sound and the second sound which are provided as the first operations,
wherein the plurality of conditions for changing the usage mode from the first mode to the second mode include a first condition, a second condition, a third condition, a fourth condition, and a fifth condition,
wherein the first condition is a condition in which detection of at least one of the first user activity and the second user activity fails while the usage mode is the first mode,
wherein the second condition is a condition in which at least one user activity specified for entering the second mode is detected while the usage mode is the first mode,
wherein the third condition is a condition in which at least a portion of a length of a period corresponding to the inhalation or a period corresponding to the exhalation is identified as being equal to or greater than a threshold length while the usage mode is the first mode,
wherein the fourth condition is a condition in which a difference between consecutive breathing intervals is identified as being less than a threshold difference while the usage mode is the first mode, and
wherein the fifth condition is a condition in which a specified time period has elapsed after the first mode is initiated while the usage mode is the first mode.

14. The system of claim 13,
wherein an end time point of providing the first sound during the first mode is after an end time point of detecting the first user activity, and
wherein an end time point of providing the second sound during the first mode is after an end time point of detecting the second user activity.

15. The system of claim 13,
wherein the providing of the first sound included in the first operations comprises:
repeatedly providing a first portion of the first sound after detecting the first user activity and before detecting the second user activity; and
providing at least a part of a remaining portion of the first sound other than the first portion with an ending effect after detecting the second user activity, and
wherein the providing of the second sound included in the first operations comprises:
repeatedly providing a first portion of the second sound after detecting the second user activity and before detecting another first user activity; and
providing at least a part of a remaining portion of the second sound other than the first portion with an ending effect after detecting the other first user activity.

16. The system of claim 13,
wherein an end time point of providing the first sound included in the first operations is substantially synchronized with an end time point of detecting the first user activity, and
wherein an end time point of providing the second sound included in the first operations is substantially synchronized with an end time point of detecting the second user activity.

17. A non-transitory storage medium storing computer-readable instructions, wherein the instructions, when executed by at least one processor of an electronic device, cause the electronic device to perform at least one operation, the at least one operation comprising:
repeatedly performing, by the electronic device, first operations based on a usage mode of the electronic device being a first mode;
changing, by the electronic device, the usage mode from the first mode to a second mode based on identifying satisfaction of at least one condition among a plurality of conditions for changing the usage mode from the first mode to the second mode; and
repeatedly performing, by the electronic device, second operations independently of detection of a first user activity and a second user activity based on the usage mode being the second mode,
wherein the first operations comprise:
providing, by the electronic device, a first sound corresponding to the first user activity, the first user activity being associated with user cognition regarding a period for inhalation of a user's breathing, and the first sound being substantially synchronized with a detection time point of the first user activity, and providing, by the electronic device, a second sound corresponding to the second user activity different from the first user activity, the second user activity being associated with user cognition regarding a period for exhalation of the user's breathing, and the second sound being substantially synchronized with a detection time point of the second user activity, wherein the second operations comprise:
providing, by the electronic device, the first sound corresponding to the first user activity; and
providing, by the electronic device, the second sound corresponding to the second user activity, wherein durations for at least part of the first sound and the second sound which are provided as the second operations are determined based on durations for at least part of the first sound and the second sound which are provided as the first operations, wherein the plurality of conditions for changing the usage mode from the first mode to the second mode include a first condition, a second condition, a third condition, a fourth condition, and a fifth condition, wherein the first condition is a condition of failing to detect at least one of the first user activity or the second user activity while the usage mode is the first mode;

wherein the second condition is a condition of detecting at least one designated user activity for entering the second mode while the usage mode is the first mode;

wherein the third condition is a condition of confirming that at least a part of a length of a period corresponding to inhalation or a period corresponding to exhalation is equal to or greater than a designated threshold length while the usage mode is the first mode, wherein the fourth condition is a condition of confirming that a difference between consecutive breathing intervals is less than a threshold difference while the usage mode is the first mode; and wherein the fifth condition is a condition of confirming that a designated period has elapsed after initiation of the first mode while the usage mode is the first mode.

18. The storage medium of claim 17,
wherein an end time point of providing the first sound during the first mode is after an end time point of detecting the first user activity, and
wherein an end time point of providing the second sound during the first mode is after an end time point of detecting the second user activity.

19. The storage medium of claim 17,
wherein the providing of the first sound included in the first operations comprises:
providing, by the electronic device, a first portion of the first sound after detecting the first user activity and before detecting the second user activity; and
providing, by the electronic device, at least a part of a remaining portion of the first sound other than the first portion with a termination effect after detecting the second user activity, and wherein the providing of the second sound included in the first operations comprises:
providing, by the electronic device, a first portion of the second sound after detecting the second user activity and before detecting another first user activity; and
providing, by the electronic device, at least a part of a remaining portion of the second sound other than the other first portion with a termination effect after detecting the first user activity.

20. An electronic device for providing sound for sleep induction, the electronic device comprising:
at least one sensor;
memory storing at least one instruction; and
at least one processor communicatively coupled to the at least one sensor and the memory,
wherein the electronic device is configured to perform at least one operation when the at least one processor executes the at least one instruction,
wherein the at least one operation comprises:
repeatedly performing first operations based on a usage mode of the electronic device being a first mode, the first operations comprising:
providing a first sound corresponding to a first user activity, the first user activity being associated with user cognition regarding a period for inhalation of a user's breathing, the first sound being substantially synchronized with a detection time point of the first user activity, and
providing a second sound corresponding to a second user activity different from the first user activity, the second user activity being associated with user cognition regarding a period for exhalation of the user's breathing, and the second sound being substantially synchronized with a detection time point of the second user activity, wherein the at least one operation further comprises:
changing the usage mode from the first mode to a second mode based on identifying, by the electronic device, satisfaction of at least one condition among a plurality of conditions for changing the usage mode from the first mode to the second mode; and
repeatedly performing second operations independently of detection of the first user activity and the second user activity based on the usage mode being the second mode, wherein the second operations comprise:
providing the first sound corresponding to the first user activity; and
providing the second sound corresponding to the second user activity, wherein durations for at least part of the first sound and the second sound which are provided as the second operations are determined based on durations for at least part of the first sound and the second sound which are provided as the first operations, wherein the plurality of conditions for changing the usage mode from the first mode to the second mode include a first condition, a second condition, a third condition, a fourth condition, and a fifth condition, wherein the first condition is a condition in which detection of at least one of the first user activity and the second user activity fails while the usage mode is the first mode, wherein the second condition is a condition in which at least one user activity specified for entering the second mode is detected while the usage mode is the first mode, wherein the third condition is a condition in which at least a portion of a length of a period corresponding to the inhalation or a period corresponding to the exhalation is identified as being equal to or greater than a threshold length while the usage mode is the first mode, wherein the fourth condition is a condition in which a difference between consecutive breathing intervals is identified as being less than a threshold difference while the usage mode is the first mode, and wherein the fifth condition is a condition in which a specified time period has elapsed after the first mode is initiated while the usage mode is the first mode.

\* \* \* \* \*